United States Patent
Sasaki et al.

(10) Patent No.: US 11,900,772 B2
(45) Date of Patent: Feb. 13, 2024

(54) MOBILE TERMINAL, WEIGHING DEVICE, POS TERMINAL, NON-TRANSITORY COMPUTER-READABLE MEDIUM, SALES PROCESSING SYSTEM, AND SALES PROCESSING METHOD

(71) Applicant: Teraoka Seiko Co., Ltd., Tokyo (JP)

(72) Inventors: Kazuya Sasaki, Tokyo (JP); Tomoki Kaneko, Tokyo (JP); Naoto Kurosaki, Tokyo (JP); Shingo Higuchi, Tokyo (JP); Kazuki Watanabe, Tokyo (JP); Fumikatu Saitoh, Tokyo (JP); Akiko Yoshikawa, Tokyo (JP); Sayaka Tomori, Tokyo (JP)

(73) Assignee: Teraoka Seiko Co., LTD, Tokyo (JP)

( * ) Notice: Subject to any disclaimer, the term of this patent is extended or adjusted under 35 U.S.C. 154(b) by 0 days.

(21) Appl. No.: 17/194,289

(22) Filed: Mar. 7, 2021

(65) Prior Publication Data
US 2021/0192902 A1 Jun. 24, 2021

Related U.S. Application Data

(63) Continuation of application No. PCT/JP2019/035234, filed on Sep. 6, 2019.

(30) Foreign Application Priority Data

Sep. 7, 2018 (JP) ................... 2018-168372
Sep. 7, 2018 (JP) ................... 2018-168373
(Continued)

(51) Int. Cl.
*G07G 1/00* (2006.01)
*G07G 1/01* (2006.01)
*G07G 1/12* (2006.01)

(52) U.S. Cl.
CPC ............. *G07G 1/0072* (2013.01); *G07G 1/01* (2013.01); *G07G 1/12* (2013.01)

(58) Field of Classification Search
CPC .......... G07G 1/0072; G07G 1/01; G07G 1/12; G06Q 20/208; G06Q 20/322; G06Q 20/204
See application file for complete search history.

(56) References Cited

U.S. PATENT DOCUMENTS 9,076,170 B2 * 7/2015 Rollyson ................ G06Q 30/06
10,758,066 B2 * 9/2020 Jain ...................... G07G 1/0036
(Continued)

FOREIGN PATENT DOCUMENTS

CN 106682178 A 5/2017
EP 2779065 A1 9/2014
(Continued)

OTHER PUBLICATIONS

Thimou, Theo. "Kroger 'Scan, Bag, Go' review: 11 things to know before trying it out". Retrieved from <https://clark.com/shopping-retail/kroger-scan-bag-go-review/>. Originally published Oct. 2018. (Year: 2018).*

(Continued)

*Primary Examiner* — Nathan A Mitchell
(74) *Attorney, Agent, or Firm* — Osha Bergman Watanabe & Burton LLP

(57) ABSTRACT

A mobile terminal includes: a processor that acquires a type of a product sold by weight; and a transceiver connected to the processor and that establishes intercommunication with a weighing device that weighs the product sold by weight; a storage connected to the processor. The processor causes the transceiver to acquire, from the weighing device, a weight value of the product sold by weight weighed by the weighing device. The processor registers, in the storage, the (Continued)

type of the product and the weight value that corresponds to the type of the product.

12 Claims, 51 Drawing Sheets

(30) Foreign Application Priority Data

| Sep. 7, 2018 | (JP) | 2018-168374 |
|---|---|---|
| Sep. 7, 2018 | (JP) | 2018-168375 |
| Sep. 8, 2018 | (JP) | 2018-168379 |

(56) References Cited

U.S. PATENT DOCUMENTS

| | | | |
|---|---|---|---|
| 2003/0121974 A1* | 7/2003 | Blanford | G07G 1/0054 235/383 |
| 2011/0101086 A1* | 5/2011 | Yach | G06Q 10/107 235/375 |
| 2012/0000976 A1* | 1/2012 | Rollyson | G06Q 20/208 235/375 |
| 2012/0173351 A1* | 7/2012 | Hanson | G06Q 30/0635 705/26.81 |
| 2012/0284132 A1* | 11/2012 | Kim | G06Q 20/18 235/375 |
| 2014/0175164 A1* | 6/2014 | Allard | G06Q 30/06 235/375 |
| 2014/0249916 A1* | 9/2014 | Verhaeghe | G06Q 30/0633 705/14.51 |
| 2014/0263631 A1* | 9/2014 | Muniz | G01G 19/4144 235/383 |
| 2014/0316901 A1 | 10/2014 | Grabovski et al. | |
| 2015/0025969 A1* | 1/2015 | Schroll | G06Q 20/208 705/14.64 |
| 2015/0073948 A1* | 3/2015 | Dyer | G06F 3/04817 705/28 |
| 2016/0132854 A1* | 5/2016 | Singh | G07G 1/01 705/16 |
| 2017/0091748 A1* | 3/2017 | Clark | G06Q 20/208 |
| 2019/0333039 A1* | 10/2019 | Glaser | G06Q 20/201 |

FOREIGN PATENT DOCUMENTS

| | | |
|---|---|---|
| JP | H07-65239 A | 3/1995 |
| JP | 2002-324276 A | 11/2002 |
| JP | 2003-173415 A | 6/2003 |
| JP | 2008-293180 A | 12/2008 |
| JP | 2016-40668 A | 3/2016 |
| JP | 2016-53921 A | 4/2016 |
| JP | 2016-522938 A | 8/2016 |
| JP | 6242444 B2 | 12/2017 |
| JP | 2018-55700 A | 4/2018 |
| JP | 2018-73167 A | 5/2018 |
| JP | 2019-153157 A | 9/2019 |

OTHER PUBLICATIONS

Author unknown. "Fairway Market Officially Debuts Mobile Self-Scanning Checkout". Retrieved from <https://progressivegrocer.com/fairway-market-officially-debuts-mobile-self-scanning-checkout>. Originally published Nov. 2018. (Year: 2018).*

Pucci, Raymond. "Walmart Re-Thinking Mobile Self-Checkout App". Retrieved from <https://www.paymentsjournal.com/walmart-re-thinking-mobile-self-checkout-app/>. Originally published May 2018. (Year: 2018).*

Berthene, April. "Two grocery stores checkout apps for self-checkout". Retrieved from <https://www.digitalcommerce360.com/2016/03/30/two-grocery-stores-check-out-apps-self-checkout/>. Originally published Mar. 2016. (Year: 2016).*

Dornbusch, Jane. "Scan on a mission". Retrieved from <http://archive.boston.com/lifestyle/articles/2011/11/09/scan_it_mobile_is_a_supermarket_smartphone_app_that_works_as_a_super_fast_self_checkout/>. Originally published Nov. 2011. (Year: 2011).*

International Search Report issued in corresponding International Application No. PCT/JP2019/035234 dated Nov. 26, 2019, with translation (3 pages).

Written Opinion of the International Searching Authority issued in corresponding International Application No. PCT/JP2019/035234 dated Nov. 26, 2019 (3 pages).

Extended European Search Report issued in corresponding European Patent Application 19858113.4 dated Apr. 7, 2022 (12 pages).

* cited by examiner

FIG. 3A

| Logic | Process Name | Process Content |
|---|---|---|
| A | Calculate amount from latest product information | Accommodate price change during operation |
| B | Subtotal price cut | Apply price cut / discount to subtotal amount |
| C | Individual price cut | Apply price cut / discount to individual product |
| D | Bundle/mix-and-match | Bundle price cut / discount (bulk price cut / discount: price cut / discount for bulk purchase of identical products. Mix-and-match price cut / discount (pick-and-choose price cut / discount): price cut / discount for bulk purchase from among designated products |
| E | Matching-set | Apply price cut / discount to combination |
| F | Payment-type price cut | Apply price-cut / discount according to payment type such as cash, credit, or electronic money |
| G | Member-type price cut | Apply price cut / discount for member |
| H | Lowest-price calculation | Select discount conditions providing lowest price when discount processes overlap |

FIG. 3B

| Store Identification No. | Store Name | Store GPS Information | QR Code Info |
|---|---|---|---|
| 0001-001 | AAA Co., OO Store | Latitude: 35.577 Longitude: 139.701 | AAAXXXBBBCCC |
| 0001-002 | BBB Co., ΔΔ Store | Latitude: 36.352 Longitude: 139.820 | AAAXXXFFFCCC |

FIG. 3C

| Member Identification No. | Member Name | Usage Count | Past Cancellation Count | Member Level |
|---|---|---|---|---|
| 0000001 | Hanako Patent | 12 | $12^{th}$ time: 2<br>$11^{th}$ time: 1<br>$10^{th}$ time: 5 | L3 |
| 0000002 | Tarō Patent | 1 | $1^{st}$ time: 2 | L1 |

FIG. 3D

| Shopping Identification Information = Store Identification Information + Date + Serial No. | Registered Product Information | Deferred-Product Information | Cancellation Operation Information |
|---|---|---|---|
| 001001 + 180828+00175 | Barcode information, product name, price, ... | Total: 3x<br>NON-PLU: 2x<br>Fraudulent Operations: 0x | 2x |
| | | | |

FIG. 19

Total  34 Items   ¥16,650       Accounting

Please confirm product contents, then press the Accounting button.

| Item | Qty | Price | Item | Qty | Price |
|---|---|---|---|---|---|
| Beer | ×1 | ¥4,260 | Kyushu Pork Loin | ×1 | ¥420 |
| Nigiri Sushi | ×1 | ¥1,680 | Garlic | ×1 | ¥370 |
| Wild Shrimp Pack | ×1 | ¥1,000 | Instant Coffee | ×1 | ¥390 |
| Soy Sauce Cured Salmon Roe | ×1 | ¥980 | Mirin | ×1 | ¥350 |
| Beef Brisket for Sukiyaki | ×1 | ¥690 | Raw Saury | ×3 | ¥300 |
| Grapes | ×2 | ¥1,300 | Sweet Potato | ×1 | ¥280 |
| Smoked Assortment | ×1 | ¥540 | Curry Powder | ×1 | ¥250 |
| Kumamoto Oranges | ×2 | ¥960 | Mayonnaise | ×1 | ¥180 |
| Wine | ×1 | ¥470 | Corn | ×3 | ¥300 |
| Children's Sushi Set | ×1 | ¥470 | White Bread | ×1 | ¥120 |
| Donaldson Trout | ×1 | ¥450 | Potato Chips | ×1 | ¥100 |
| Greenhouse Strawberries | ×1 | ¥450 | Yogurt | ×1 | ¥90 |

10/18 (Mon) 18:32   Call Over Employee

| ¥1,000 or more | ¥500 - ¥999 | ¥300 - ¥499 | Less than ¥300 |
|---|---|---|---|
| 3 | 4 | 9 | 12 |

FIG. 20

| Total | 31 Items | ¥15,280 |

An employee is on their way. Please confirm product contents while you wait.

| | | |
|---|---|---|
| Deferred Product Non-Filed | | Kyushu Pork Loin ×1 ¥420 |
| Deferred Product Unscanned | | Garlic ×1 ¥370 |
| Cancelled Product ~~Sukiyaki~~ | ~~×1 ¥120~~ | Instant Coffee ×1 ¥390 |
| Soy Sauce Cured Salmon Roe | ×1 ¥980 | Mirin ×1 ¥350 |
| Beef Brisket for Sukiyaki | ×1 ¥690 | Raw Saury ×3 ¥300 |
| Grapes | ×2 ¥1,300 | Sweet Potato ×1 ¥280 |
| Smoked Assortment | ×1 ¥540 | Curry Powder ×1 ¥250 |
| Kumamoto Oranges | ×2 ¥960 | Mayonnaise ×1 ¥180 |
| Wine | ×1 ¥470 | Corn ×3 ¥300 |
| Children's Sushi Set | ×1 ¥470 | White Bread ×1 ¥120 |
| Donaldson Trout | ×1 ¥450 | Potato Chips ×1 ¥100 |
| Greenhouse Strawberries | ×1 ¥450 | Yogurt ×1 ¥90 |

- 920
- 920b Deferred Product Non-Filed
- 920c Deferred Product Unscanned
- 920d Cancelled Product
- 920a (products list)
- 920e Deferred Products: 3

| Deferred Products | ¥1,000 or more | ¥500 - ¥999 | ¥300 - ¥499 | Less than ¥300 |
|---|---|---|---|---|
| 3 | 3 | 4 | 9 | 12 |

Call Over Employee

10/18 (Mon) 11:12

Total  ¥15,280   31 Items

An employee is on their way. Please confirm product contents while you wait.

| | | |
|---|---|---|
| Registered Rice ×1 ¥2,350 | Kyushu Pork Loin | ×1 ¥420 |
| Deferred Product Unscanned | Garlic | ×1 ¥370 |
| Canceled Product ~~Yakisoba~~ ~~×1 ¥120~~ | Instant Coffee | ×1 ¥390 |
| Soy Sauce Cured Salmon Roe ×1 ¥980 | Mirin | ×1 ¥350 |
| Beef Brisket for Sukiyaki ×1 ¥690 | Raw Saury | ×3 ¥300 |
| Grapes ×2 ¥1,300 | Sweet Potato | ×1 ¥280 |
| Smoked Assortment ×1 ¥540 | Curry Powder | ×1 ¥250 |
| Kumamoto Oranges ×2 ¥960 | Mayonnaise | ×1 ¥180 |
| Wine ×1 ¥470 | Corn | ×3 ¥300 |
| Children's Sushi Set ×1 ¥470 | White Bread | ×1 ¥120 |
| Donaldson Trout ×1 ¥450 | Potato Chips | ×1 ¥100 |
| Greenhouse Strawberries ×1 ¥450 | Yogurt | ×1 ¥90 |

| 10/18 (Mon) 11:32 | Call Over Employee | Deferred Products 2 | ¥1,000 or more 3 | ¥500 - ¥999 4 | ¥300 - ¥499 9 | Less than ¥300 12 |

FIG. 23

| Total | 33 Items | ¥18,020 | | Confirm |

An employee is on their way. Please confirm product contents while you wait.

| Registered | Rice | ×1 ¥2,350 | | Kyushu Pork Loin | ×1 ¥420 |
| Registered | Umbrella | ×1 ¥470 | | Garlic | ×1 ¥370 |
| Confirmed | ~~Yakisoba~~ | ~~×1 ¥120~~ | | Instant Coffee | ×1 ¥390 |
| Soy Sauce Cured Salmon Roe | | ×1 ¥980 | | Mirin | ×1 ¥350 |
| Beef Brisket for Sukiyaki | | ×1 ¥690 | | Raw Saury | ×3 ¥300 |
| Grapes | | ×2 ¥1,300 | | Sweet Potato | ×1 ¥280 |
| Smoked Assortment | | ×1 ¥540 | | Curry Powder | ×1 ¥250 |
| Kumamoto Oranges | | ×2 ¥960 | | Mayonnaise | ×1 ¥180 |
| Wine | | ×1 ¥470 | | Corn | ×3 ¥300 |
| Children's Sushi Set | | ×1 ¥470 | | White Bread | ×1 ¥120 |
| Donaldson Trout | | ×1 ¥450 | | Potato Chips | ×1 ¥100 |
| Greenhouse Strawberries | | ×1 ¥450 | | Yogurt | ×1 ¥90 |

| 10/18 (Mon) 11:12 | Call Over Employee | Deferred Products 0 | ¥1,000 or more 3 | ¥500 - ¥999 4 | ¥300 - ¥499 9 | Less than ¥300 12 |

FIG. 28A

| Product Ident. Info. | Product Name | PLU | Price | Plan No. |
|---|---|---|---|---|
| 0001 | Corn | 1 | ¥120 | 1 |
| 0002 | Canned Mackerel | 2 | ¥200 | 11 |
| 0003 | Mandarin Oranges | 3 | ¥200 | 11 |

FIG. 28B

| Plan No. | Price-Cut Type | PLU | Product Ident. Info. | Establishment Count | Content 1 of Price Cut etc. | Content 2 of Price Cut etc. |
|---|---|---|---|---|---|---|
| 1 | Bulk Price Cut | 1 | 0001 | 3 | -100 | -200 |
| 11 | Matching-Set Price Cut | 2 | 0002 | 3 | -10% | -20% |
| | | 3 | 0003 | 3 | | |

MOBILE TERMINAL, WEIGHING DEVICE, POS TERMINAL, NON-TRANSITORY COMPUTER-READABLE MEDIUM, SALES PROCESSING SYSTEM, AND SALES PROCESSING METHOD

BACKGROUND

Technical Field

The present invention relates to a mobile terminal, a weighing device, a POS terminal, a storage medium, a sales processing system, and a sales processing method.

Related Art

Conventionally, self-checkout point-of-sale (POS) systems where a customer performs a registration process for a product to be purchased are in wide use. Mobile registration devices whereby a customer performs a registration process when they place a product in a shopping basket or the like are also known. Sales-data processing systems wherein a shopping application is downloaded onto a mobile terminal such as a smartphone had by a customer and this mobile terminal is used as a registration device whereby the customer performs a registration process in a store are also known.

PATENT LITERATURE

Patent literature 1: JP 6242444 B2

A sales-data processing system that uses a mobile terminal had by a customer as a registration device can register a product using a mobile terminal the customer is accustomed to using and can eliminate time spent on a registration process at a register.

However, for a product whose price is determined by measuring a weight of the product, such as a product sold by weight (bulk food), the customer needs to operate a weighing device. When performing a registration process for the product sold by weight using the mobile terminal, the customer needs to input a type and weight value of the product sold by weight to the mobile terminal, and it is cumbersome for the customer to perform processing using both the mobile terminal and the weighing device.

SUMMARY

One or more embodiments provide an environment that facilitates a purchase of a product sold by weight using a mobile terminal.

A mobile terminal according to one or more embodiments includes a product-type acquisition means that acquires a type of a product sold by weight, a transceiver that establishes intercommunication with a weighing device that weighs the product sold by weight, a weight-value acquisition means that acquires a weight value of the product sold by weight weighed by the weighing device for which intercommunication is established, and a product registration means that registers the type of the product and the weight value, which corresponds to the type of the product.

One or more embodiments can provide various practical improvements in POS technology that facilitate a purchase of a product sold by weight using a mobile terminal, as described in detail below.

BRIEF DESCRIPTION OF THE DRAWINGS

FIG. 3A is a diagram illustrating one example of data of the sales-data processing system according to one or more embodiments.

FIG. 3B is a diagram illustrating one example of data of the sales-data processing system according to one or more embodiments.

FIG. 3C is a diagram illustrating one example of data of the sales-data processing system according to one or more embodiments.

FIG. 3D is a diagram illustrating one example of data of the sales-data processing system according to one or more embodiments.

FIG. 19 shows an example of a screen of the POS terminal of the sales-data processing system according to one or more embodiments.

FIG. 20 shows an example of a screen of the POS terminal of the sales-data processing system according to one or more embodiments.

FIG. 22 shows an example of a screen of the POS terminal of the sales-data processing system according to one or more embodiments.

FIG. 23 shows an example of a screen of the POS terminal of the sales-data processing system according to one or more embodiments.

FIG. 28A is a diagram illustrating one example of data of the sales-data processing system according to one or more embodiments.

FIG. 28B is a diagram illustrating one example of data of the sales-data processing system according to one or more embodiments.

DETAILED DESCRIPTION

A sales-data processing system according to one or more embodiments is described with reference to the drawings.

—Overall Configuration of Sales-Data Processing System—

Figure 1:
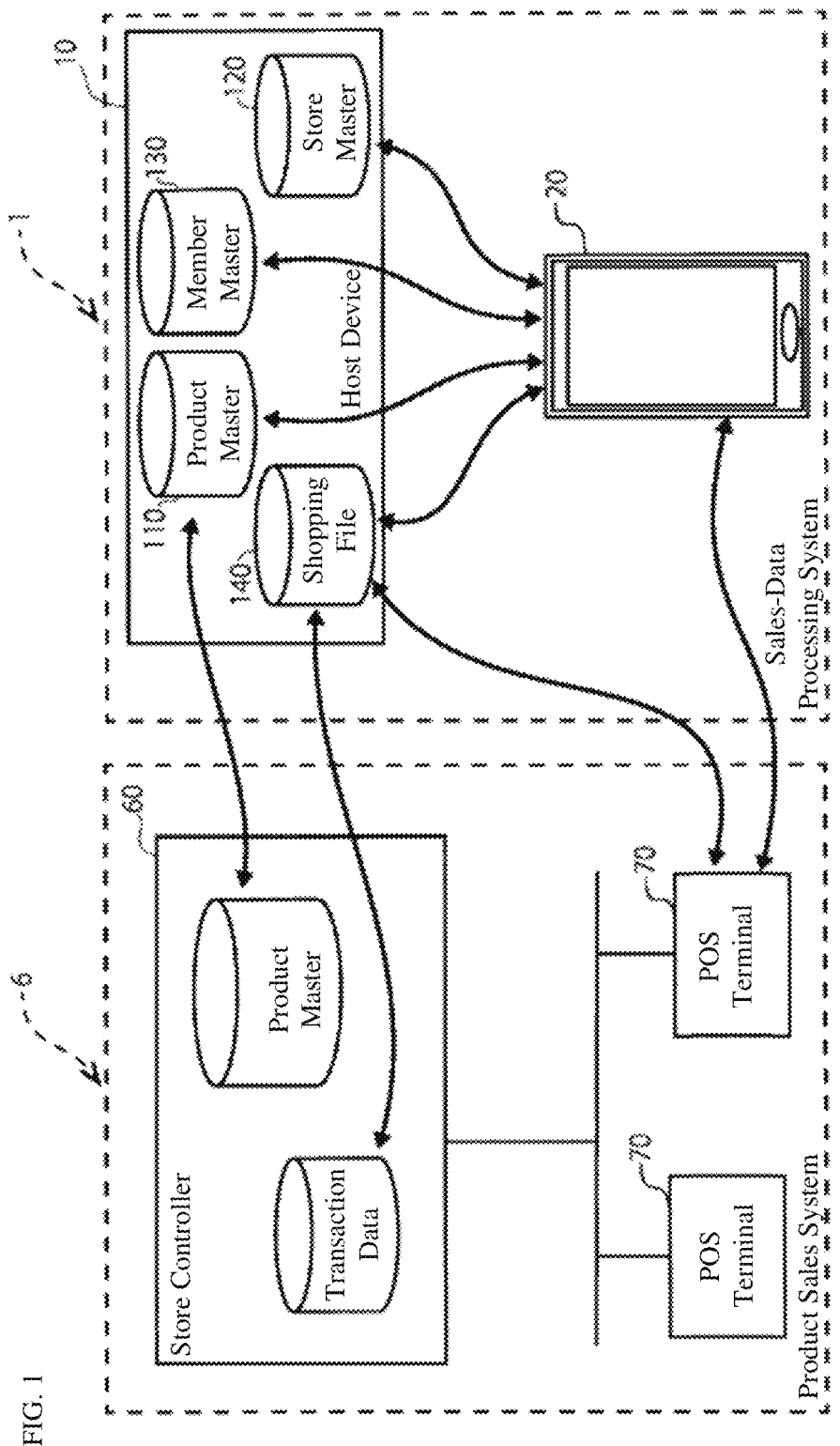
FIG. 1 is a schematic diagram illustrating an example of an overall configuration of a sales-data processing system according to one or more embodiments.

As illustrated in FIG. 1, a sales-data processing system 1 according to one or more embodiments includes a host device 10 and a mobile terminal 20. The host device 10 includes a storage of storing a product master 110, a store master 120, a member master 130, a shopping file 140, and the like. The mobile terminal 20 is connected to the host device 10 via the internet or the like. The sales-data processing system may also be referred to as, for example, a sales processing system.

As the host device 10, for example, a cloud server is used. The host device 10 is linked with a store controller (managing device) 60 that constructs a product sales system 6 of a store via the internet or the like. The product master 110 and the like stored in the host device 10 are updated as appropriate—for example, each time when it is a predetermined time—based on various information of the store controller 60. The store controller may also be referred to as, for example, a store computer.

As the mobile terminal 20, for example, a smartphone personally had by a customer is used. The mobile terminal 20 includes a photographic camera (input unit), a display such as a touch panel (display input unit), and the like. A dedicated application can be introduced (installed) on the mobile terminal (smartphone) 20. The mobile terminal 20 whereon the dedicated application is introduced functions as a registration device that executes a registration process of registering a product to be purchased. The mobile terminal 20 may be a mobile terminal on loan from the store.

The mobile terminal 20 transmits and receives various information between itself and the host device 10. Moreover, the mobile terminal 20 outputs registration information to a settlement device such as a POS terminal 70.

The product sales system 6 of the store includes the store controller 60 and a plurality of POS terminals (registration/settlement devices) 70 and can use the POS terminals 70 to register/perform settlement for the product to be purchased by the customer.

The store controller 60 is an information processing device that performs overall management of the product sales system 6 of the store. Moreover, the store controller 60 is a device that manages the POS terminal 70 and the like and manages various information such as the product master and the member master. The store controller 60 acquires and stores a product master reflecting the latest product information from an external server, such as a headquarters server, or a removable storage medium. The product master stores product information such as a product name, a selling price, and price-cut information in association with product identification information assigned to each product (for example, a JAN code).

The POS terminal 70 has a barcode reader, a preset key, an input unit, a display, and a printing unit. The barcode reader reads, for example, the information of the product to be purchased. The input unit is a CCD camera or the like. The display is, for example, a touch panel that displays the read product information or the like. The printing unit prints a receipt or the like. The POS terminal 70 refers to the shopping file and the like in the host device 10 as necessary—for example, when shopping identification information (described below) is input from the mobile terminal 20.

One example of the POS terminal 70 is a POS terminal dedicated to settlement. In one or more embodiments, the customer can register a product by using the smartphone (mobile terminal) 20 had by the customer in the store. Moreover, by performing a settlement process by using the POS terminal dedicated to settlement, the customer can perform a product transaction without employee intervention.

The POS terminal 70 is not limited to a POS terminal dedicated to settlement and may be a POS terminal of a semi-self-checkout type whereby an employee performs the registration process for the product to be purchased and the customer themself performs the settlement process. The POS of the semi-self-checkout type may be a separated POS, wherein a registration device that performs the registration process and a settlement device that performs the settlement process are separated, or an opposing POS, wherein a screen for performing the registration process faces the employee and a screen for performing the settlement process and a cash processing unit face the customer. In the separated POS, registration information subjected to the registration process by the registration device is output to the settlement device, and the customer themself performs the settlement process at the settlement device. Moreover, the POS terminal 70 may be a POS of a full-self-checkout type whereby the customer performs the registration process and the settlement process for the product to be purchased—that is, whereby these are performed without employee intervention.

Figure 2A:
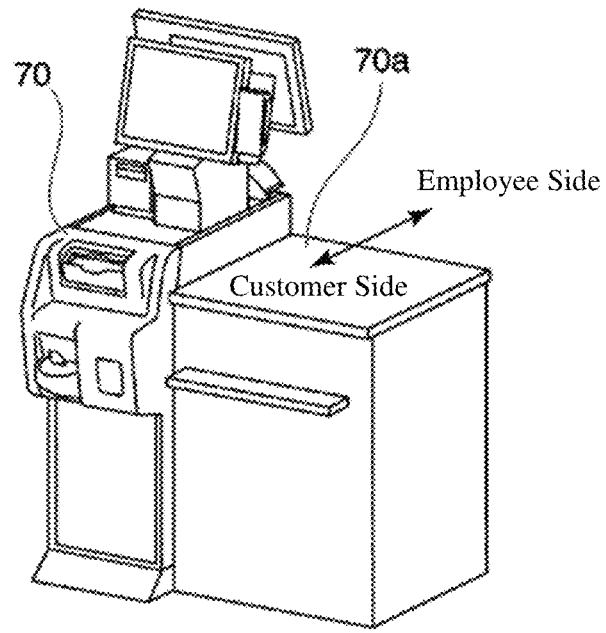
FIG. 2A is a diagram of one example of a POS terminal of the sales-data processing system according to one or more embodiments.
Figure 2B:
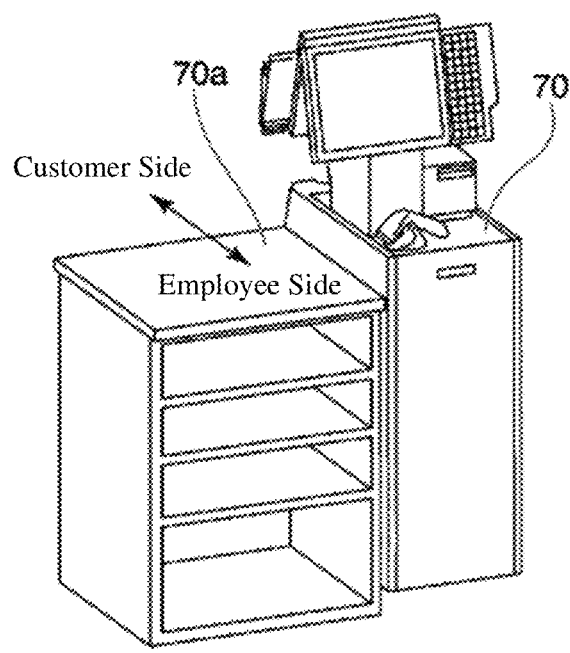
FIG. 2B is a diagram of one example of a POS terminal of the sales-data processing system according to one or more embodiments.

Furthermore, the POS terminal 70 may be a switchable POS that can switch between a separated POS of the semi-self-checkout type, an opposing POS of the semi-self-checkout type, and a POS of the full-self-checkout type according to a store congestion status, an employee working status, and the like. One example of the POS terminal 70 as the switchable POS is illustrated in FIG. 2A and FIG. 2B. The POS terminal 70 includes a table 70a. If this is a device that can perform the settlement process, this may be a POS whereby the employee performs the settlement process (for example, a normal POS register whereby the employee performs the registration process and the settlement process for the product to be purchased by the customer) instead of a POS whereby the customer themself performs the settlement process.

Furthermore, the sales-data processing system 1 according to one or more embodiments is made to, for example, expand a product sales system 6 of a store provided with a store controller 60 and a plurality of POS terminals 70 to enable product registration by a smartphone had by a customer in this store. That is, a sales-data processing system is constructed wherein retrofitting (adding on) a function to an existing product sales system 6 enables product registration by the smartphone had by the customer in this store.

An overview of an overall configuration of the sales-data processing system according to one or more embodiments is described above. This is further described by way of several examples. Generally, in a store, when a customer is to purchase products, the customer takes the products to be purchased to a register, and an employee inputs a price of each product using the register so the prices of all products are totaled and a selling price in one transaction is determined. Moreover, the store attempts to win customers by, for example, lowering the selling price by applying various discounts or the like to determine the selling price.

Figure 4:
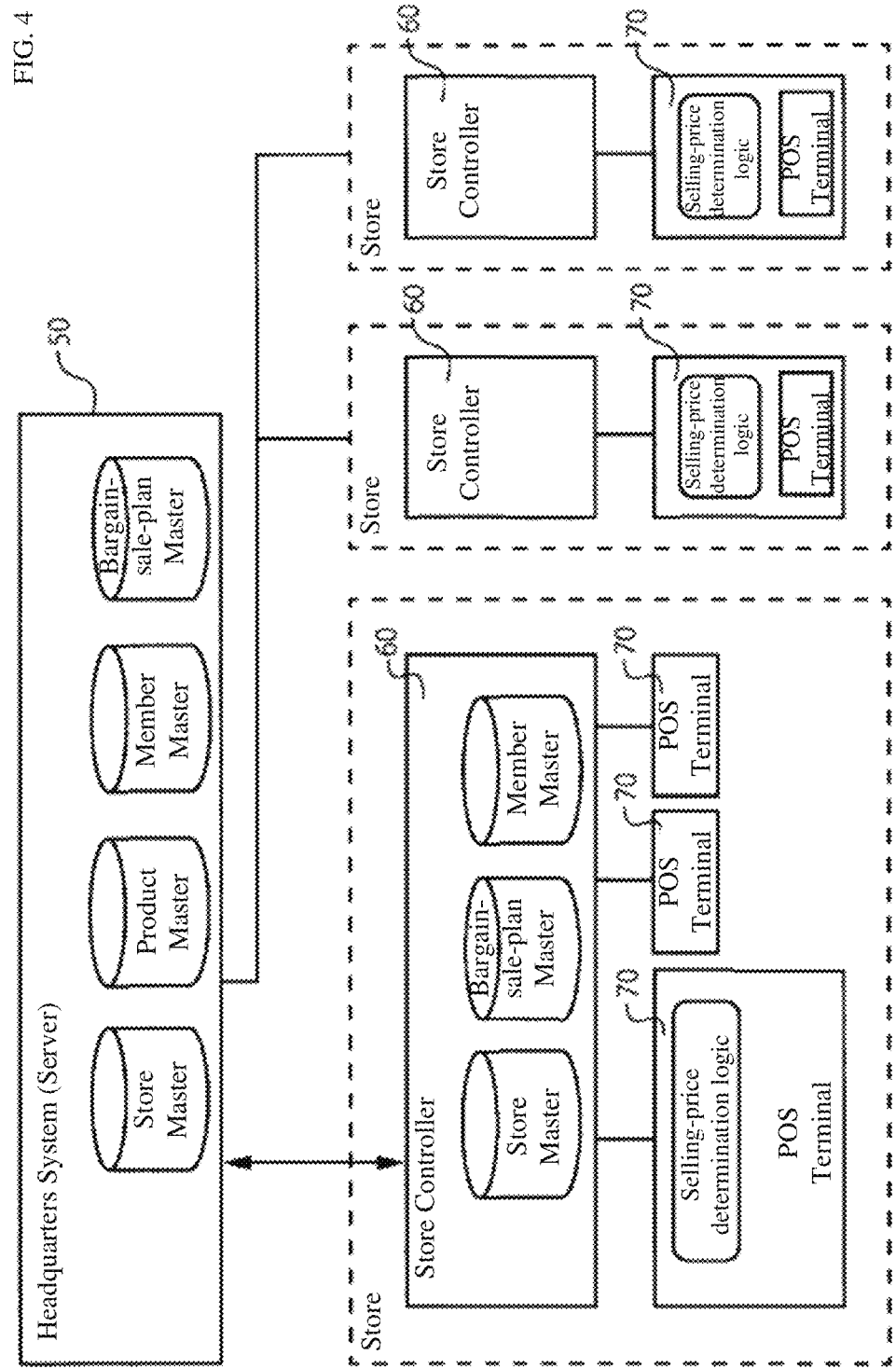
FIG. 4 shows an example of a store adopting the sales-data processing system according to one or more embodiments.

FIG. 4 illustrates a system adopted by, for example, a supermarket that deploys a plurality of stores. Normally, in a system of a supermarket or the like, a headquarters system (server) 50 that integrally manages all stores is disposed, and a product master shared by all stores, a store master, a product master for each store, a bargain-sale-plan master shared by all stores, a bargain-sale-plan master for each store, a member master, and the like are managed in this headquarters system 50.

In each store, a POS terminal 70 and a store controller 60 that manages the POS terminal 70 are disposed to construct a POS system. The store controller 60 of each store receives the product master shared by all stores, the store master, the product master for each store, the bargain-sale-plan master shared by all stores, and the bargain-sale-plan master for each store from the headquarters system 50. Alternatively, these are input (registered) at the store. The member master may be received from the headquarters system 50 like the other masters but does not have to be held by the store controller 60, and the headquarters system may be queried each time—for example, when looking up member information.

The POS systems of each store each have a selling-price determination logic. The selling-price determination logic includes several logics for calculating a selling price of a product to be purchased by a shopper. Moreover, the selling-price determination logic includes a function of determining which logic to apply in determining the selling price when calculating the selling price of the product. For example, when a certain product is a product eligible for an individual price cut but is simultaneously a product eligible for a matching-set price cut, the matching-set discount, which yields the lower price, is applied. Which discount logic is selected is determined according to a setting.

Here, several selling-price determination logics for determining the product selling price are illustrated and described. First, a standard selling-price determination logic is defined as Selling-Price Determination Logic (Standard). A selling-price determination logic specific to each company or store is defined as Selling-Price Determination Logic (Company/Store). Selling-Price Determination Logic (Standard) includes functions such as subtotaling (calculating a total amount), a subtotal price cut/discount, an individual price cut/discount, a bundle/mix-and-match price cut, and a matching-set price cut. Selling-Price Determination Logic (Company/Store) includes, for example, in addition to the above subtotaling (calculating the total amount), subtotal price cut/discount, individual price cut/discount, bundle/mix-and-match price cut, and matching-set price cut, a price cut/discount from a special service for members and price cuts/discounts according to payment type used for payment. Selling-Price Determination Logic (Company/Store) also includes a function of its own, such as which condition to prioritize when a plurality of price-cut/discount conditions is in simultaneous competition. Selling-Price Determination Logic (Company/Store) may also have subtotaling (calculating a total amount), a subtotal price cut/discount, an individual price cut/discount, a bundle/mix-and-match price cut, and a matching-set price cut as its own functions.

The logics included in the selling-price determination logic are described with reference to FIG. 3A. Subtotaling (logic A) is a logic for determining the selling price of the product to be purchased and is a process of calculating the total amount by totaling prices of the latest product information of each product. A subtotal price cut (logic B) is a process of applying a price cut of a predetermined amount or a discount of a predetermined percentage to a subtotal amount (total amount). An individual price cut (logic C) is a process of applying a special price cut or discount to a specific, individual product.

A bundle/mix-and-match price cut (logic D) is a process of applying a price cut or discount due to a plurality of products being purchased together from, for example, a specific product group. A matching-set price cut (logic E) is a process of applying a price cut or discount due to specific products being purchased in combination.

A payment-type price cut (logic F) is a process of applying a price cut or discount according to a payment type used by the member at a time of payment. A member-type price cut (logic G) is a process of applying a price cut or discount to a specific product or the subtotal amount by virtue of membership. A lowest-price calculation logic (logic H) is a process of determining, when a product qualifies for a plurality of discount conditions (when a plurality of logics is applicable), which discount, when applied, enables the lowest price to be calculated.

Furthermore, at each store, according to a policy sought by a store administrator, such as a company, several logics among logics A to H above are combined to set the selling-price determination logic in this store and determine the selling price. As the logics for determining the selling-price determination logic, those other than the above logics can also be set as appropriate by the store administrator (for example, a setting of which price cut to select or the like when there is a plurality of price cuts), and logics other than the above logic A to logic H may be provided.

Next, an introduction model of the sales-data processing system according to one or more embodiments is described.

—Introduction Example of Sales-Data Processing System Using Selling-Price Determination Logic (Standard) in New Store—

Figure 5:
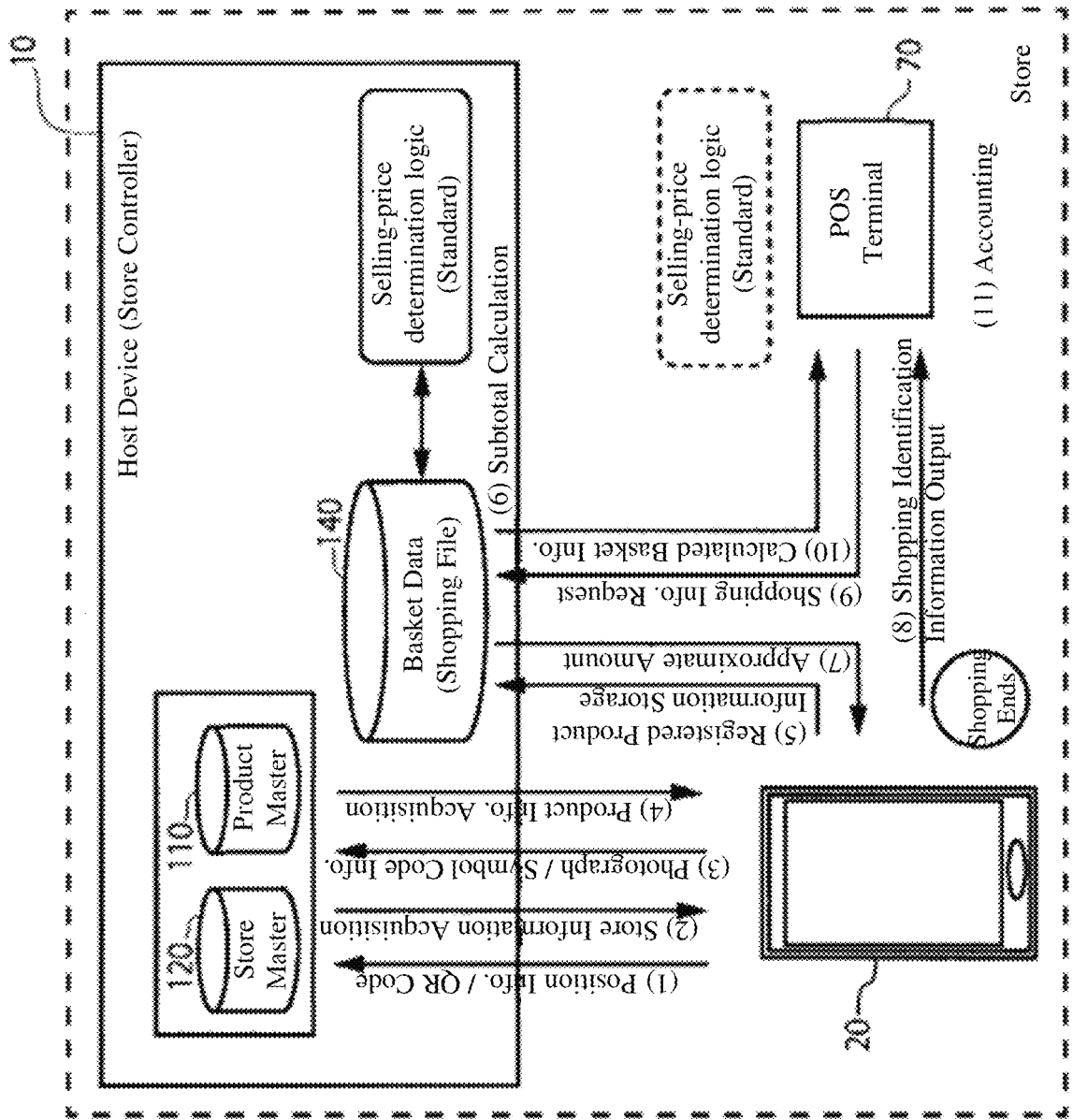
FIG. 5 shows an example of an introduction example of the sales-data processing system according to one or more embodiments.

FIG. 5 illustrates an overview of a model of when a sales-data processing system provided with Selling-Price Determination Logic (Standard) is to be independently introduced, with no relation to an existing selling-price determination logic, at a time of, for example, newly opening a new store. In the example illustrated in FIG. 5, the host device 10 is constituted by a store controller of the store, and the sales-data processing system is constructed by the mobile terminal 20 directly communicating with the store controller that is the host device 10. The product master 110, the store master 120, and the like stored in the host device 10 can be constructed by directly inputting the product information and store information via a web browser or the like.

In the present example, because the store controller of the new store is set to Selling-Price Determination Logic (Standard), the sales-data processing system can be constructed smoothly. One example of a flow of processes in the present example is briefly described below. The parenthetical numbers in the description indicate processes in FIG. 5.

(1) By a member carrying the mobile terminal 20 starting the application of the mobile terminal 20, the application acquires position information and the like from a GPS of the mobile terminal 20 and transmits the acquired position information to the host device 10. If no position information can be acquired, the application may display on the display a QR code (registered trademark) posted at, for example, a store entrance so the QR code (registered trademark) is read from the mobile terminal 20, and by this QR code (registered trademark) being read, information for identifying the store indicated by the QR code (registered trademark) may be transmitted to the host device 10. A means of acquiring the position information is not limited to the GPS.

(2) Upon receiving the position information (or the information for identifying the store) from the mobile terminal 20, the host device 10 specifies one store or a plurality of stores closest to a position of the mobile terminal 20 based on the received position information or the like and the information stored in the store master 120. The host device 10 transmits the store information of the specified store to the mobile terminal 20. The host device 10 may transmit customer information (such as earned points or a member rank) when transmitting the store information to the mobile terminal 20. The host device 10 may transmit, to the mobile terminal 20, specified store bargain-sale information (such as a store name, information on a low-price bargain sale taking place at this store, or ad information giving this store information) or the like when transmitting the store information to the mobile terminal 20.

Upon receiving the store information, the mobile terminal 20 displays the received store information on the display. Upon receiving a plurality of units of store information, the mobile terminal 20 may display the received plurality of units of store information in a selectable manner. The member confirms the store information displayed on the display (for example, a display 250) of the mobile terminal 20 and, if a plurality of units of store information is displayed, performs a selection to specify in which store to shop. By a store being specified, the host device 10 associates this mobile terminal 20 and the product master 110 of the specified store and generates the shopping file (basket data).

(3) In the specified store, when the member uses the mobile terminal 20 to read symbol-code information (product identification information) of a product to be purchased, the mobile terminal 20 transmits the read symbol-code information to the host device 10. It is sufficient for the product identification information to be information that can be acquired as an image in order to identify the product—for example, a barcode, object recognition according to a feature value of an image, or character recognition.

(4) Upon receiving the product identification information, the host device 10 extracts product information from the product master 110 based on the received product identification information and transmits the extracted product information to the mobile terminal 20. The mobile terminal 20 registers (stores) the received product information as product information of this product to be purchased by the member.

(5) The product information registered by the mobile terminal 20 is transmitted to the host device 10 as registered product information. The host device 10 stores the received registered product information in the shopping file (basket data).

(6) The host device 10 calculates a subtotal (total amount) according to Selling-Price Determination Logic (Standard) for the registered product information stored in the shopping file.

(7) The host device 10 transmits the calculated total amount to the mobile terminal 20. This enables the member to continue shopping while viewing a current total amount (depending on the situation, an approximate amount) during shopping.

(8) When the member ends shopping, the mobile terminal 20 outputs the shopping identification information, which identifies this shopping of the member (shopping file, basket data), to the POS terminal 70. For example, the member ends shopping, symbol-code information such as a QR code (registered trademark) storing the shopping identification information identifying this shopping of the member is displayed on the display of the mobile terminal 20, and the input unit (for example, an input unit 760) of the POS terminal 70 reads this symbol-code information. By this, the mobile terminal 20 outputs the shopping identification information identifying this shopping of the member to the POS terminal 70. It is sufficient for the shopping identification information to be able to specify one shopping file (basket data). For example, the shopping identification information may be configured by combining store identification information, a date, a serial number, and the like. The shopping identification information may be path information (access destination) such as a URL whereat the shopping file (basket data) is stored. When the path information of the shopping file is shared and one shopping file cannot be specified, one shopping file may be specified by combining, for example, information such as the store identification information, member identification information, and a date and time or by using a sequence no. or the like. The mobile terminal 20 does not necessarily need to be able to recognize the above path information as long as this can be recognized on a POS-terminal 70 side. Moreover, the symbol-code information such as the QR code (registered trademark) may be generated by the mobile terminal 20 itself that displays this symbol-code information or be generated by another device that differs from the mobile terminal 20 (for example, the host device 10). That is, the mobile terminal 20 may receive the shopping identification information from an external device (for example, the host device 10) (at the latest, before the symbol-code information is generated), generate the symbol-code information based on the received shopping identification information, and display the generated symbol-code information on the display. Moreover, the host device 10 may generate the symbol-code information and transmit the generated symbol-code information to the mobile terminal 20 (at the latest, before the mobile terminal 20 displays the symbol-code information), and the mobile terminal 20 may receive this from the host device 10 and display the received symbol-code information on the display.

(9) Upon being input with the shopping identification information, the POS terminal 70 transmits the shopping identification information to the host device 10, thereby requesting shopping information (such as the registered product information) associated with this shopping identification information from the host device 10.

(10) Upon receiving the shopping identification information from the POS terminal 70, the host device 10 transmits the shopping information associated with the shopping identification information (the total amount having been calculated) to the POS terminal 70.

(11) Upon receiving the shopping information, the POS terminal 70 displays a settlement screen based on the received shopping information. By the member performing payment according to the settlement screen, one transaction using the mobile terminal 20 is completed.

The above is the flow of processes in the present example.

The POS terminal 70 may execute subtotal calculation according to the selling-price determination logic. In an aspect wherein the POS terminal 70 executes subtotal calculation, it is sufficient, for example, for the host device 10 to transmit (10) the shopping information (the total amount not yet being calculated) to the POS terminal 70 in response to the request (9) for the shopping information from the POS terminal 70 and for the mobile terminal 20 to execute subtotal calculation according to the selling-price determination logic.

—Example of Introducing Sales-Data Processing System in Existing Store (Part 1)—

Figure 6:
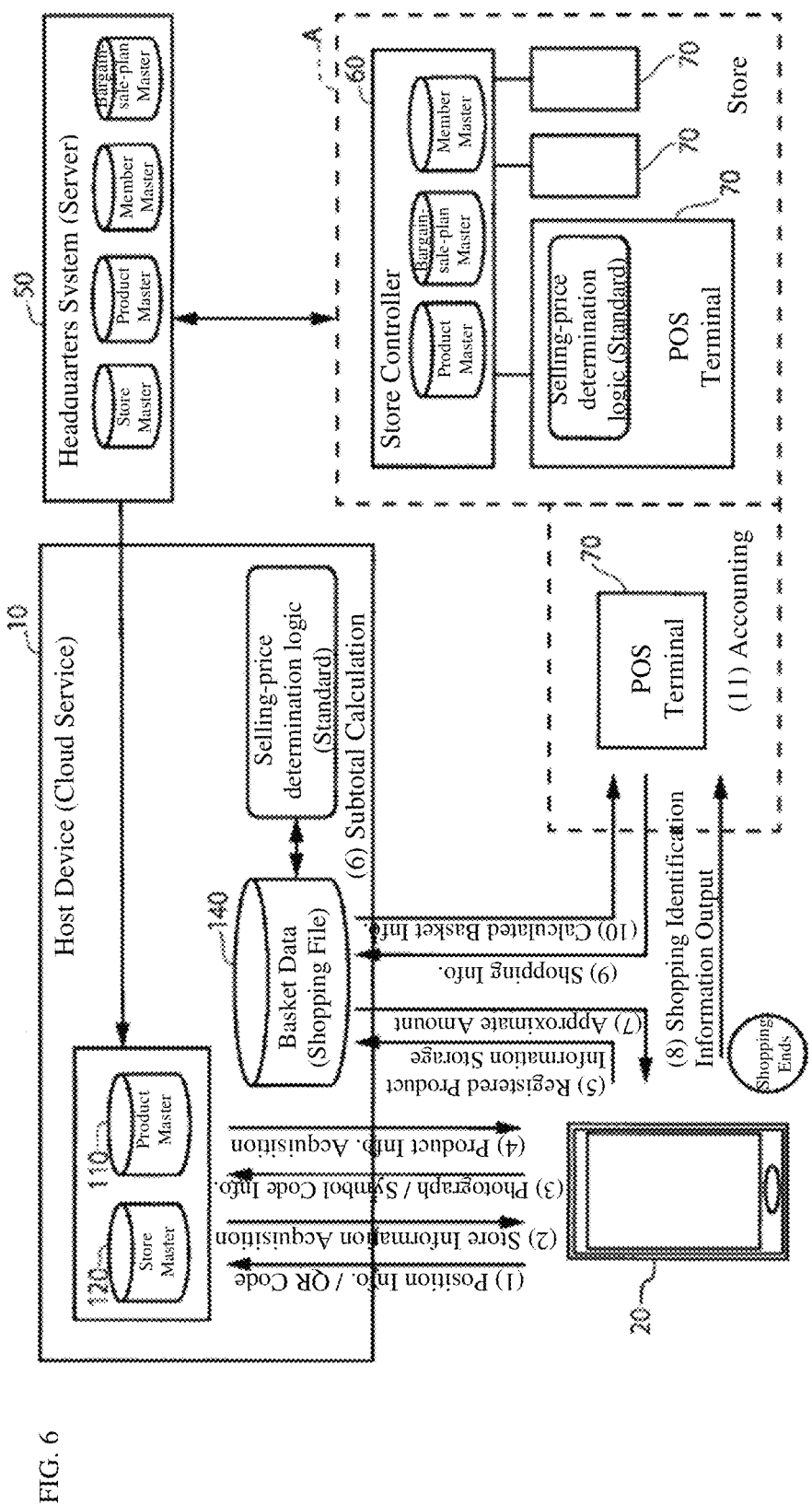
FIG. 6 shows an example of an introduction example of the sales-data processing system according to one or more embodiments.

The present example, illustrated in FIG. 6, is an example of performing accounting according to a selling-price determination logic provided by the sales-data processing system instead of using a selling-price determination logic of an existing store, this store being the one illustrated in FIG. 4. In the present example, for example, a sales-data processing system including Selling-Price Determination Logic (Standard) is added to an existing store wherein Selling-Price Determination Logic (Standard) is set as the selling-price determination logic.

The system illustrated in FIG. 6 is constructed by providing the sales-data processing system to the existing store illustrated in FIG. 4 as a cloud service. The mobile terminal 20 communicates with the host device 10, which is disposed in the cloud service.

In the present example, Selling-Price Determination Logic (Standard) set in the host device 10 of the sales-data processing system is similar to Selling-Price Determination Logic (Standard) set in the existing store. Therefore, when determining the selling price based on the registered product information subjected to the registration process by the mobile terminal 20, the selling-price determination logic of the existing store does not need to be used. The selling-price determination logic set in the existing store and the selling-price determination logic provided by the sales-data processing system are not limited to Selling-Price Determination Logic (Standard).

In the present example, to use the sales-data processing system, the existing headquarters system 50 or the store controller 60 disposed in the store periodically transmits, via the internet or the like, the product information (such as the product master and the bargain-sale-plan master) and the store information to the host device 10 provided by the cloud service. Only information that is valid that day may be transmitted as the product master and the bargain-sale-plan master.

The host device 10 provided by the cloud service acquires and stores the product information (such as the product master and the bargain-sale-plan master) and the store information. Therefore, the sales-data processing system can be constructed by simply adding a POS terminal 70 that executes the settlement process based on the registration information subjected to product registration by the mobile terminal 20.

The shopping information of the shopping file 140 disposed in the cloud service may be periodically transmitted to the headquarters system 50 or the store controller 60 of the store via the internet or be transmitted to the store controller 60 via an in-store network. A record of transactions performed by the mobile terminal 20 may be stored.

A flow of processes in the present example is similar to that of the newly disposed sales-data processing system illustrated in FIG. 5 other than the host device 10 being disposed in the cloud service instead of the store controller and acquiring the information and the like from the headquarters system 50 or the store controller 60. As such, description of this flow of processes is omitted. In the example illustrated in FIG. 6 as well, the POS terminal 70 or the application of the mobile terminal 20 may also be able to execute subtotal calculation according to the selling-price determination logic. Moreover, this may be adapted so, for example, an application of the existing POS terminal (settlement device) 70 is renovated instead of newly adding a POS terminal 70.

—Example of Introducing Sales-Data Processing System in Existing Store (Part 2)—

Figure 7:
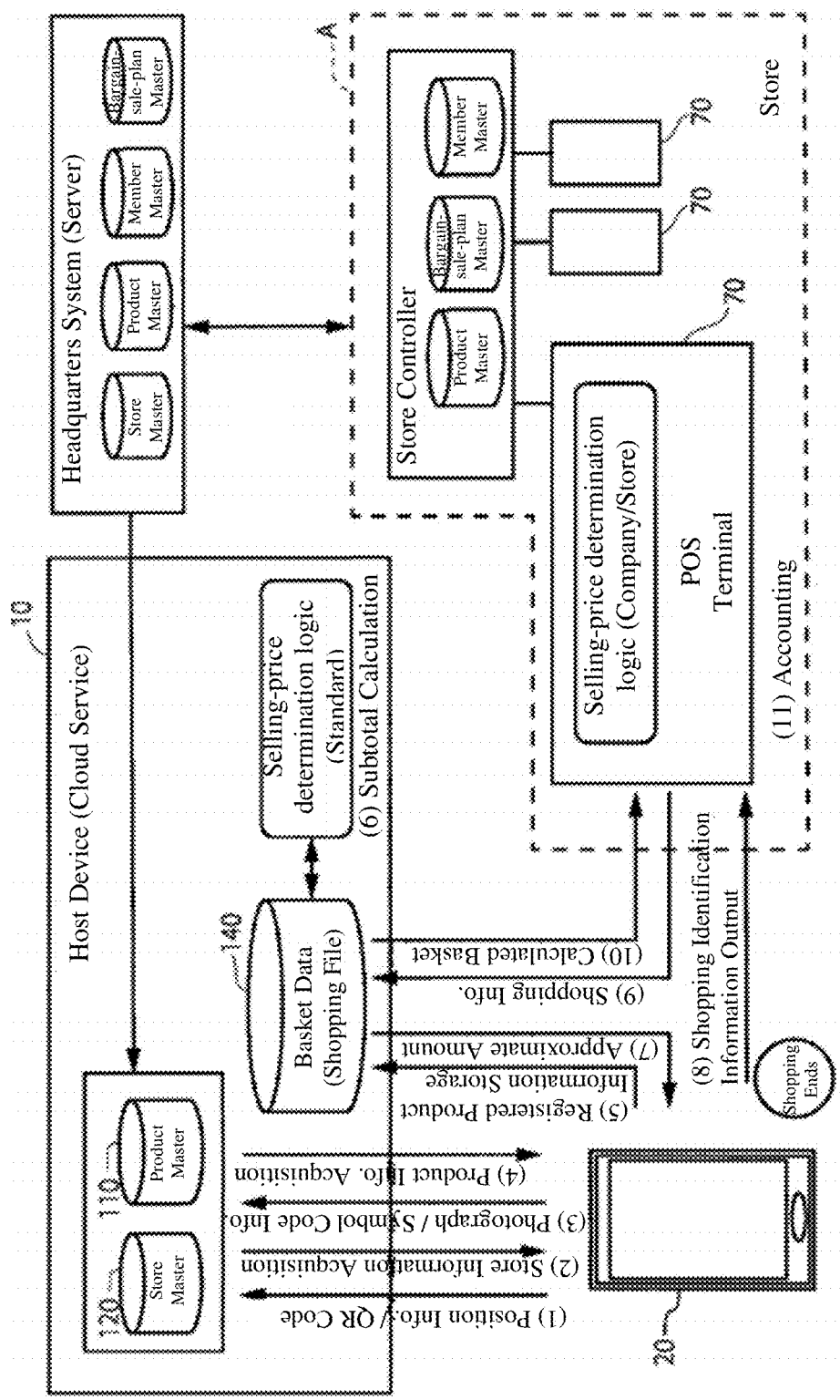
FIG. 7 shows an example of an introduction example of the sales-data processing system according to one or more embodiments.

The present example, illustrated in FIG. 7, is an example of performing accounting in, for example, the existing store illustrated in FIG. 4 by determining the selling price according to the selling-price determination logic of the POS terminal 70 of the store while using the selling-price determination logic provided by the sales-data processing system. The present example confirms a settlement amount by, for example, Selling-Price Determination Logic (Company/Store) set in the existing store. In contrast, Selling-Price Determination Logic (Standard) of the sales-data processing system provides an approximate amount during shopping to the mobile terminal.

The present example provides the sales-data processing system to the existing store illustrated in FIG. 4 as a cloud service. In the present example, the mobile terminal 20 communicates with the host device 10 disposed in the cloud service. In the present example, the existing settlement device (POS terminal) 70 is modified to be able to communicate with the host device 10 of the sales-data processing system. In the present example, by modifying the existing settlement device (POS terminal) 70 to be able to communicate with the host device 10 of the sales-data processing system and introducing an application for, for example, reading the QR code (registered trademark) of the mobile terminal 20, a sales-data processing system compatible with the product registration process by the mobile terminal 20 is constructed.

In the example illustrated in FIG. 7, Selling-Price Determination Logic (Standard) set in the host device 10 of the sales-data processing system does not match Selling-Price Determination Logic (Company/Store) set in the existing store. As such, an accurate total amount cannot be displayed on the mobile terminal 20. However, the approximate amount calculated according to Price Determination Logic (Standard) set in the host device 10 can be displayed on the display of the mobile terminal 20, and this can serve as an approximate indicator of shopping.

The selling-price determination logic set in the existing store and the selling-price determination logic provided by the sales-data processing system are not limited to Selling-Price Determination Logic (Company/Store) and Selling-Price Determination Logic (Standard).

A flow of processes in the present example is similar to that of the above newly disposed sales-data processing system illustrated in FIG. 4 other than the selling-price determination logic whereby subtotal calculation is performed at (6) differing from the selling-price determination logic of the store, the total amount transmitted at (7) therefore being an approximate amount, and the POS terminal 70 in (8), (9), (10), and (11) being the POS terminal disposed in the existing store. As such, description of this flow of processes is omitted.

—Example of Introducing Sales-Data Processing System in Existing Store (Part 3)—

Figure 8:
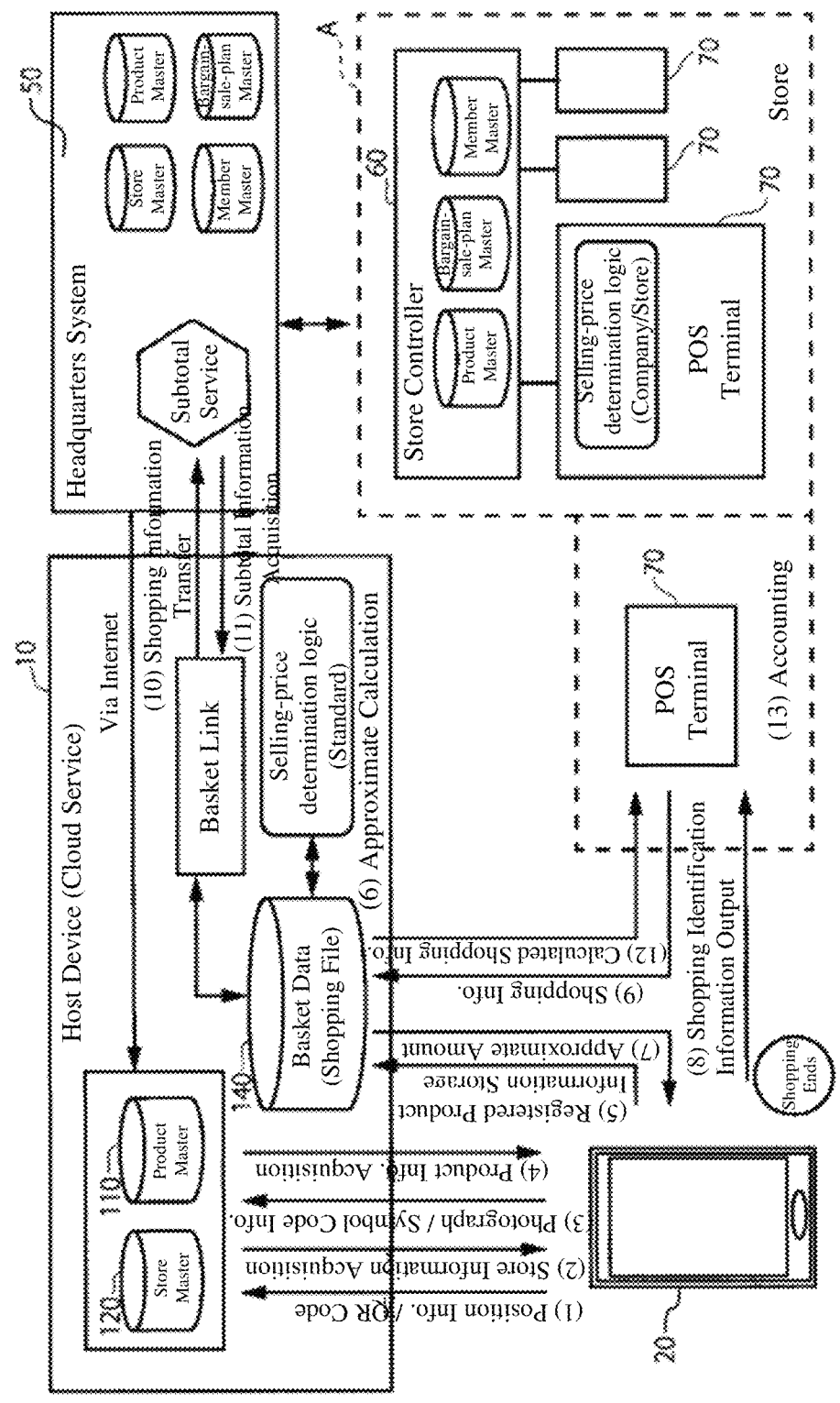
FIG. 8 shows an example of an introduction example of the sales-data processing system according to one or more embodiments.

The present example, illustrated in FIG. 8, is an example of performing accounting in, for example, the existing store illustrated in FIG. 4 by a newly disposed POS terminal 70 instead of the existing POS terminal while causing the headquarters system (server), the store controller, or the like to perform a subtotaling service of determining the selling price according to Selling-Price Determination Logic (Company/Store) of the store. In the present example, a program of the POS terminal does not need to be renovated.

The present example provides the sales-data processing system to the existing store illustrated in FIG. 3 as a cloud service. In the present example, the mobile terminal 20 communicates with the host device 10 disposed in the cloud service. In the present example, a sales-data processing system compatible with the product registration process by the mobile terminal 20 is constructed by imparting to the host device (cloud service) 10 a basket linking function of transferring the shopping information stored in the shopping file to the subtotaling service of the headquarters system (server), the store controller, or the like and a function of updating the information of the shopping file according to a result calculated by the subtotaling service. As necessary, a function is imparted of performing data conversion at, for example, a time of transferring the information.

In the present example illustrated in FIG. 8, subtotal calculation is performed by the subtotaling service of the headquarters system or the like of the existing store. As such, selling-price determination according to the selling-price determination logic of the existing POS terminal 70 is unnecessary. Therefore, the new POS terminal 70 can perform accounting even without a network connection or the like to the existing POS terminal 70. Data such as a sales record can be managed by being transmitted to the headquarters system (server) 50, the store controller 60, and the host device (cloud service) 10, respectively.

In the present example as well, Selling-Price Determination Logic (Standard) set in the host device 10 of the sales-data processing system does not match Selling-Price Determination Logic (Company/Store) set in the existing store. As such, an accurate total amount cannot be displayed on the mobile terminal 20. However, the approximate amount calculated according to Selling-Price Determination Logic (Standard) set in the host device 10 can be displayed on the display of the mobile terminal 20, and this can serve as an approximate indicator of shopping.

The selling-price determination logic set in the existing store and the selling-price determination logic provided by the sales-data processing system are not limited to Selling-Price Determination Logic (Company/Store) and Selling-Price Determination Logic (Standard).

One example of a flow of processes in the present example is briefly described below. The parenthetical numbers in the description indicate processes in FIG. 8.

In the sales-data processing system of the present example, steps (1) to (5) are identical to (1) to (5) illustrated in FIG. 4 and are thus omitted.

(6) The host device 10 calculates the approximate amount according to Selling-Price Determination Logic (Standard) for the registered product information stored in the shopping file.

(7) The host device 10 transmits the calculated approximate amount to the mobile terminal 20.

This enables the member to continue shopping while viewing a current approximate amount during shopping.

(8) When the member ends shopping, the mobile terminal 20 outputs the shopping identification information, which identifies this shopping of the member (shopping file, basket data), to the POS terminal 70. For example, the member ends shopping, the symbol-code information such as the QR code (registered trademark) storing the shopping identification information identifying this shopping of the member is displayed on the display of the mobile terminal 20, and the input unit of the POS terminal 70 reads this symbol-code information. By this, the mobile terminal 20 outputs the shopping identification information identifying this shopping of the member to the POS terminal 70.

(9) Upon being input with the shopping identification information, the POS terminal 70 transmits the shopping identification information to the host device 10, thereby requesting shopping information (such as the registered product information) associated with this shopping identification information from the host device 10.

(10) Upon receiving the shopping identification information from the POS terminal 70, the host device 10 transmits the shopping information (the total amount not yet being calculated) associated with the shopping identification information to the subtotaling service of the headquarters system 50 or the like.

(11) Upon receiving the shopping information, the headquarters system 50 calculates the total amount according to the subtotaling service and transmits the shopping information (the total amount having been calculated) as subtotal information to the host device 10.

(12) Upon receiving the shopping information (subtotal information), the host device 10 updates the shopping information stored in the shopping file based on the received shopping information and transmits the received shopping information to the POS terminal 70.

(13) Upon receiving the shopping information, the POS terminal 70 displays the settlement screen based on the received shopping information. By the member performing payment according to the settlement screen, one transaction using the mobile terminal 20 is completed.

The above is the flow of processes in the present example.

As above, the sales-data processing system according to one or more embodiments is not limited to a specific form. That is, the sales-data processing system according to one or more embodiments can be a system made of a host device 10 and mobile terminal 20 that can be subsequently linked to a product sales system of a store, an overall system made by linking a host device 10 and a mobile terminal 20 to a product sales system of a store, a system that configures a host device 10 using a store controller 60 of a product sales system of a store and directly links a mobile terminal 20 to the store controller 60 or a POS terminal 70 in the store, or another system of performing a product transaction based on product information subjected to a registration process by a mobile terminal 20.

The product registration process performed by the mobile terminal 20 will be described below. However, this is one example; the mobile terminal 20 may function as a simple interface for the product registration process, and other processes may be executed by a host system such as the host device 10. That is, which device constituting the sales-data processing system performs which process may be set as appropriate.

—Host Device 10—

The host device 10 of the sales-data processing system 1 according to one or more embodiments includes the storage for storing the product master 110, the store master 120, the member master 130, the shopping file 140, and the like. The product master 110, the store master 120, and the like of the host device 10 are updated based on the information of each master stored in the store controller 60 of the store.

The product master 110 stores the product information, the store identification information, and the like in association with the product identification information specific to each product. For example, according to the information stored in the product master, product information can be specified from the product identification information, and information on a product carried at this store can be specified from the store identification information. The information stored in the product master 110 is not limited to the above product information and store identification information.

Furthermore, the product master 110 stores sales conditions (plan number) in association with product identification information such as that illustrated in FIG. 28A. Moreover, as illustrated in FIG. 28B for example, the product master 110 stores price-cut-type information, product identification information of an eligible product, price-cut establishment conditions (establishment count), a content of the price cut or the like when the establishment conditions are established (content 1 of price cut or the like, content 2 of price cut or the like), and the like in association with the sales conditions (plan number). The sales conditions (plan number), the price-cut-type information, the product identification information of the eligible product, the price-cut establishment conditions (establishment count), the content of the price cut or the like, and the like are also referred to as a bargain-sale table. The sales conditions are sales conditions set for each product and include, for example, bulk price-cut information whereby, for example, a discounted price is applied by purchasing a plurality of loosely sold products such as vegetables together; item limit information whereby a number of items that can be purchased per customer is set; and information indicating that a product is a variable-weight product whose content and price vary across individual packs, such as a packaged product such as meat set with a price per gram. The above bulk price-cut information is not limited to loosely sold products such as vegetables and can also be set for products such as canned foods and instant ramen. The information stored in the product master 110 is not limited to the above product information, store identification information, and sales conditions.

As illustrated in FIG. 3B for example, the store master 120 stores the store identification information, the store name, position information such as GPS information of the store, and QR code (registered trademark) information indicating the store in association. The information stored in the store master 120 enables, for example, a nearby store to be specified from the position information.

As illustrated in FIG. 3C for example, the member master 130 stores the member identification information and member information such as a member name (such as a name, address, and credit-card number) in association. The information stored in the member master 130 enables, for example, information on a store and credit card the member uses to be specified from the member identification information.

As illustrated in FIG. 3C, the member master 130 may store information such as a usage count of the member using the mobile terminal 20 in the past to perform product registration and an erroneous-operation count such as a deletion (cancellation) count of a registered product at the time of product registration. It may also store, for example, a level of the member (member level) determined by this usage count or erroneous-operation count. For example, levels such as a beginner level (L1) to a preferred member (L5) may be set (prepared) as member levels, and the host device 10 may determine the member level based on at least one among the above usage count, the above erroneous-operation count, a usage frequency based on the above usage count, and an erroneous-operation frequency based on the above usage count or the above erroneous-operation count and store this in the member master 130. The member level may also be referred to as an operation level. Moreover, within the member level, a level of erroneous operations in particular (portion based on erroneous-operation count, erroneous-operation frequency) may also be referred to as the operation level.

The shopping file 140 is the file that stores the registration information registered by the mobile terminal 20 during member shopping. As illustrated in FIG. 3D for example, the shopping file 140 stores, as the shopping information, the shopping identification information identifying the shopping of the member and the registered product information (such as barcode information, product name, and price) subjected to product registration in this shopping in association. As above, the shopping identification information may be configured by combining the store identification information, the date, the serial number, and the like or be path information.

As illustrated in FIG. 3D, the shopping file 140 may store information on a deferred product for which the mobile terminal 20 was unable to perform product registration during shopping and may store cancellation-operation information relating to a cancellation (cancellation) operation of product registration performed by the member at the time of the product registration operation.

The shopping information stored in the shopping file 140 is synchronized with the product registration information in the mobile terminal 20. The member changing or deleting, during shopping, a quantity of the registration information registered by the mobile terminal 20 causes the shopping information of the shopping file 140 to also be changed or deleted. Moreover, at settlement, by the member outputting the shopping identification information from the mobile terminal 20 to the POS terminal 70, the POS terminal 70, by transmitting the shopping identification information to the host device 10, requests from the host device 10 the shopping information (such as the registered product information) associated with this shopping identification information. The host device 10 transmits the requested shopping information (such as the registered product information) to the POS terminal 70.

When the settlement process of one transaction is completed, the host device 10 stores the shopping information of this one transaction in the shopping file 140 as settled shopping information. The member can use the mobile terminal 20 to access the shopping file 140 and refer to a history of past purchases. The shopping file 140 is synchronized with a shopping file stored in the store controller 60 of the store and may also store information on shopping performed by the member without using the mobile terminal 20. Doing so enables the member to refer to a history of all past shopping in the store.

Furthermore, the shopping file 140 may store a past history and a file currently being registered in separate storage regions. When current shopping is ended (for example, when a transaction is completed), content stored as being registered may be added to the past history file.

Furthermore, the host device 10 supplies an application program (shopping application) that operates on the mobile terminal 20. The shopping application may be provided from an internet site providing the application of the mobile terminal 20.

—Mobile Terminal 20—

The mobile terminal 20 of the sales-data processing system 1 according to one or more embodiments is described with reference to the flowchart illustrated in FIG. 10 and the screen display examples illustrated in FIG. 12 to FIG. 15. The mobile terminal 20 is described as one example of an individually owned smartphone of the customer whereon the dedicated application supplied from the host device 10 or the like is installed.

(Advance Preparation)

To use the smartphone had by the customer as the mobile terminal 20 that can perform the registration process in the store, the customer performs member registration to become an entity able to perform the registration process by a smartphone ("member" hereinbelow).

When newly registering a member, personal identification information, such as a name, address, phone number, and email address, and credit-card information of the member may be registered. The registration process can be performed online or off-line. For example, required items can be input on a store registration form or a tablet, and the dedicated application can be downloaded by notifying a download URL to the registered email address. Moreover, for example, the dedicated application may be downloaded and introduced from the host device 10, and afterward, a member registration screen may be started to perform the registration procedure. This may be provided from the internet site providing the application of the mobile terminal 20.

When the customer is already a store card holder, the member registration process can complete member registration by, for example, additionally registering only the credit-card information. The registered information is not limited to the above. For example, when the store is a chain store, store-specific information can be delivered by registering information on, for example, a store that is regularly used. The host device 10 stores the registered member information in the member master 130.

An operation history in the member master 130 may be used at a store other than the registered store. That is, conditions, thresholds, and the like for displaying an employee confirmation screen on the settlement device according to the operation level of the member, which is based on the operation history, can also be used at a store other than the registered store. Considering how the configuration of the host device 10 is used at a plurality of companies, not only a company group but also the plurality of companies may use the operation history. Moreover, a rank setting of the member level and the operation level of the member, conditions of generating an employee confirmation event, and the like can be freely set at each company group and each store. Moreover, the conditions may be received when acquiring the shopping file (basket data), and the settlement device may control generation of the employee confirmation event.

(Store Specification Process)

Figure 10:
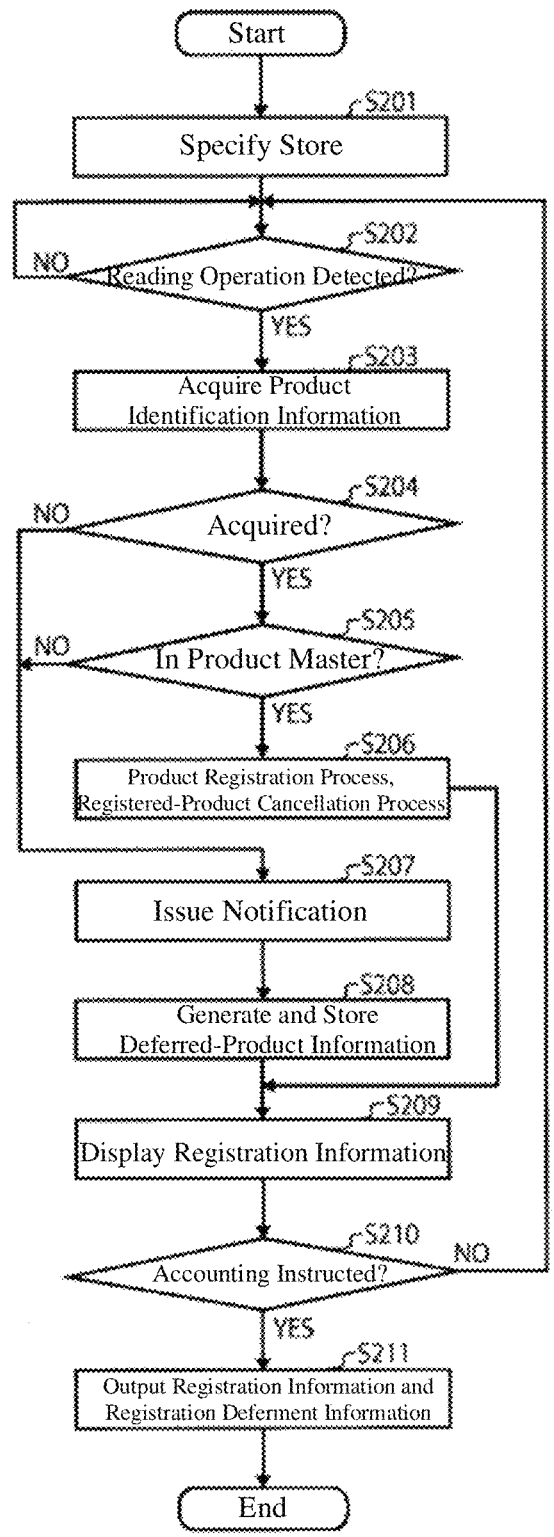
FIG. 10 shows an example of a processing flow in a mobile terminal of the sales-data processing system according to one or more embodiments.

The mobile terminal 20 executes a process of specifying a store (step S201 in FIG. 10). That is, the mobile terminal 20 is made to function as a registration device that registers a product in one store; it executes a process of specifying in which store this mobile terminal 20 is to function as a registration device that registers a product. The mobile terminal 20 executes the above process of specifying a store when the member starts the dedicated application of the mobile terminal 20.

For example, when the member starts the dedicated application of the mobile terminal 20, the mobile terminal 20 may specify a store based on the position information acquired from the GPS or the like of the mobile terminal 20. For example, the mobile terminal 20 transmits the position information to the host device 10. Then, upon receiving the position information, the host device 10 transmits information on a store having the closest position information to the mobile terminal 20 based on the store master 120. The mobile terminal 20 specifies the store by receiving the store information. When there is a plurality of such stores, the mobile terminal 20 may display a selection screen on the display so the member can make a selection from this plurality of stores.

Furthermore, a QR code (registered trademark) storing the QR code (registered trademark) information stored in the store master 120 may be posted (affixed or the like) at the store entrance, and the mobile terminal 20 may specify the store by the member reading this QR code (registered trademark) by the mobile terminal 20. This method is effective when, for example, no position information can be acquired; when no position information can be acquired, a display such as "Please read the store QR code (registered trademark)." may be performed on a display screen of the mobile terminal 20. Moreover, the store may be specified by the member entering the store, using near field communication such as Wi-Fi, Bluetooth (registered trademark), or a beacon in the store. That is, a store specification method is not limited in any way.

When the store is specified, the host device 10 permits the mobile terminal 20 to access the product master of this store and generates basket data (shopping file) in association with this mobile terminal 20 (or this member).

Furthermore, as an aspect of specifying a store without using position information instead of an aspect of specifying a store using position information (when information on a plurality of stores is received from the host device 10), the mobile terminal 20 may display on the display the selection screen whereby a store is selected and, by the member selecting a store from the selection screen, specify this selected store as the store wherein shopping is to take place. The mobile terminal 20 may be made to notify information such as "bargain-sale information", "related and alternative products", "new products", and "out-of-stock information" for this store when the member enters the store and, when the specified store is closed due to, for example, being regularly closed on a certain day, display as much on the display. Moreover, during hours when this store is closed, the mobile terminal 20 may prohibit transitioning to a registration screen. Registration by the application may be prohibited starting from a predetermined time before store closing, and a customer in the middle of registration may, for example, be notified of the store closing time. However, the customer in the middle of registration can continue shopping, and even when the store closing time arrives, registration does not need to be prohibited. Continuation is enabled as long as they are within a range of position specification for this store. It is also possible to, for example, issue notifications in stages to prompt performing settlement.

When a store is specified, the mobile terminal 20 displays on the display a start screen 800 (FIG. 12A) for starting shopping. Keys linked to point information 800a of the member, store information 800b of the specified store, a notice 800c such as bargain-sale information, coupon information 800d, and the like are disposed on the start screen 800. Moreover, a "start" key 800e to declare starting product registration in the store is disposed. The keys disposed on the screen may also be referred to as icons, buttons, or the like.

Figure 12A:
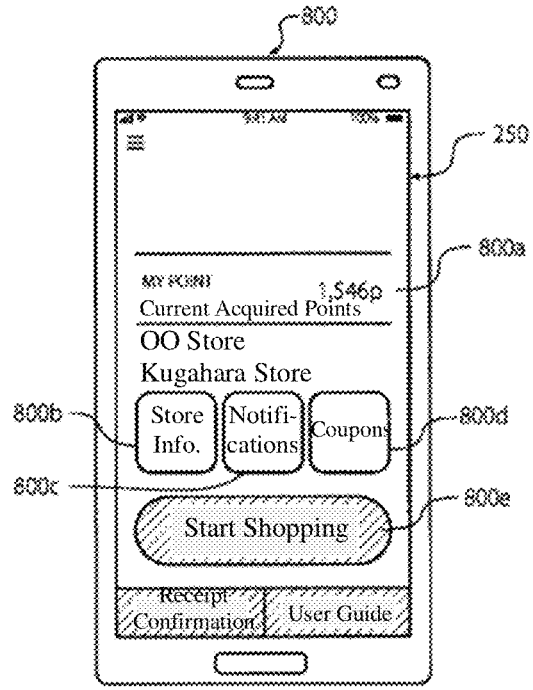
FIG. 12A shows an example of a screen of the mobile terminal of the sales-data processing system according to one or more embodiments.
Figure 12B:
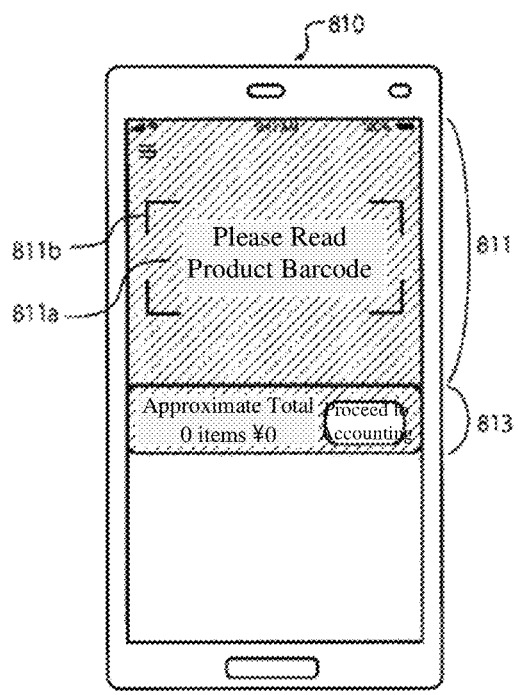
FIG. 12B shows an example of a screen of the mobile terminal of the sales-data processing system according to one or more embodiments.

Then, by the member operating the "start" key 800e of the start screen 800, the mobile terminal 20 displays a registration screen 810 (FIG. 12B). The mobile terminal 20 may immediately display the registration screen 810 due to a store being specified, without displaying the start screen 800.

The registration screen 810 illustrated in FIG. 12B is divided into two regions, upper and lower. The upper region of the registration screen 810 is a first display region 811 that displays photographic data being photographed by the camera (input unit) of the mobile terminal 20. The mobile terminal 20 performs a display 811a of "Please read the product barcode" in the first display region 811 of the registration screen 810 and visibly displays a marker 811b indicating a reading range for recognizing the barcode (product identification information). This completes preparation for product registration.

(Reading-Operation Detection Process and Product-Information Acquisition Process)

The mobile terminal 20 determines whether a reading operation of code information is detected (step S202). That is, the mobile terminal 20 determines whether the member performed an operation of reading code information provided on the product. If it does not determine that a reading operation of the code information is detected (step S202: NO), the mobile terminal 20 repeats this determination. If it determines that a reading operation of the code information is detected (step S202: YES), the mobile terminal 20 acquires the product identification information of the product from the read code information or the like (step S203).

Figure 13A:
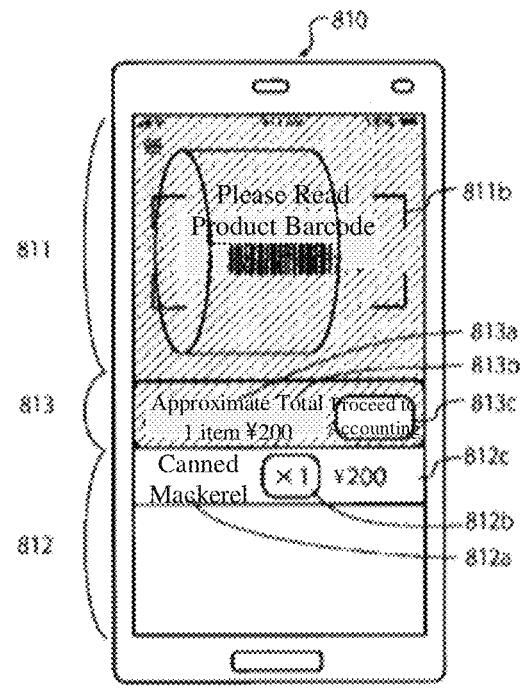
FIG. 13A shows an example of a screen of the mobile terminal of the sales-data processing system according to one or more embodiments.

When removing the product to be purchased from a display shelf and placing it in a shopping basket (basket), the member photographs the product using the input unit of the mobile terminal 20. As illustrated in FIG. 13A, by framing the barcode (code information) provided on the product in a region of the marker 811b displayed in the first display region 811 of the registration screen 810, the mobile terminal 20 automatically recognizes that the subject is a barcode and acquires the product identification information stored in the barcode.

When the mobile terminal 20 includes a distance sensor, the mobile terminal 20 can detect the reading operation of the code information by the member by detecting that the input unit of the mobile terminal 20 was brought close to an article for a certain amount of time. Moreover, when, for example, the mobile terminal 20 is continuously automatically repeating barcode recognition and is not provided with a distance sensor or the like, it may be made to detect that the member is performing the reading operation of the code information by, for example, detecting that the same image is being photographed for a predetermined amount of time. Similarly, when these detections are detected for a certain amount of time, a time-out process may be executed, a notification such as "Product registration was unsuccessful. Would you like to purchase this product? (Yes/No)" may be made, and a prompt may be issued to treat this as a deferred product. It is also possible to confirm purchasing.

Furthermore, instead of automatically recognizing the code information such as the barcode to acquire the product identification information, the mobile terminal 20 may acquire the product identification information from code information photographed by a shutter operation or the like while the application is running. In this situation, detecting that the shutter operation was performed in the application enables an acquisition operation of the code information to be detected and the product identification information to be acquired. Moreover, the reading operation (operation) may be detected by using a gyro sensor or the like to monitor a tilt or other state of the mobile terminal. The detection may be performed using a predetermined distance, tilt, and the like of the product in combination.

When the product barcode (product identification information) was unable to be recognized by the initial photographing, the member may set aside this product as a deferred product and proceed to perform the registration process for the next product. At this time, it is sufficient for the member to photograph and keep an image of the product made to be a deferred product. The member keeping an image of the deferred product facilitates product specification at the subsequent settlement process and facilitates employee correction of the product registration information. For example, a situation is also conceivable wherein a process of prompting treatment as a deferred product as in the above time-out process is not executed. In such a situation, the member needs to continue to attempt to perform product registration, which is inconvenient. In such a situation, processing may be made able to proceed by the member determining to switch from normal product registration to treatment as a deferred product. At this time, a "deferred-product registration" button may be displayed on, for example, the registration screen or a setting screen, and pressing this button may cause switching to a photographing mode of manually releasing the shutter. In this photographing mode, a front packaging of the product unable to be registered (deferred product), the product barcode thereof, a shelf price tag, or the like may be photographed by releasing the shutter according to the member's own timing, and this may be stored as information relating to the deferred product. The manual photographing mode may also be able to be switched to as determined by the member.

A method of detecting the reading operation of the barcode (code information) is not limited in particular.

If no product identification information was able to be acquired despite a reading operation being detected (step S204: NO), the mobile terminal 20 determines that registration of the product information failed and notifies that product registration cannot be performed (step S207).

For example, there are products (unreadable products) for which a portion or an entirety of the information recorded in the barcode cannot be read due to, for example, the barcode provided on the product being damaged or the barcode being distorted because of, for example, how the product is packaged. Moreover, the member may have photographed an area of the product wherein no barcode is provided. In such a situation, the product identification information cannot be acquired by reading the code information or the like. As a result, the product cannot be registered. At step S204, it is detected by the non-acquisition of the product identification information that the product cannot be registered.

If the product identification information was able to be acquired (step S204: YES), the mobile terminal 20 determines whether the acquired product identification information is present in the product master (step S205). If it is determined that the acquired product identification information is not present in the product master (step S205: NO), it is determined that registration of the product information failed, and it is notified that the product cannot be registered (step S207).

For example, for a product for which the product identification information recorded in the code information is acquired and transmitted to the host device 10 but the acquired product identification information is not stored in the product master 110 (non-filed product) or when there is a connection error with the host device 10, the product information cannot be acquired from the host device 10. As a result, the product cannot be registered. At step S205, it is detected by the product being the above non-filed product or the like that the product cannot be registered.

When, for example, the mobile terminal 20 is continuously automatically repeating barcode recognition and is not provided with a distance sensor or other function of detecting the reading operation, the processes of step S202 and step S204 above may be omitted.

(Product Registration Process, Registered-Product Cancellation Process)

If it is determined that the acquired product identification information is present in the product master (step S205: YES), the mobile terminal 20 executes a settlement registration process (step S206). When the acquired product identification information is present in the product master at step S205 and the product information associated with the product identification information was able to be acquired, the mobile terminal 20 registers this as the registered product information of the product to be purchased by the customer. The registered product information registered in the mobile terminal 20 is also stored in the shopping file 140. Moreover, in acquiring the product information, it is sufficient to reference the product master 110 stored in the host device 10. However, by downloading the product master after the mobile terminal 20 specifies the store, it is also possible to acquire the product information and register the registered product information of the product using the mobile terminal 20 alone. Moreover, the referenced product master may be a product master stored in the store controller 60 or the POS terminal 70.

(Display Process)

After product registration, the mobile terminal 20 displays the registration information (step S209). As illustrated in FIG. 13A, when the product is registered, the mobile terminal 20 displays in the lower region of the registration screen 810 a second display region 812 displaying the registered product information and a third display region 813 displaying a current registration status.

The mobile terminal 20 displays product information 812a such as the product name, a purchase quantity (operator) 812b, and a product price 812c in the second display region 812 and displays a current number of registered items 813a, an approximate total 813b, and an "accounting" key 813c for proceeding to an accounting process based on this registration information in the third display region 813.

Furthermore, the mobile terminal 20 disposes the third display region 813 in a position above the second display region 812—that is, between the first display region 811 and the second display region 812. This enables the member to smoothly view changes in the approximate total during product registration. As illustrated in FIG. 12B, the mobile terminal 20 may display 0 items as the number of registered items and 0 yen as the approximate total in the third display region 813 before product registration is performed.

The third display region 813 may be disposed independently from the first display region 811 and the second display region 812 but may also be disposed within a range of the second display region 812. Moreover, as for the approximate total displayed in the third display region 813, a current, accurate total amount may be displayed as the selling price of the product. However, when, for example, the sales-data processing system is introduced in an existing store set with a complex price determination logic, accurate subtotal calculation according to the price determination logic of the store cannot be performed unless the registered product information is output to an existing POS terminal or other settlement device 70. As such, in such a situation, an approximate total calculated by, for example, totaling list prices or the like of each product may be displayed in the third display region 813 of the mobile terminal 20. By the third display region 813 being displayed on the registration screen 810 of the mobile terminal 20, the member can grasp a current number of products purchased and an approximate total while performing product registration. The mobile terminal 20 according to one or more embodiments displays the third display region 813 in a position above the second display region 812—that is, between the first display region 811 and the second display region 812. This enables the member to smoothly view changes in the approximate total during product registration.

Figure 14A:
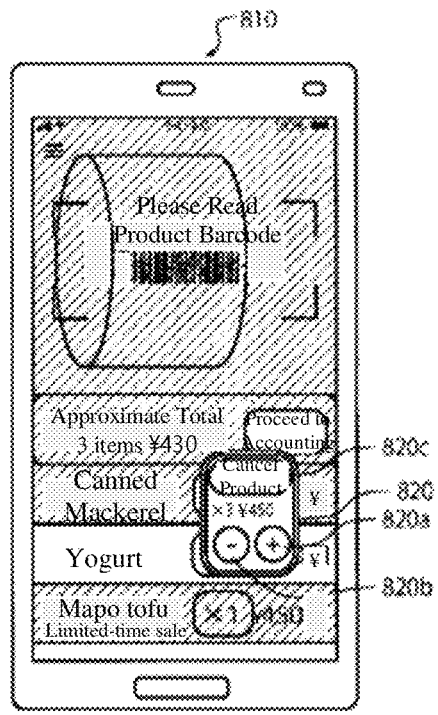
FIG. 14A shows an example of a screen of the mobile terminal of the sales-data processing system according to one or more embodiments.

The member can change the product purchase quantity 812b and delete the registered product information of the product being displayed in the second display region 812. For example, by the member touching a purchase-quantity 812b portion displayed in the second display region 812, as illustrated in FIG. 14A, the mobile terminal 20 displays a quantity changing screen (pop-up) 820 for changing the quantity of this product.

Figure 14B:
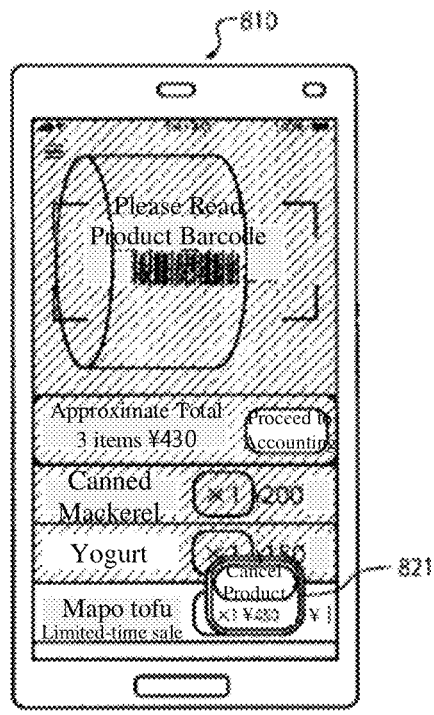
FIG. 14B shows an example of a screen of the mobile terminal of the sales-data processing system according to one or more embodiments.

The quantity changing screen 820 displays the current purchase count and price and is disposed with a "+" key 820a and "−" key 820b that change the product count and a "product cancellation" key 820c that deletes the registered product registration information. Note when the registered product is a limited-quantity product such as a clearance item or a variable-weight product, as illustrated in FIG. 14B, the mobile terminal 20 may display a pop-up 821 not disposed with the "+" key 820a and "−" key 820b that change the product count.

Then, when the quantity or the like of the registered product information displayed on the registration screen 810 is changed by the member operating the above "+" key 820a and "−" key 820b, the mobile terminal 20 changes the purchase quantity 812b of this product displayed on the registration screen 810. Then, the mobile terminal 20 outputs the changed registered product information to the host device 10, and the host device 10 updates the registration information stored in the shopping file 140 using the input registered product information.

Furthermore, when the registered product information displayed on the registration screen 810 is deleted by the member operating the "product cancellation" key 820c, the mobile terminal 20 cancels (cancels) registration of the registered product information displayed on the registration screen 810. Then, the mobile terminal 20 outputs to the host device 10 concerning the registered product information for which registration is canceled (deleted), and the host device 10 updates the registration information stored in the shopping file 140.

When the member cancels the registered product information, the mobile terminal 20 may issue a notification to return this product to the display shelf or the like. At this time, when a position of the member in the store can be specified, the mobile terminal 20 may detect whether the product for which the registered product information was canceled is separated from the shelf it is to be returned to by no less than a certain distance and display a screen for selecting between a process of returning the product to the shelf or a process of transferring this to a deferment basket.

Then, when the member cancels registration of the registered product information, the mobile terminal 20 may store the deleted product information of the product as canceled product information in association with information indicating that a cancellation operation was performed. When the process of transferring the product for which the registered product information was canceled to the deferment basket is performed, this may be stored as the canceled product information.

Furthermore, the mobile terminal 20 may delete the registered product information for which registration was canceled so it is not displayed on the registration screen 810. However, this may be displayed so it is understood that this has been canceled—for example, by drawing a cancellation line on the registration screen 810 or also indicating that this is a canceled product.

Furthermore, the mobile terminal 20 may output to the host device 10 the information indicating that the member performed the cancellation operation, and the host device 10 may store this as the cancellation-operation information in the shopping file 140. After the settlement process of this shopping is completed, the host device 10 may store, for example, a number of times the member performed the cancellation (cancellation) operation of the registered product information during this shopping in the member master 130.

(Notification Process)

If no product identification information was able to be acquired (step S204: NO) or it is determined that the acquired product identification information is not present in the product master (step S205: NO), the mobile terminal 20 notifies the member that the product cannot be registered (step S207).

Figure 13B:
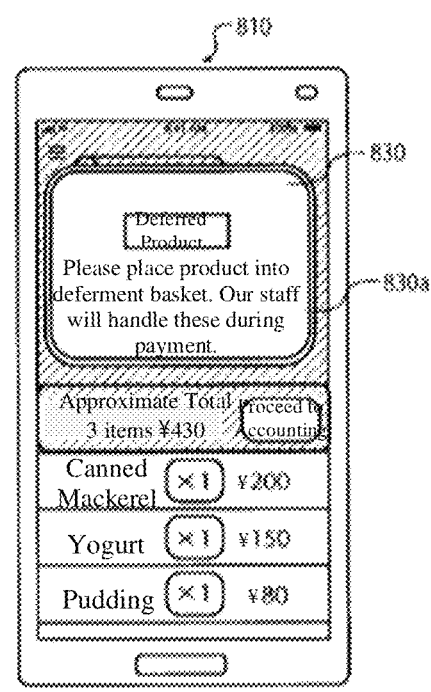
FIG. 13B shows an example of a screen of the mobile terminal of the sales-data processing system according to one or more embodiments.

For example, as illustrated in FIG. 13B, the mobile terminal 20 issues a notification (pop-up) 830 on the display that the product that cannot be registered will be made into a deferred product. At this time, a notification may be issued to treat a product that was able to be properly registered and a product that cannot be registered in different ways—for example, a display 830*a* prompting to place these products in separate baskets (or specified regions in a basket). The above notification that the product cannot be registered is not limited to a pop-up display of a message or the like.

When the deferred product is an unreadable product and the code information of this product is displayed on the display shelf of this product, the mobile terminal 20 may issue a notification to read the code information posted (affixed or the like) on the display shelf.

(Deferred-Product Information Generation Process)

The mobile terminal 20 generates deferred-product information for the product that cannot be registered (step S208). The deferred-product information may record, for example, the member identification information, the shopping identification information, a reading time, and the like. Preferably, it also stores, in combination, information on whether the deferred product is a non-filed product or an unreadable product. Moreover, it may store the photographic data from when the code information was photographed.

(Display Process)

Figure 15A:
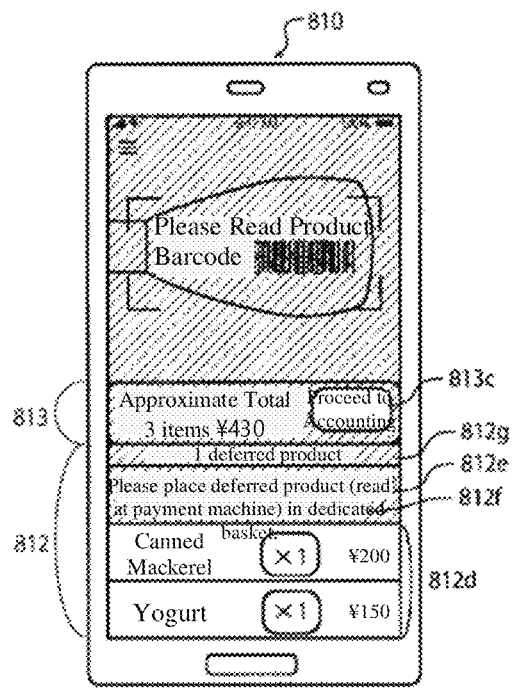
FIG. 15A shows an example of a screen of the mobile terminal of the sales-data processing system according to one or more embodiments.

Upon generating the deferred-product information, the mobile terminal 20 stores the generated deferred-product information and, as illustrated in FIG. 15A, displays in the second display region 812 of the registration screen 810, together with registered product information 812*d*, deferred-product information 812*e* indicating that there is a deferred product (step S209). The deferred-product information 812*e* displayed in the second display region 812 may be displayed in a different display aspect from the registered product information 812*d*. In the example illustrated in FIG. 15A, the mobile terminal 20 performs display by combining the deferred-product information 812*e* with two units of registered product information 812*d*, and a background color of the deferred-product information 812*e* is made to differ from the other background of the registered product information 812*d*.

Furthermore, the mobile terminal 20 may display a number of deferred products in a display field 812*g* in the second display region 812 and perform, in the deferred-product information 812*e*, a display 812*f* prompting performance of a process different from a normal registered product, such as "Please place the item in the dedicated basket", to notify the member of the presence of a deferred product and to handle the deferred product differently. In displaying this, whether this deferred product is a "non-filed product" or an "unreadable product" may be displayed. This display enables the employee to more rapidly respond to the customer.

Furthermore, operations of changing a quantity of and deleting the deferred-product information 812*e* displayed in the second display region 812 may be performed as well, as with a normal product. For example, when the member performs the reading operation repeatedly for code information of a product that cannot be registered, there is a possibility of a plurality of units of deferred-product information 812*e* being generated. In such a situation, the mobile terminal 20 may delete the deferred-product information 812*e* according to a member operation. The mobile terminal 20 may, as it does with the registered product information, output the deferred-product information and information relating to the cancellation operation of the deferred-product information to the host device 10. Then, the host device 10 may store the input deferred-product information and the like in the shopping file 140.

(Outputting of Registration Information)

The mobile terminal 20 determines whether the member instructed to proceed to accounting (step S210). If it determines that there was an instruction to proceed to accounting (step S210: YES), the mobile terminal 20 outputs the registration information and the like (step S211), and processing ends. The registration information and the like output by the mobile terminal 20 may be the shopping identification information. The registration information and the like may include the registered product information, for which product registration was able to be performed, and the deferred-product information, for which product registration was unable to be performed. It may also include the canceled product information, for which product registration was canceled.

Figure 15B:
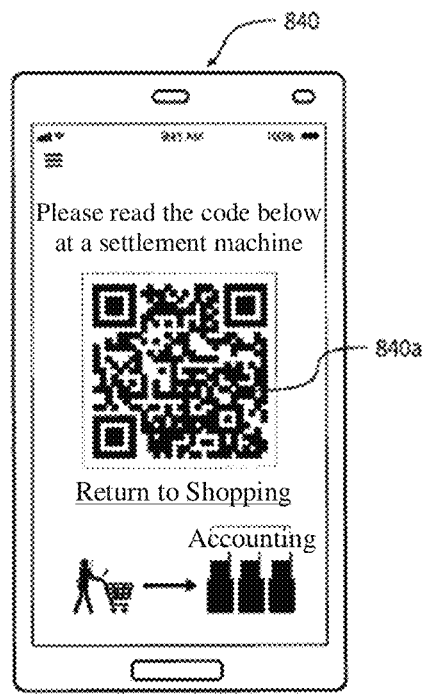
FIG. 15B shows an example of a screen of the mobile terminal of the sales-data processing system according to one or more embodiments.

For example, the mobile terminal 20 detects that the member has operated the "accounting" key 813*c* displayed on the registration screen 810 of the display. If it is detected that the "accounting" key 813*c* was operated, as illustrated in FIG. 15B, the mobile terminal 20 displays (outputs), for example, a QR code (registered trademark) 840*a* generated based on the shopping identification information on an output screen 840 (step S211). The mobile terminal 20 may display (output) on the output screen 840 a QR code (registered trademark) 840*a* generated based on the registration information stored in the shopping file.

The member causing the input unit of the POS terminal 70 to read the QR code (registered trademark) 840*a* displayed on the display of the mobile terminal 20 enables the POS terminal 70 to acquire in the host device 10 the registration information associated with the shopping identification information.

The symbol-code information such as the QR code (registered trademark) may store the registration information including the registered product information and the deferred-product information but may also store the shopping identification information associated with this registration information including the registered product information and the deferred-product information. For example, the shopping identification information may be path information such as a uniform resource locater (URL) where the shopping file is stored. Moreover, if a search destination of the shopping information is shared, it is sufficient for the shopping identification information to be a combination of any information among the store identification information, the member identification information, the date and time, and the like and to be identifiable by a sequence no. or the like. The search destination may be specified by a settlement-device side.

Furthermore, the mobile terminal 20 may, instead of outputting the symbol-code information storing the registration information, select a POS terminal 70 so the selected POS terminal 70 acquires registration information stored in a location other than the mobile terminal 20. For example, by the member causing the mobile terminal 20 to read a QR code (registered trademark) specifying a predetermined POS terminal 70 generated on a screen of the POS terminal 70, the mobile terminal 20 is made to transmit an accounting instruction together with the shopping identification information to the predetermined POS terminal 70. Then, the POS terminal 70 that receives the accounting instruction may be made to acquire the registration information associated with the shopping identification information. Registration information according to an IC reader may be acquired by setting a Felica (registered trademark) or NFC (near field communication) identifier of the mobile terminal in advance.

Meanwhile, if it determines that there was no instruction to proceed to accounting (step S210: No), the mobile terminal 20 returns to step S202 until an instruction to proceed to accounting is issued. The flow of processes in the mobile terminal 20 is described above.

—POS Terminal 70—

Next, the POS terminal (settlement device) 70 of the sales-data processing system 1 according to one or more embodiments is described with reference to the flowchart illustrated in FIG. 11 and the display examples illustrated in FIG. 18 to FIG. 24.

(Input Process)

The POS terminal (settlement device) 70 inputs the registration information (for example, the shopping identification information) output from the mobile terminal 20 or the like (step S701).

For example, by the member causing the input unit of the POS terminal 70 to read the QR code (registered trademark) 840*a* displayed (output) in the display of the mobile terminal 20, the POS terminal 70 inputs the registration information (such as the shopping identification information) stored in the QR code (registered trademark) 840*a*.

(Notification Process)

Upon inputting the registration information (such as the shopping identification information), the POS terminal 70 requests the shopping information associated with the shopping identification information from the host device 10 and determines whether the shopping information (registration information) received from the host device 10 includes deferred-product information or canceled product information (step S702). If it determines that deferred-product information is included (step S702: YES), the POS terminal 70 performs a notification of calling over the employee (employee call-over process) (step S703).

Figure 18:
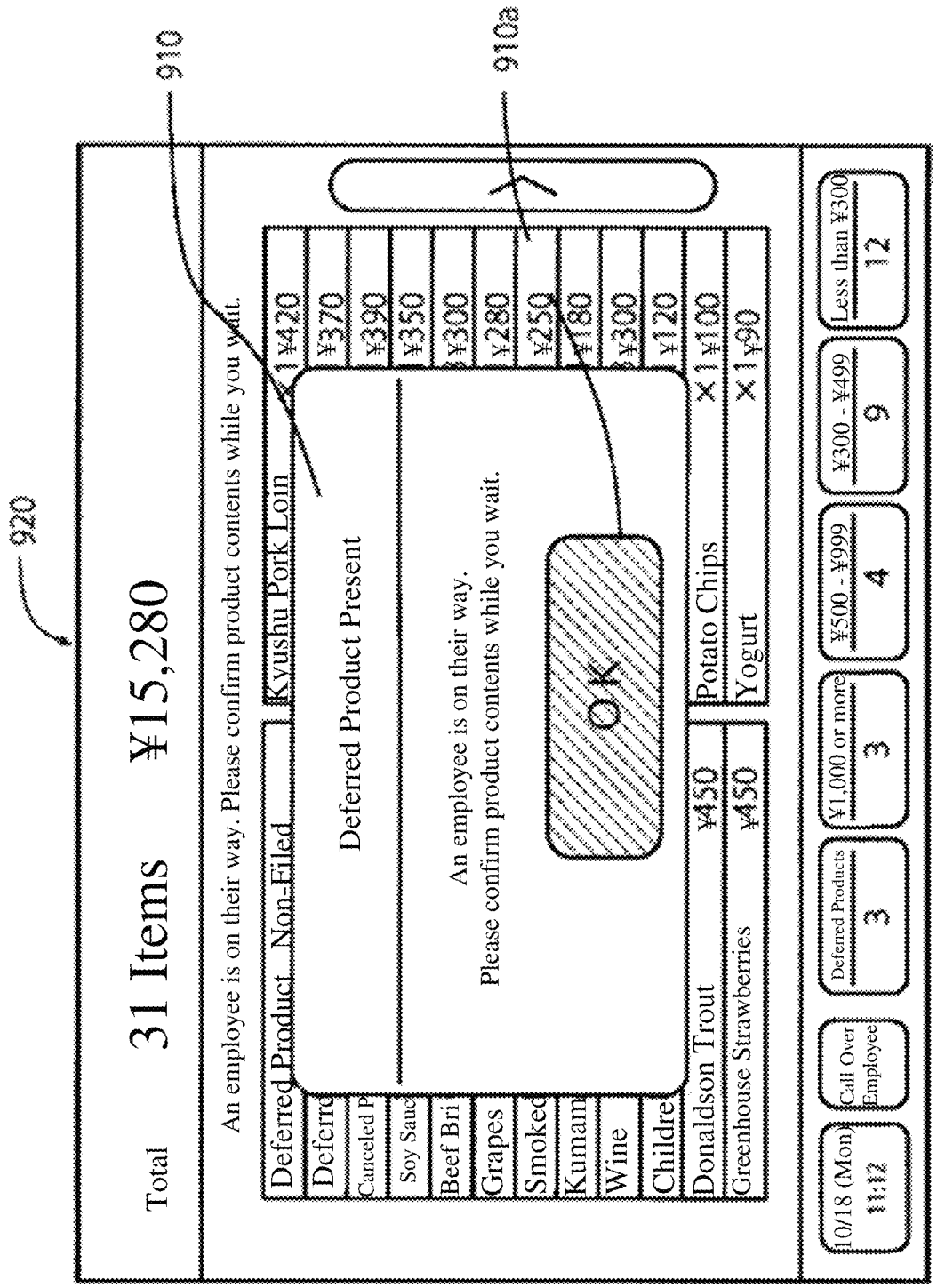
FIG. 18 shows an example of a screen of the POS terminal of the sales-data processing system according to one or more embodiments.

The POS terminal 70 performs the notification of calling over the employee by, for example, flashing a light (Patlite (registered trademark)) or the like that issues a visual notification from the POS terminal. A method of the notification of calling over the employee is not limited to a Patlite (registered trademark) and may be any method, such as an in-store broadcast; a notification to a POS register whereat the employee is normally stationed, a monitoring device that monitors a state of all POS, a managing device disposed in a back room or the like, or the like; or a notification to a mobile device had by the employee. Moreover, as illustrated in FIG. 18, the POS terminal 70 displays a pop-up 910 indicating that there is a deferred product among the registered products and that the employee is being called over.

Furthermore, the POS terminal 70 also performs the notification of calling over the employee (employee call-over process) (step S703) when it is determined that canceled product information is included (step S702: YES). That is, the POS terminal 70 may perform the notification of calling over the employee when the shopping information (registration information) received from the host device 10 includes deferred-product information or canceled product information. The POS terminal 70 may perform the notification of calling over the employee when it is determined that deferred-product information is included, regardless of whether canceled product information is included. Moreover, it may perform the notification of calling over the employee when it is determined that canceled product information is included, regardless of whether deferred-product information is included.

(Settlement Process)

Meanwhile, if it is determined that the shopping information (registration information) received from the host device 10 includes neither deferred-product information nor canceled product information (step S702: NO), the POS terminal 70 transitions to the settlement process. For example, as illustrated in FIG. 19, the POS terminal 70 displays a registration confirmation screen 900 (step S709).

The registration confirmation screen 900 illustrated in FIG. 19 displays a list of registered product information 900*a*, and an arrow 900*c* is displayed in a predetermined position of the registration confirmation screen 900. The member can scroll display of the list of registered product information 900*a* by operating the arrow 900*c*. Moreover, in an upper position of the registration confirmation screen 900, a total display field displaying the number of products purchased in this shopping and the total amount is disposed, and an "accounting" key 900*b* is displayed.

Furthermore, in a lower position of the registration confirmation screen 900, a price-range registration count display 900*d* indicating a product registration quantity according to price range is disposed. In the example illustrated in FIG. 19, the numbers "3", "4", "9", and "12", which are numbers of products, are respectively displayed for price ranges of "1,000 yen or more", "500 yen to 999 yen", "300 yen to 499 yen", and "300 yen or less". Displaying the registration quantity according to price range enables the employee to grasp an overview of the products purchased by the member. Moreover, when an expensive product is being purchased, this may be notified to a light (Patlite (registered trademark)), another device (monitoring device), a service manager, or the like, and the employee can assist with, for example, wrapping the expensive product.

Then, by the member operating the "accounting" key 900b displayed on the registration confirmation screen 900, the POS terminal 70 executes the settlement process according to the registration information displayed on the registration confirmation screen 900 (step S710). The transaction is then completed.

(Display Process of Registered Product Information and Deferred-Product Information)

Following step S703, by the member operating an "OK" key 910a of the pop-up 910, the POS terminal 70 displays a registration confirmation screen 920 displaying a list of the input registration information (registered product information and deferred-product information) (step S704).

In the example of the registration confirmation screen 920 illustrated in FIG. 20, a list of the registered product information 920a is displayed, and two units of deferred-product information 920b, 920c that were unable to be registered and one unit of canceled product information 920d for which registration was canceled are displayed together. At this time, the POS terminal 70 displays a display aspect of the registration confirmation screen 920 including the registered product information 920a; the deferred-product information 920b, 920c; and the canceled product information 920d illustrated in FIG. 20 in a display aspect that differs from a display aspect of the registration confirmation screen 900 displayed only by the registered product information illustrated in FIG. 19. For example, a different background color or other screen color may be displayed or a different character color or font may be displayed for the registration confirmation screen 920 including the deferred-product information 920b, 920c and the canceled product information 920d.

Furthermore, the POS terminal 70 may dispose the deferred-product information 920b, 920c and the canceled product information 920d in the leading position of the list of the registration information 920a. Display of the deferred-product information 920b, 920c and the canceled product information 920d is not limited to the example illustrated in FIG. 20. For example, the POS terminal 70 may dispose the deferred-product information 920b, 920c and the canceled product information 920d in a left region of the registration confirmation screen 920 and display the registered product information 920a in a right region. These displays enable the member or the employee to easily grasp, from the products displayed in list display, that there is a deferred product or a canceled product and to easily grasp this deferred product or canceled product.

Furthermore, the POS terminal 70 displays, in a lower position of the screen, a deferment-count display 920e indicating a quantity of deferred products (including canceled products) in addition to the price-range registration count display 900d indicating the product registration quantity according to price range. In the example illustrated in FIG. 20, "3" is displayed as the quantity of deferred products. The quantity may be displayed by including alcoholic beverages for which employee intervention is necessary for age verification and products such as class 2 OTC drugs that need to be explained by a registered salesperson or a pharmacist as deferred products, or these may be displayed by providing a separate display region. At this time, the applicable products may be displayed by changing a display aspect such as a background color or a character font or size or by imparting a mark or the like thereto.

(Prohibition Process)

Following step S704, the POS terminal 70 prohibits the settlement process according to the registration information including the deferred-product information 920b, 920c and the canceled product information 920d (step S705).

For example, as illustrated in FIG. 20, the POS terminal 70 prohibits execution of the settlement process by not displaying the "accounting" key 900b, which is displayed on the normal registration confirmation screen 900, on the registration confirmation screen 920 including the deferred-product information 920b, 920c or the canceled product information 920d.

(Editing Process)

Following step S705, the POS terminal 70 that prohibited execution of the settlement process executes a correction process of the deferred-product information according to a correction operation of the employee (step S706).

Figure 21:
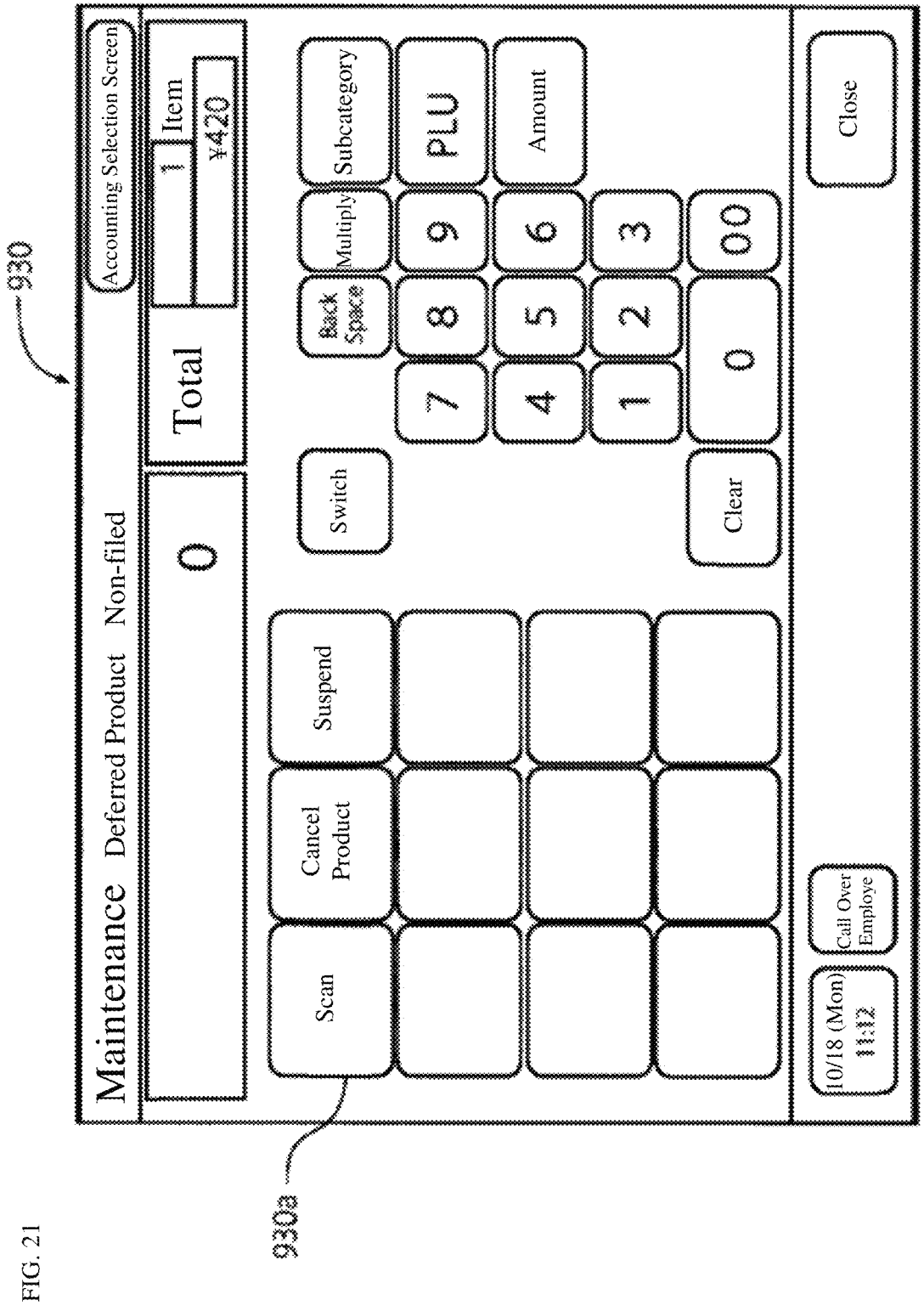
FIG. 21 shows an example of a screen of the POS terminal of the sales-data processing system according to one or more embodiments.

For example, by the employee touching the deferred-product information 920b in the registration confirmation screen 920, which is displayed on a display 750, as illustrated in FIG. 21, the POS terminal 70 displays on the display 750 an editing screen 930 for editing this deferred-product information 920b. The editing screen 930 is not limited to the example illustrated in FIG. 21. Moreover, the editing screen 930 may be displayed as a pop-up, and the editing screen 930 may be displayed in a partial region (for example, the left region) of the registration confirmation screen 920.

A scan button 930a is disposed in a predetermined position in the editing screen 930. By the employee operating the scan button 930a, the POS terminal 70 displays image data from when the code information of the product was read. The employee can confirm the deferred product by viewing the displayed image data and can find the correct product information by, for example, going to the display shelf to confirm the price of the product. It is sufficient to perform editing on the editing screen 930 in an appropriate method.

If all deferred products are displayed in a list on this editing screen 930, a number of times of going back and forth between the registration confirmation screen 920 and the editing screen 930 can be reduced. Alternatively, because the deferred product is displayed in half the region of the registration confirmation screen 920 (for example, only the left side), it is also possible to display the editing screen 930 on the other half (right side) superimposed on or instead of the registered product information so as to reduce the effort involved in screen transitions.

The POS terminal 70 may cause the deferred-product information corrected by the employee on the editing screen 930 to be reflected in the product master or the like. For example, with a new product that is newly being carried, with a product from a new supplier, or when barcode updating has been overlooked, even if the barcode attached to this bargain-sale product is read, this product may not be present in the product master and become a non-filed product. In such a situation, causing the correction of the deferred-product information made on the POS terminal 70 to be reflected in the product master can prevent this product from becoming a deferred product in the future. It is sufficient for the editing process of the product information here to only involve items necessary for product registration and the settlement process. These are, for example, the product name, a unit price, the barcode (product identification information), and a tax category (such as reduced tax rate, tax included, tax excluded, or tax free).

Furthermore, for a product whose price or the like is unclear, the POS terminal 70 may be able to make a temporary correction by editing a department and a monetary amount.

Then, by the employee editing and updating the deferred-product information 920*b* to addable registered product information in the editing screen 930, as illustrated in FIG. 22, the POS terminal 70 corrects and displays the deferred-product information 920*b* of the registration confirmation screen 920. The POS terminal 70 may display the corrected deferred-product information 920*b* without moving its display position—in the leading position of the list display of the registered product information—but may also, by correcting such, move and display such according to a display order of the other registered product information 920*a*. Moreover, when the deferred-product information 920*b*, 920*c* and the canceled product information 920*d* are disposed in the left region of the registration confirmation screen 920, the corrected deferred-product information 920*b* may be moved to and displayed in the right region.

Then, the POS terminal 70 changes the deferment-count display 920*e* displayed in the lower position of the registration confirmation screen 920 to "2".

Following step S705, the POS terminal 70 determines whether deferred-product information (including canceled product information) is included in the registration information—that is, whether all deferred-product information has been corrected (step S707). If it determines that all deferred-product information has been corrected (step S707: YES), the POS terminal 70 lifts the prohibition on the settlement process (step S708) and, as illustrated in FIG. 23, displays a registration confirmation screen 920 wherein all deferred-product information has been corrected (step S709).

In the registration confirmation screen 920 illustrated in FIG. 23, correct product information is input and registered for the two units of deferred-product information 920*b*, 920*c* for which product registration was unable to be performed, and cancellation of registration is confirmed for the one unit of canceled product information 920*d* for which the cancellation process was performed during registration. By the deferred-product information 920*b*, 920*c* and the canceled product information 920*d* all being corrected or confirmed, the POS terminal 70 displays "0" as the deferment-count display 920*e* in the lower position of the registration confirmation screen 920. Moreover, the POS terminal 70 changes the background color or the like of the registration confirmation screen 920 to the normal background color and displays a "confirm" key 920*f* in an upper position of the registration confirmation screen 920. By the member or the employee operating the "confirm" key 920*f*, the POS terminal 70 ends the registration correction process of the product and transitions to the settlement screen illustrated in FIG. 24.

Meanwhile, if the POS terminal 70 determines that at least one unit of deferred-product information is not corrected (step S707: NO), the flow returns to step S706. That is, in the example illustrated in FIG. 22, the POS terminal 70 prohibits execution of the settlement process until the deferred-product information 920*c* and the canceled product information 920*d* are corrected.

Figure 24:
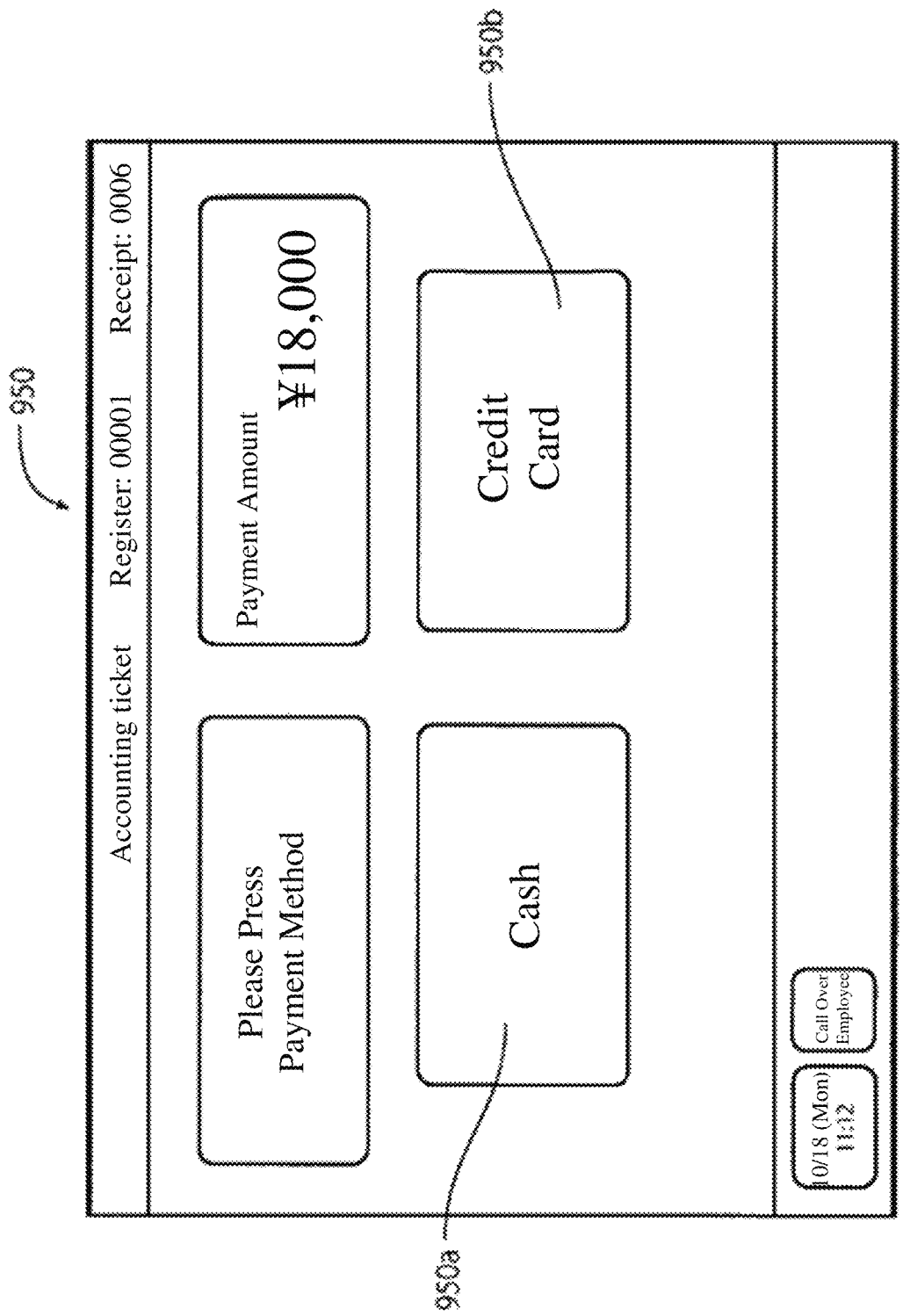
FIG. 24 shows an example of a screen of the POS terminal of the sales-data processing system according to one or more embodiments.

In the settlement screen 950 illustrated in FIG. 24, a "cash" key 950*a* and a "credit card" key 950*b* are displayed whereby a payment amount and an accounting method are selected. The transaction is completed by the member operating either of the keys to execute the settlement process (step S710). The flow of processes in the POS terminal 70 is described above.

—Functional Block Diagram—

Figure 9:
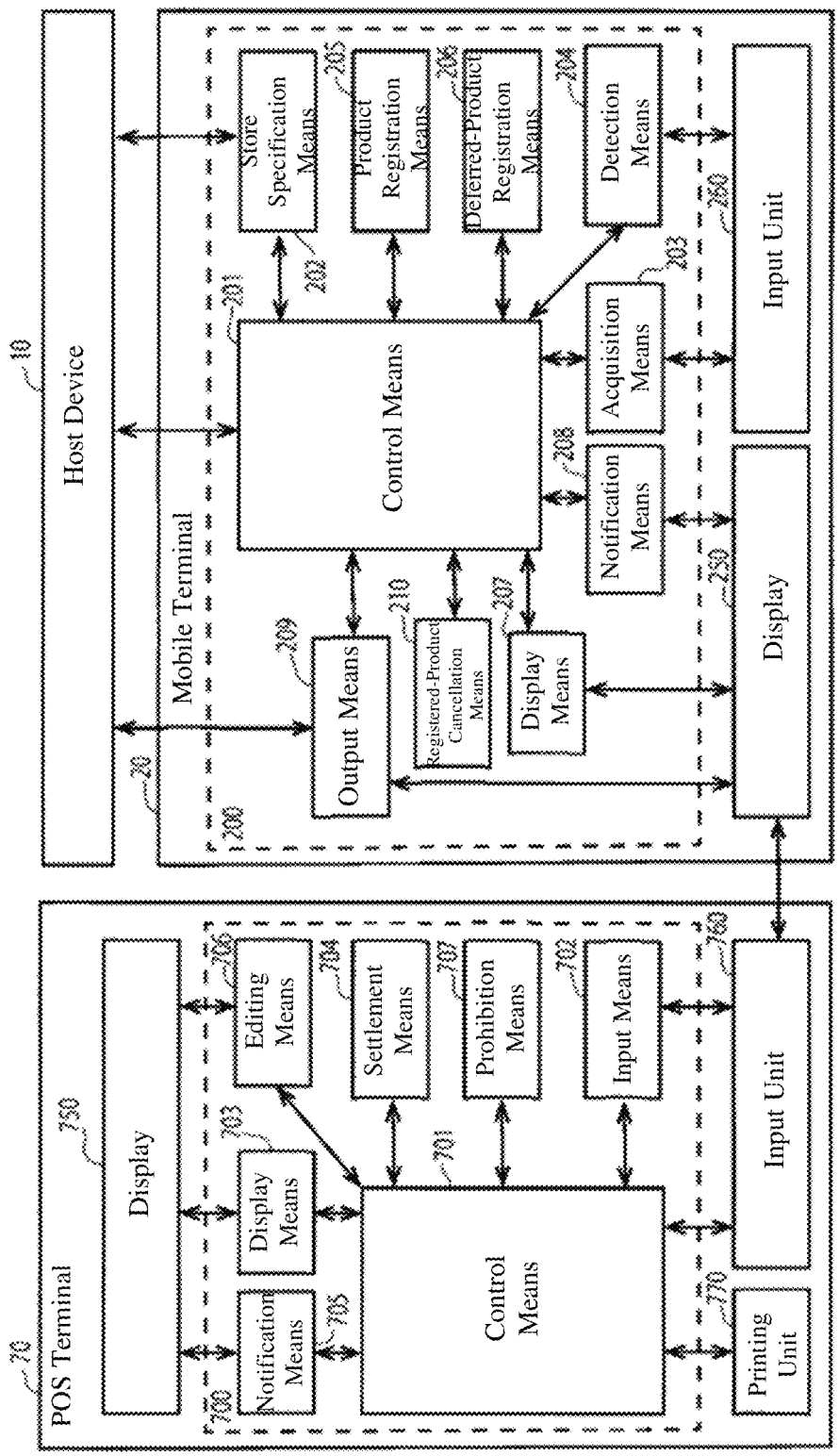
FIG. 9 shows an example of a functional block diagram of the sales-data processing system according to one or more embodiments.

FIG. 9 illustrates one example of a functional block diagram of the sales-data processing system according to one or more embodiments. The mobile terminal 20 of the sales-data processing system according to one or more embodiments includes a control unit 200, the display 250, which is a touch panel or the like; and an input unit 260, which is a camera or the like.

The control unit 200 includes a control means 201, a store specification means 202, an acquisition means 203, a detection means 204, a product registration means 205, a deferred-product registration means 206, a display means 207, a notification means 208, an output means 209, a registered-product cancellation means 210, and the like. The control means 201 performs general control of an entirety of the mobile terminal 20. The store specification means 202 specifies the store wherein shopping is to take place. The acquisition means 203 acquires the product identification information of the product to be purchased. The detection means 204 detects the operation for acquiring the product identification information. The product registration means 205 specifies and registers the product information based on the acquired product identification information. The deferred-product registration means 206 generates and stores information relating to a product for which product information cannot be registered. The display means 207 displays the registered product information registered by the product registration means 205 and the deferred-product information generated by the deferred-product registration means 206 on the display 250. The notification means 208 notifies that product information cannot be registered. The output means 209 outputs the registration information and the deferred-product information. The registered-product cancellation means 210 performs cancellation of the registered product information of the member.

The control means 201 performs general control of the mobile terminal 20. For example, it stores units of input (acquired) or detected information in a storage device such as a memory as appropriate, reads units of information from the storage device and displays these on the display 250, and exchanges information with another device. Moreover, the control means 201 executes various determination processes and the like. For example: At step S204 in the flow illustrated in FIG. 10, the control means 201 determines whether the product identification information was able to be acquired. At step S205 of the same, it determines whether the product information was able to be specified based on the acquired product identification information. At step S209 of the same, it determines whether the member issued the accounting instruction.

The store specification means 202 executes the store specification process. For example, the store specification means 202 outputs the position information or the like of the mobile terminal 20 to the host device 10 and inputs the information on the store wherein shopping is to take place from the store master of the host device 10 to specify the store wherein shopping is to take place.

The acquisition means 203 executes the product-information acquisition process. For example, the acquisition means 203 acquires the product identification information of a product photographed using the input unit 260 based on the code information attached to this product. In the sales-data processing system of the above embodiment, an example is used of acquiring the product identification information by reading the barcode attached to the product, but an acquisition method of the product identification information by the acquisition means is not limited to reading a barcode.

For example, the mobile terminal 20 may acquire the product identification information by noncontact detection by an RFID tag or by photographing a QR code (registered trademark). Moreover, it may utilize image recognition art to specify the product based on an appearance of the product (such as its shape, color, or material) or other characteristics thereof. Moreover, a recognition rate of image recognition may be improved by storing images photographed by the customer during product registration in a server and performing AI learning.

The detection means 204 executes the reading-operation detection process. For example, the detection means 204 detects that the input unit 260 performed the operation of photographing the code information provided on the product.

The product registration means 205 executes the product registration process. For example, the product registration means 205 specifies the product based on the product identification information acquired by the acquisition process and the information stored in the product master, acquires the product information, and registers this as the registered product information. The deferred-product registration means 206 executes the deferred-product information generation process. For example, the deferred-product registration means 206 generates and stores information relating to the product as the deferred-product information when no product identification information can be acquired by the acquisition process or when the product identification information acquired by the acquisition process is not stored in the product master.

The display means 207 executes the display process. For example, the display means 207 displays the registered product information registered by the product registration means 205, the deferred-product information generated by the deferred-product registration means 206, and the like on the display 250. The notification means 208 executes the notification process. For example, the notification means 208 issues a notification using the display 250 or the like when, for example, there is a product that cannot be registered by a product registration operation of the member. The output means 209 outputs the registered product information registered by the product registration means 205, the deferred-product information generated by the deferred-product registration means 206, and the like.

The registered-product cancellation means 210 executes the registered-product cancellation process. For example, the registered-product cancellation means 210 detects that the member performed a cancellation operation of product registration and creates registration deletion information and outputs to the host device 10 that registered product information was canceled.

The POS terminal 70 of the sales-data processing system according to one or more embodiments includes a control unit 700, the display 750, which is a touch panel, the input unit 760, which is a camera, and a printing unit 770, which is a printer.

The control unit 700 includes a control means 701, an input means 702, a display means 703, a settlement means 704, a notification means 705, an editing means 706, a prohibition means 707, and the like. The control means 701 performs general control of an entirety of the POS terminal 70. The input means 702 inputs the registration information of the product. The display means 703 displays the input registration information on the display 750. The settlement means 704 performs product settlement based on the registration information. The notification means 705 notifies the employee or the like when deferred-product information is input. The editing means 706 corrects the deferred-product information. The prohibition means 707 prohibits the settlement process by the settlement means 704 when the product information includes deferred-product information.

The control means 701 performs general control of the POS terminal 70. For example, it stores units of input (acquired) or detected information in a storage device such as a memory as appropriate, reads units of information from the storage device and displays these on the display 750, and exchanges information with another device. Moreover, the control means 701 executes various determination processes. For example, at step S702 of the flow illustrated in FIG. 11, the control means 701 determines whether there is deferred-product information in the registration information. Moreover, at step S707 of the same flow, the control means 701 determines whether there is deferred-product information that is not corrected.

The input means 702 executes the input process. For example, the input means 702 inputs the registration information output by the output means 209 of the mobile terminal 20. The display means 703 executes the display process of the registration information. For example, the display means 703 displays the input registration information (the registration information and the deferred product) on the display 750. Moreover, as necessary, the display means 703 performs display by varying a display aspect of the registration information (the registered information and the deferred product).

The settlement means 704 executes the settlement process. For example, the settlement means 704 performs the settlement process of the product based on the registration information. The settlement means 704 acquires, prior to the settlement process, the accounting method whereby the customer is to perform settlement. The notification means 705 executes the notification process. For example, when the input registration information includes deferred-product information or canceled product information, the notification means 705 displays on the display 750 that there is a deferred product (canceled product) and executes the calling-over process of calling over the employee to the POS terminal 70. Moreover, the notification means 705 executes the calling-over process of calling over the employee according to a member status or as otherwise necessary.

The editing means 706 executes the editing process. For example, the editing means 706 displays the editing screen for correcting the deferred-product information input by the input means 702. By the employee or the like editing the deferred-product information in the editing screen, the editing means 706 corrects the deferred-product information to be registered product information. The editing means 706 may display the editing screen when an employee code or the like is input. The prohibition means 707 executes the prohibition process. For example, when the registration information includes deferred-product information or deferred-product information, the prohibition means 707 prohibits the settlement process until this deferred-product information is corrected by the editing means 706 and registered as registered product information.

Each function provided by the mobile terminal 20 according to one or more embodiments is further described below.

—Display Method of Registration Details List—

Next, screen display and the like of the mobile terminal 20 during product registration are further described.

(Normal Registration Operation)

Figure 16A:
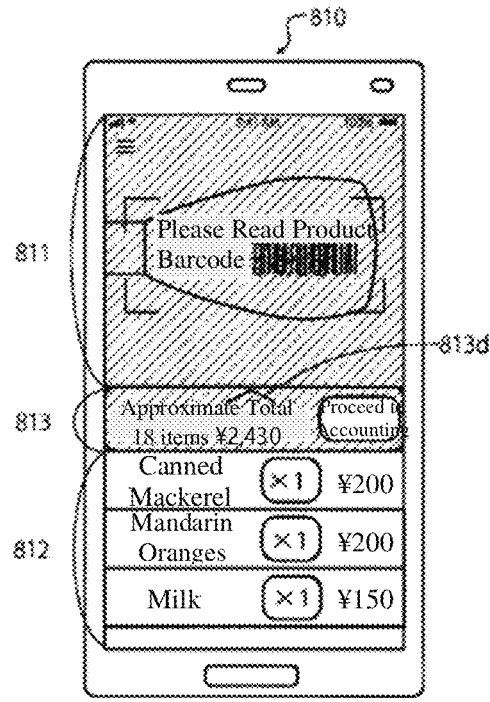
FIG. 16A shows an example of a screen of the mobile terminal of the sales-data processing system according to one or more embodiments.

During shopping, the display 250 of the mobile terminal 20 displays the registration screen 810 illustrated in FIG. 16A. When the member uses the mobile terminal 20 to read information such as the barcode provided on the product, the mobile terminal 20 displays the registered product information in the second display region 812 disposed in the lower region of the registration screen 810 illustrated in FIG. 16A. The mobile terminal 20 displays the registered product information arranged in order so the most recently registered product is disposed in an upper position of the second display region 812.

When product registration by the member proceeds, the second display region 812 is eventually filled with the registered product information, and registered product information for which barcode reading was performed earlier comes to be no longer displayed in the second display region 812.

The member can confirm the registered products by viewing the second display region 812. However, when many products are purchased, to confirm the information of products registered earlier, the list display displayed in the second display region 812 needs to be scrolled extensively, making confirmation bothersome. The mobile terminal 20 according to one or more embodiments expands the second display region 812 of the display 250 as necessary, which facilitates confirmation of the registered products.

Figure 16B:
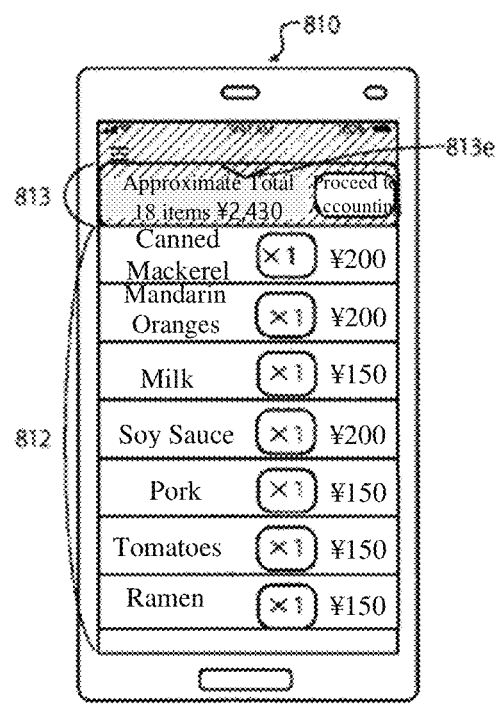
FIG. 16B shows an example of a screen of the mobile terminal of the sales-data processing system according to one or more embodiments.

For example, when not all of the registered product information can be displayed in the second display region 812 due to the member registering a plurality of products, the mobile terminal 20 displays an "expand" key (operator) 813d in the third display region 813. Then, by the member operating the "expand" key 813d, as illustrated in FIG. 16B, the mobile terminal 20 expands the second display region 812 and displays the second display region 812 and the third display region 813 by utilizing an entirety of the display 250. Moreover, when it has expanded the second display region 812, the mobile terminal 20 may display in the third display region 813 a "collapse" key (operator) 813e that collapses the second display region 812 to its original range (pre-expansion range).

When not all products can be displayed even if the second display region 812 and the third display region 813 are displayed utilizing the entirety of the display 250, it is needless to say that these can be displayed by scrolling. Moreover, an operation for expanding the second display region 812 is not limited to one using the "expand" key 813d disposed in the third display region 813.

Furthermore, the mobile terminal 20 may hide the first display region 811 by displaying the second display region 812 and the third display region 813 by utilizing the entirety of the display 250 and, in conjunction therewith, disable acquisition of the image data by the input unit 260 of the mobile terminal 20.

Operation of the "expand" key 813d does not necessarily need to expand the second display region 812 and the third display region 813 to the entirety of the display 250. An expansion range may be able to be changed by a member operation, and expansion may be performed according to the number of products to a state wherein all the products can be confirmed. At this time, acquisition of the image data by the input unit 260 of the mobile terminal 20 may be disabled immediately upon the second display region 812 being changed to a range including the first display region 811, but acquisition of the image data by the input unit 260 of the mobile terminal 20 may be disabled when the second display region 812 expands to a visibly displayed reading range in the first display region 811. As above, wasteful electricity consumption can be suppressed by disabling a photographing means provided by the input unit 260 at a point when the photographic data becomes unable to be confirmed using the first display region 811.

Furthermore, the second display region 812 may be sequentially expanded as the member performs the product registration process. In this situation, by setting a maximum expansion state of the second display region 812, the second display region 812 may be automatically expanded while securing the first display region 811.

To conserve power, the mobile terminal 20 may disable the photographing means provided by the input unit 260 when no barcode (product identification information) is recognized for a predetermined amount of time in the reading range of the first display region 811.

Positioning the first display region 811 in an upper portion of the screen provides very favorable operability when the operating entity operates the mobile terminal because this position corresponds to a camera position of the mobile terminal 20 and a line of sight to the subject actually being photographed passes over an upper end of the mobile terminal such that the subject is doubly visible. Moreover, the second display region 812 is in a screen lower portion because it is sufficient for the screen to be visible when confirming the purchased products. When products exceeding a predetermined display row count are registered, full-screen display can be performed by the expansion key of the third display region 813 positioned in a screen central portion. When front-screen display is insufficient, all the products can be confirmed by the scrolling operation or the like. Moreover, during the photographing process, operations are performed while confirming the current number of purchased items and the purchase amount. As such, disposing the third display region 813 in a position interposed by the first display region 811 displaying the photographed image and the second display region 812 is very excellent because this does not place a burden on the operating entity shifting their gaze. Moreover, the above expansion key is also easily operated.

Figure 27A:
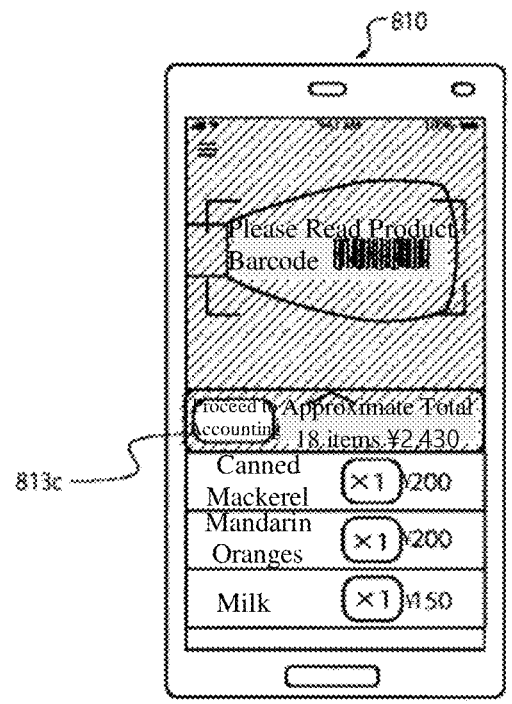
FIG. 27A shows an example of a screen of the mobile terminal of the sales-data processing system according to one or more embodiments.
Figure 27B:
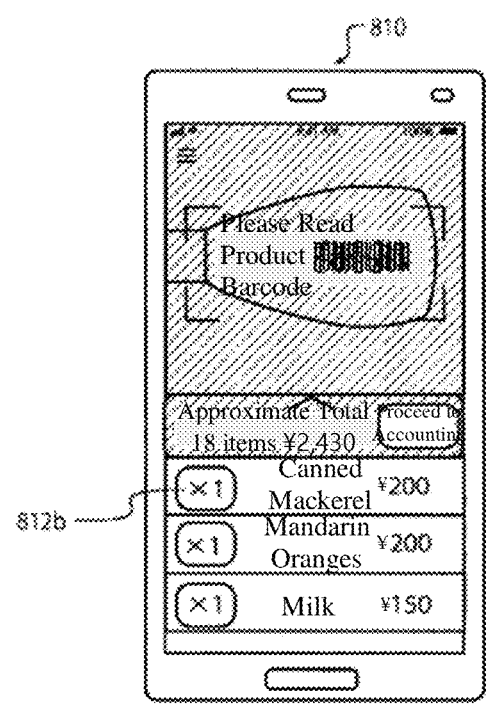
FIG. 27B shows an example of a screen of the mobile terminal of the sales-data processing system according to one or more embodiments.

A display position of an operator on the screen may be switchable according to the member information or any timing. For example, because operator disposition has right-handed operability in mind, left-handed operation or operation using the left hand has unfavorable usability. In this situation, as illustrated in FIG. 27A, the "accounting" key 813c may be disposed in a position substantially equidistant from a screen centerline, and as illustrated in FIG. 27B, the purchase quantity 812b or the like may also be similarly moved to be disposed in a leading portion of product-name display. That is, it is sufficient to, for example, store operator dispositions suited to right-hand operation and left-hand operation and perform automatic switching based on a switching instruction, the member information, or the like. Moreover, the "accounting" key 813c may be purposefully disposed in a location that is difficult to operate—for example, in a position on an opposite side.

Figure 26:
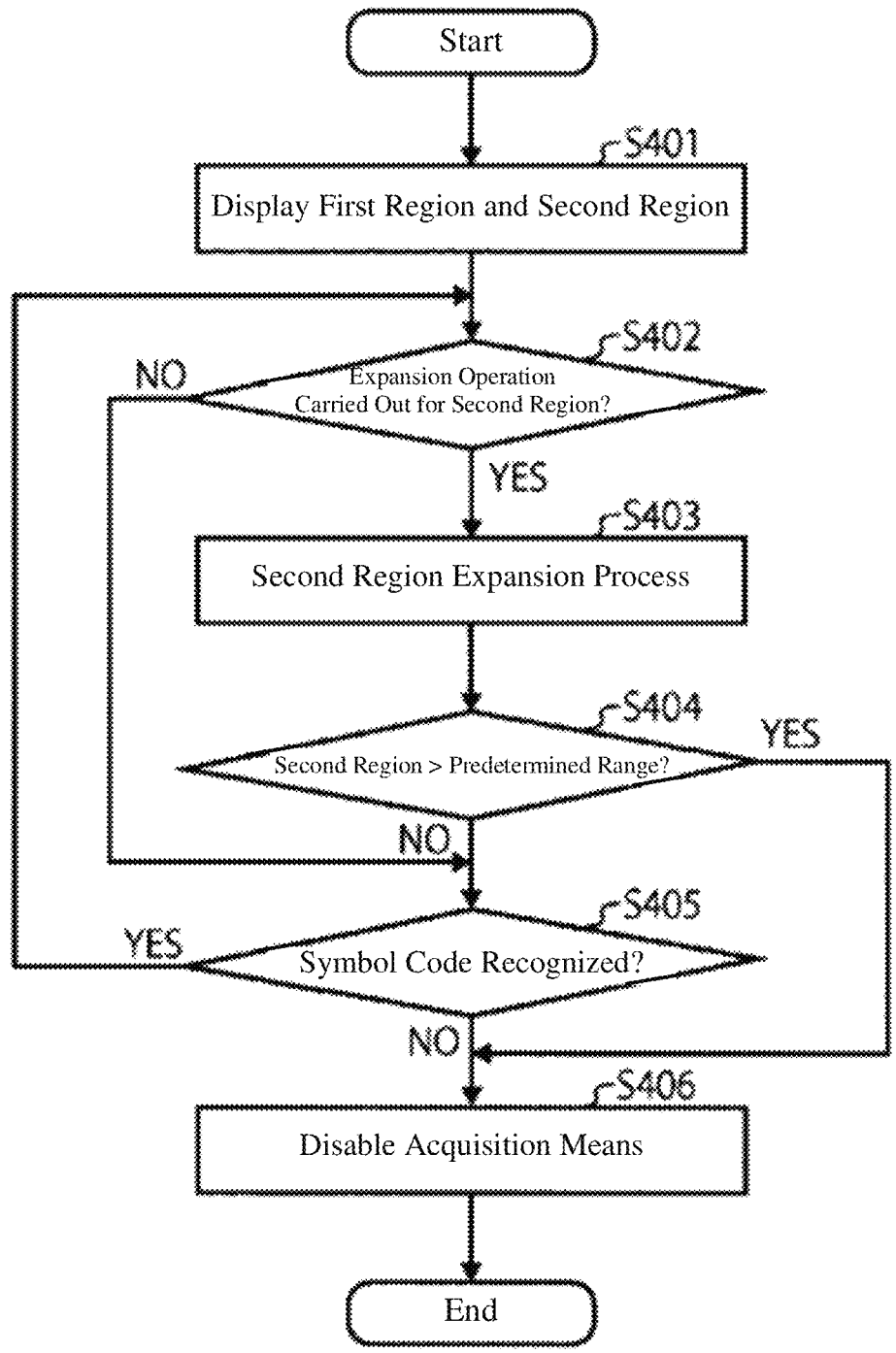
FIG. 26 shows an example of a processing flow in the mobile terminal of the sales-data processing system according to one or more embodiments.

FIG. 26 illustrates a flowchart of processes relating to the above registration content list display method. The present flow chart corresponds to a subroutine of step S209 in the flowchart illustrated in FIG. 10. The mobile terminal 20 displays the first display region 811 and the second display region 812 on the display 250 (step S401). The mobile terminal 20 determines whether the expansion operation of the second display region 812 is detected (step S402). That is, the mobile terminal 20 determines whether the member performed the operation of expanding the second display region 812. If it determines that the expansion operation is detected (step S402: YES), the mobile terminal 20 executes the expansion process of the second display region 812 (step S403).

Following step S403, the mobile terminal 20 determines whether the expanded second display region 812 reaches a predetermined range (step S404). The predetermined range at step S404 may be, for example, a range that includes a range of the first display region 811 by even a little or a range that includes the reading range that can recognize the barcode. Moreover, this may be a range that includes an entirety of the first display region 811.

If it determines that the expanded second display region 812 reaches the predetermined range (step S404: YES), the mobile terminal 20 disables the acquisition means 203 (step S406). For example, the mobile terminal 20 turns off a photographing function of the camera (photographing means provided by the input unit 260).

If it determines that no expansion operation is detected (step S402: NO), the mobile terminal 20 determines whether a barcode (symbol code) was recognized in the reading range of the second display region 812 within a predetermined amount of time (step S405). If it determines that no barcode is recognized in the reading range of the second display region 812 within the predetermined amount of time (step S405: NO)—that is, if it determines that a period wherein no barcode is recognized reaches a predetermined period—the mobile terminal 20 disables the acquisition means 203 (step S406).

If it determines that a barcode is recognized within the predetermined period (step S405: YES), the mobile terminal 20 returns to step S402. The processes relating to the display method of the product registration screen are described above.

—Purchasing Plurality of Identical Products—

In performing product registration using the mobile terminal 20 according to one or more embodiments, when purchasing a plurality of identical products, this may be performed by changing the quantity displayed in the registered product information 812d of the registration screen 810, but the code information of the same product may be photographed a plurality of times.

However, when the code information of the same product is photographed a plurality of times in succession or with time in between, the mobile terminal 20 performs a display to confirm whether a plurality of the same product may be purchased and changes a confirmation sound and vibration pattern of when the product identification information is acquired. For example, "The same product has been read twice. Is registration correct?" is displayed to notify the customer whether this is a correct operation or an erroneous operation. This enables the member to recognize that the registration process of the product being operated is the latest of a plurality of acquisitions of the code information.

For example, when identical products are photographed to confirm the products, "The same product has been registered. Purchase?" and yes/no selection buttons may be displayed to perform confirmation. Moreover, at the time of this confirmation, a screen may be displayed whereby a quantity adjusting operation can be performed. When registering identical products in succession, there is a possibility of further addition, which makes this method efficient. Confirmation is similarly performed when, after identical products are registered, another product is registered before once again registering an identical product. To prevent fraud, reading may be performed the same number of times as the purchase quantity when a plurality of products is being purchased. Likewise, in deletion as well, reading may be performed the same number of times as the deletion quantity. Either or both may be adopted as the operation of purchasing a plurality of identical products. Moreover, the operation method may be changed according to the member operation level (proficiency).

Furthermore, when the member has registered identical products by performing photography a plurality of times, the mobile terminal 20 sets the above plural number as the purchase quantity of the registered product information of this product and displays this in the newest row of the list display. The mobile terminal 20 may display registration of identical products by photography performed a plurality of times in a plurality of rows.

—Registration Operation of Loosely Sold Products—

In registering a product unsuited to having a barcode affixed thereon such as a loosely sold product such as a fruit or vegetable, such as a cucumber, or fish, it is favorable to perform the registration process of the product by, for example, photographing a barcode provided on a shelf or container whereon or wherein the product is displayed. If a barcode is directly provided on the loosely sold product or the like, this barcode is photographed.

Furthermore, the mobile terminal 20 may specify a product unsuited to having a barcode affixed thereon by photographing this product and performing object recognition (image processing). Moreover, a registration process using audio or the like may be performed, or the registration process may be performed by displaying a preset key on the display 250 and having the member select the key. That is, the mobile terminal 20 may specify the product according to the voice of the member or an on-screen selection by the member.

Figure 17A:
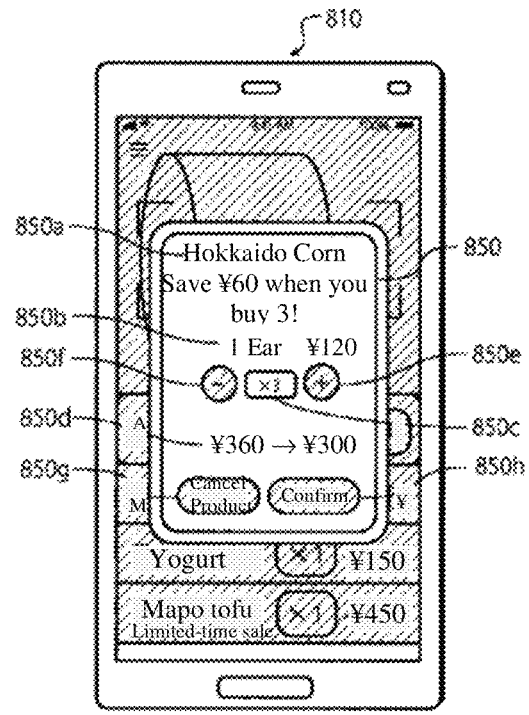
FIG. 17A shows an example of a screen of the mobile terminal of the sales-data processing system according to one or more embodiments.

Furthermore, in selling loosely sold products or the like, a price cut may be applied to a bulk (plural sales) purchase. By the member reading the barcode information of a product for which a price cut is applied in a bulk purchase, as illustrated in FIG. 17A, the mobile terminal 20 displays a pop-up 850 wherein a number whereat a bulk purchase lowers the price is set as an initial value of the purchase count. The pop-up 850 displays, regarding the loosely sold product, a product name 850a, a price per one product 850b, a purchase count 850c, and a selling price 850d. Moreover, a "+" key 850e and "−" key 850f that instruct changing the purchase count, a "cancel product" key 850g, and a "confirm" key 850h are disposed.

In the example illustrated in FIG. 17A, a pop-up 850 wherein a product whose product name is "Hokkaido corn" is registered is displayed. It is displayed that 60 yen is saved by buying three of this product together, the product being 120 yen individually. Moreover, "3" is set as the purchase count 850c, which is the bulk count serving as the initial value. The member can know from the pop-up 850 that a product is a discounted product when purchased in bulk and, by operating the "confirm" key 850h, can easily set bulk-purchase product registration.

The member can change the purchase count by operating the "+" key 850e and the "−" key 850f. Moreover, like an operation in normal product registration, registration of a product can be canceled by operating the "cancel product" key 850g.

Figure 17B:
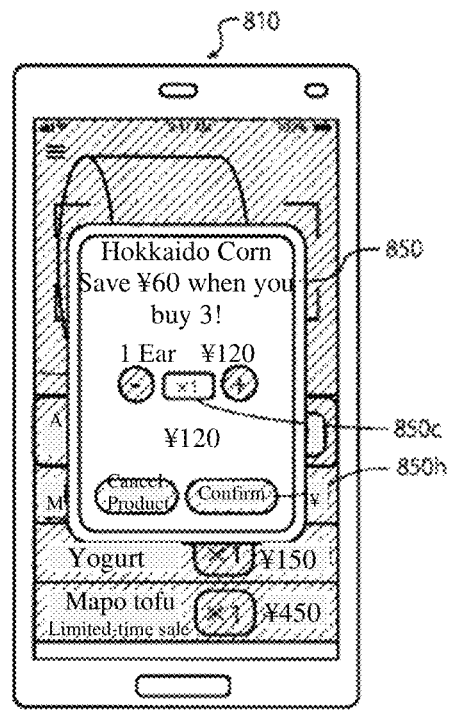
FIG. 17B shows an example of a screen of the mobile terminal of the sales-data processing system according to one or more embodiments.

By the member changing the purchase count by operating the "−" key 850f, as illustrated in FIG. 17B, the mobile terminal 20 changes the display of the pop-up 850. The pop-up 850 illustrated in FIG. 17B has display of the purchase count 850c changed to "1", displays the selling price of when no price cut is applied (120 yen), and displays that a bulk purchase of three would save 60 yen. A content and timing of the display prompting a bulk purchase are not limited in particular. The mobile terminal 20 may display that the bulk-purchase price cut is not applied at a timing of the member changing the purchase count.

Then, by the member operating the "confirm" key 850*h* (confirmation operation), the mobile terminal 20 registers the registration information according to the count set as the purchase count 850*c*. In this manner, the member can know from the pop-up 850 that a product is a discounted product when purchased in bulk and, by operating the "confirm" key 850*h*, can easily set a purchase that is a bulk purchase. The initial value may be set as "1" even if the product is one for which a bulk-purchase discount applies.

Furthermore, this registration operation is also applied to normal, individually sold products. That is, the registration operation can be executed in the same way by setting sales conditions such as bundled sales and bulk purchases. The sales conditions are set by the product master, the bargain-sale-plan master, or the like and are generated as information that the mobile terminal 20 can subject to product specification. The sales conditions may be set so they apply to members only and not to general customers.

Furthermore, for products having a restricted sales quantity—for example, products having a sales condition such as up to x products per person—"+" may be disabled or not displayed at the upper-limit quantity. Moreover, for "+" alone, counting up may be performed in quantity units set in the sales conditions. Moreover, display and functioning may take place by changing an aspect of the add and subtract keys in the "sales-condition quantity" units. Moreover, when subtraction takes place according to the "sales-condition quantity", non-establishment of the sales conditions may be notified, and descriptive text of the sales conditions may be displayed upon having its aspect changed. Moreover, when "1" is added to the "sales-condition quantity", display may be switched to the next sales-condition achieving quantity and total price-cut amount. Doing so can prompt the member to purchase in quantities of the sales conditions.

Figure 29:
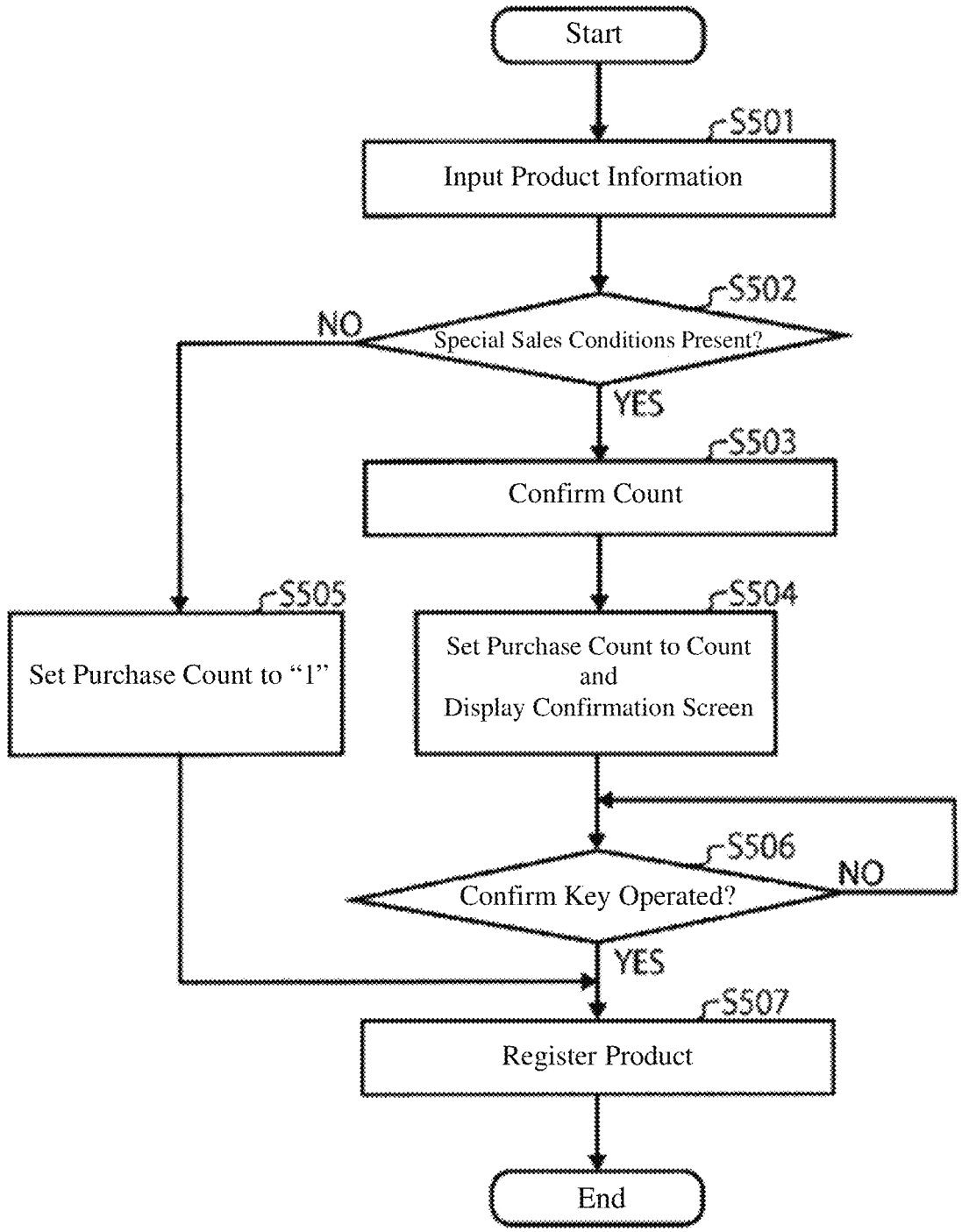
FIG. 29 shows an example of a processing flow in the mobile terminal of the sales-data processing system according to one or more embodiments.

FIG. 29 illustrates one example of a flow of processes relating to the registration operations for loosely sold products. The mobile terminal 20 inputs the product information of the products to be purchased by the member (step S501). For example, the mobile terminal 20 acquires the product identification information by reading the barcodes (product identification information) of these products by the input unit 260 and acquires (inputs) the product information of the products from the product master 110 based on this product identification information.

Next, the mobile terminal 20 determines whether special sales conditions are set as sales conditions of the input product information (step S502). For example, it is determined in the table illustrated in FIG. 28A whether the products of the input product identification information have sales conditions (plan number). The special sales conditions referred to here are sales conditions that set some condition regarding sales count—for example, a product that is sold in bulk or an upper limit of a purchase count per person. Moreover, the sales conditions may include a count from a situation wherein, for example, a purchase count is stored in advance in a shopping list or the like. Moreover, the sales conditions may include information relating to products frequently purchased by the customer (products having a purchase history).

It if determines that special sales conditions are set (step S502: YES), the mobile terminal 20 acquires information on an establishment count set in the sales conditions by, for example, referring to the product-master bargain-sale data indicated in FIG. 28B. Then, the mobile terminal 20 determines the purchase count of the member purchasing this product based on the acquired information on the establishment count—that is, the above sales conditions (step S503).

For example, when the acquired product identification information is 0001 (corn), the mobile terminal 20 determines that the bulk price cut of plan number 1 is set for the product. Because the sales-condition establishment count of plan number 1 is "3", a bulk count of "3", which qualifies for the price cut, is determined as the count. If the product is, for example, a limited-quantity product set with a sales condition of, for example, two per customer, this limited quantity is determined as the count. Moreover, if the product is a product frequently purchased by the customer (product having a purchase history), this may be the count from the previous purchase.

Following step S503, in a state wherein a count is set in advance as the purchase count, the mobile terminal 20 displays on the display 250 a confirmation screen for determining registration of this product (step S504). Normally, when the member reads the barcode (product identification information) of a product, the mobile terminal 20 performs product registration by setting the purchase count as "1". However, when special sales conditions are set for the product whose barcode (product identification information) is read and acquired—for example, when the product is eligible for a bulk price cut—as illustrated in FIG. 17A for example, a confirmation screen in a state wherein the bulk count is set as the purchase count is displayed.

Following step S504, the mobile terminal 20 determines whether the "confirm" key 850*h* disposed in the confirmation screen is operated (step S506). In the confirmation screen (that is, when it is (NO) at step S506), when an operation of changing the purchase count is performed, the mobile terminal 20 changes the purchase count according to this operation.

If it determines that the "confirm" key 850*h* is operated (step S506: YES), the mobile terminal 20 performs registration of the product according to the purchase count at the point when the "confirm" key 850*h* is operated (step S507), whereupon processing ends.

Meanwhile, if it determines that no special sales conditions are set (step S502: NO), the mobile terminal 20 sets the purchase count to "1" (step S505), does not display the confirmation screen, and registers the product (step S507), whereupon processing ends.

—Registration Operation of Variable-Weight Product—

In registering a product sold by weight (bulk food) such as meat or a deli product, the product registration process is performed by a scale that weighs this product sold by weight printing a price label recording the product information and the mobile terminal 20 reading a barcode printed on this price label. Moreover, connecting the scale to the store controller enables the product information recorded on the issued price label to be added to the product master. Changing the purchase count by operating the list display of the registration screen 810 may be disabled for variable-weight products.

Furthermore, when the scale has a network connection, upon connecting the scale and the mobile terminal 20 by near field communication or the like, the barcode of the product to be weighed may be read by the mobile terminal 20; the product to be weighed may be specified by, for example, operating a key that designates the product; and by weighting the product using the scale, the information of the weighed product may be registered in the mobile terminal

20. At this time, as the label issued by the scale, a label showing only information such as an expiration date may be issued and affixed to the product.

Moreover, if the member information, an app user ID, or the like can be recognized using an IC or the like, shopping data can also be generated from a bulk-product-dedicated scale and uploaded as shopping data of the customer, and fraud and the like can also be prevented by comparing two units of data. When the product is only designated and does not have its mass confirmed—that is, does not have its purchase amount confirmed—the product may be treated as a deferred product.

—Registration of Coupon Information—

The mobile terminal 20 can register coupon information of a paper-medium coupon. For example, by reading a barcode printed on the coupon, recorded discount information can be acquired and reflected in the registered product information.

If the recorded coupon information is unique coupon information, this coupon information may be invalidated by this reading of the coupon information. Moreover, if the coupon needs to be collected, the employee may be called over during shopping to input the coupon, or payment may be made to be performed by specifying a staffed POS or the like as the POS terminal 70 to perform the settlement process.

The mobile terminal 20 may automatically calculate the read coupon information to be a maximum price-cut condition and may output the registration information upon reflecting this in the price of the product. Moreover, the mobile terminal 20 may record and output the read coupon information, together with the registration information of the product, as code information such as a QR code (registered trademark) and perform the price-cut process or the like in the POS terminal 70 or the like. The shopping identification information and coupon identification information may be recorded in the code information such as the QR code (registered trademark) output by the mobile terminal 20, and the POS terminal 70 may acquire the registration information and the coupon information from the host device 10 based on each unit of identification information.

—Use of Shopping List—

By specifying a store using the mobile terminal 20 and designating and downloading an entirety or a portion of the product master of this store, the member can use the mobile terminal 20 to create a list of products they are planning to purchase ("shopping list" hereinbelow). The mobile terminal 20 creates the shopping list by, for example, the member selecting and registering products they are planning to purchase from a list of product information displayed on the display 250 of the mobile terminal 20. Moreover, when creating the shopping list, the mobile terminal 20 may automatically register products purchased on a regular basis as products planned to be purchased.

In product registration at the store, the member can use the shopping list by displaying the shopping list on the display 250 of the mobile terminal 20. An arrangement of the products planned to be purchased in the displayed shopping list may be in order of store aisle or department and can be freely set and changed to another arrangement. Moreover, the mobile terminal 20 may, according to a voice input such as "vegetables" or "fruits and vegetables", display only these departments or perform display in an upper position of a display region.

Then, by the member registering a product, the mobile terminal 20 changes the display of the product information of the shopping list and checks off an item in the shopping list. This enables the member to know that a product they are planning to purchase has been registered. For products for which a plurality is planned on being purchased, the mobile terminal 20 may perform the checking off or the like by notifying a planned purchase quantity and registering the planned quantity.

Furthermore, the mobile terminal 20 may be made unable to execute the product registration process until after the member has designated the product to be registered from the shopping list. This enables the product planned on being purchased to be reliably purchased and can suppress unplanned product purchases and other excessive impulse buying.

When the member, upon designating a product, photographs a product other than this product, the mobile terminal 20 may issue a notification such as an error display. Moreover, the mobile terminal 20 may also issue a notification such as an error display when another product registered on the shopping list is photographed.

The mobile terminal 20 also allows the product registration process for a product not present in the shopping list, but in this situation, a notification that, for example, this product is a product that is not present in the shopping list and to display a screen to confirm the purchase may be issued. The mobile terminal 20 may, in the list display of the registration information, display products that are present in the shopping list and products that are not present therein so the member can distinguish between them.

The mobile terminal 20 can complete product registration by the member clicking or otherwise manipulating the product name displayed in the shopping list. The member does not need to read product barcodes, and smoother product registration can be performed. Moreover, by performing product registration using the shopping list, the registration process can be simplified for products with no barcode provided thereon. This may be limited to products with no barcode provided thereon. That is, this may be limited to functioning as a preset key for products with no barcode provided thereon. The member does not need to go out of their way to read a barcode of a selling-price plate or the like. An operation button for displaying a place of origin (maker), regulations, a volume or the like, and an alternate product may be provided.

The mobile terminal 20 may create the "shopping list" by automatically adding regularly purchased products to the shopping list from past shopping history information and scanning the barcode of, for example, an empty container at home. When there is a product that is registered in the shopping list but for which there is no registration information, the mobile terminal 20 may notify the member that they forgot to purchase a product by a display on the registration screen or the like. Moreover, the member may be asked whether they would like to purchase or not purchase this forgotten product.

—Output Process of Registration Information—

The output process of the registration information at settlement is further described. Output of the registration information is basically performed by turning the shopping identification information into a QR code (registered trademark), displaying this on the mobile terminal 20, and reading this using the POS terminal 70. Upon reading the QR code (registered trademark), the POS terminal 70 requests the shopping information from the host device 10 according to the acquired shopping identification information. Upon receiving the request from the POS terminal 70, the host device 10 performs subtotal calculation according to the shopping information associated with the shopping information identification and transmits the calculated shopping information to the POS terminal 70.

A QR code (registered trademark) that codes the shopping information instead of the shopping identification information may be displayed on the mobile terminal 20 and read by the POS terminal 70. In this situation, the settlement process is performed by outputting the registration information by reading code information (QR code (registered trademark) 840*a*) displayed on an output screen 830 of the mobile terminal 20 by the input unit 760 of the POS terminal 70. However, when there is a large amount of registration information and one unit of code information is an insufficient information amount, it is favorable to display a plurality of units of code information in succession and output all the registration information by reading these in succession using the input unit 760 of the POS terminal 70. In doing so, a total number of code-information units and a number of the code information currently being displayed may be displayed on the output screen 830. When displaying the QR code (registered trademark) that is the coded shopping information on the mobile terminal 20, calculation of the subtotal amount may be performed by the POS terminal 70 or the host device 10.

Instead of reading the registered product information using a QR code (registered trademark), information relating to a storage region of the shopping file (basket data) may be displayed, and the shopping file (basket data) may be acquired from this information relating to the recording region. Moreover, information that can be acquired from a QR code (registered trademark), a one-dimensional code, an NFC identification code of a mobile terminal, or the like and can subject the member to information identification may be associated with the shopping file and stored, and this information may be used to specify the shopping file.

As above, when performing the output process of the registration information by displaying the code information (QR code (registered trademark) 840*a*) on the output screen 830 of the mobile terminal 20, the mobile terminal 20 does not stop display of the code information until the POS terminal 70 completes the input process of the registration information.

For example, the POS terminal 70 may, by completing reading of the code information (QR code (registered trademark) 840*a*), transmit information indicating as much to the mobile terminal 20 and, by input of the code information being completed in the POS terminal 70, perform a display such as "Product registration is ended. Subsequent operations will be performed on the settlement device." on the display 250 of the mobile terminal 20 to end display of the code information.

This enables the member to grasp that the product registration process by the mobile terminal 20 is completed and enables the member to focus on the settlement process by the POS terminal 70. The mobile terminal 20 that is the smartphone or the like that has completed the product registration process ends the output screen 830 displayed on the display 250 and returns to the start screen 800.

Furthermore, output of the registration information to the POS terminal 70 by the mobile terminal 20 is not limited to display of the code information. For example, by the customer completing the registration process by the mobile terminal 20 and selecting the POS terminal 70 that is to perform the settlement process, the mobile terminal 20 may specify the POS terminal 70 and output the registration information to this POS terminal 70 via a network.

Furthermore, the mobile terminal 20 may, by reading identification information of the POS terminal 70 provided (or displayed) on the POS terminal 70, output the registration information via a network to this POS terminal 70 whose identification information is read. The mobile terminal 20 may, instead of directly outputting the registration information to this POS terminal 70, output the registration information via a host system such as the host device 10 or the store controller 60. That is, the mobile terminal 20 may output the shopping identification information to this POS terminal 70, and the POS terminal 70 input with the shopping identification information may request of and acquire from the host system the registration information corresponding to this shopping identification information.

Furthermore, the mobile terminal 20 may receive status information of the POS terminal 70 and display a status button or the like of the POS terminal 70 on the display 250. By the member selecting the POS terminal 70 by operating the status button or the like, the mobile terminal 20 outputs the registration information to the selected POS terminal 70. Moreover, the mobile terminal 20 may, based on the status information transmitted from the POS terminal 70 to the mobile terminal 20, automatically select the POS terminal 70 to output the registration information or the shopping identification information to and output the registration information to the selected POS terminal 70. Output of the registration information from the mobile terminal 20 to the POS terminal 70 is not particularly limited and may be performed in an appropriate method.

During shopping, the member may remember at the settlement process that they forgot to buy a product. In this situation, by the member operating a cancel button or the like displayed on the display 750 of the POS terminal 70 during the settlement process, the POS terminal 70 displays a notification screen such as "Settlement has been suspended. Subsequent operations will be performed on your smartphone." on the display 750. The mobile terminal 20 again displays the registration screen 810 on the display 250 and continues product registration.

—Settlement Process—

The member selects on the settlement screen 950 a payment means by which to perform the product settlement process. However, when the payment means has been registered in advance at the time of member registration, the POS terminal 70 does not need to display a screen for selecting the payment means. Even when the payment means has been registered, the payment means may be changed. For alcoholic beverages and other products requiring age verification, the employee needs to be called over as is the case with a deferred product. Moreover, for drugs, because class 2 OTC drugs require an explanation from a pharmacist or a registered salesperson, the employee may be called over in a separate aspect from a deferred product. These products may be handled similarly to a deferred product and may be stored as deferred-product information, the employee may be called over by the notification means at settlement, and, on a screen of the POS terminal 70, as with deferred-product information, accounting may be prohibited by the prohibition means when editing (confirmation process) is not performed. Moreover, a purchase may be prohibited by notifying that no pharmacist or registered salesperson is available.

In the settlement process, payment by gift certificate and payment using points of a points member are also possible. Moreover, use of, for example, a discount ticket such as a coupon is also possible, and payment can be performed similarly to a normal payment process by paying out change, issuing a receipt, and the like. When employee intervention is necessary to, for example, collect a gift certificate, the employee is called over automatically. Alternatively, information directing the member to a service counter, a staffed POS, or the like may be displayed on the display 750.

Furthermore, a settlement process may be restricted (prohibited) based on registered product information registered at a store different from the store specified by the member. Because the basket data (shopping file) generated by store specification has store identification information, when registered product information is subjected to the registration process by a mobile terminal 20 specifying another store, the POS terminal 70 may perform an error display such as "This product is not from this store." on the display 750 and call over the employee. Moreover, when the product registration process is performed by the mobile terminal 20 specifying another store, the mobile terminal 20 may perform a display such as "Settlement at another store is not ended. Create basket data for this store?" or "You are logged in at another store. Log-in cannot be performed." on the display 250 so shopping at another store cannot be performed.

Furthermore, the employee may perform a check as necessary during the settlement process. The employee check may be performed during the employee call-over process of step S703 in the flow of FIG. 11 but may be performed at another timing. Moreover, the employee check of the settlement process may be performed randomly like a surprise inspection or may be performed according to a member usage condition of the mobile terminal 20.

For example, the employee check may be performed for a member whose member level stored in a customer file is the lowest level L1. By this, a member using the system for the first time is always checked and supported by the employee. Meanwhile, employee checking and support are omitted for a high-level L5 member that has experienced the registration process using the mobile terminal 20 a plurality of times and makes few erroneous operations or the like using the mobile terminal 20. This mitigates a store load.

Figure 11:
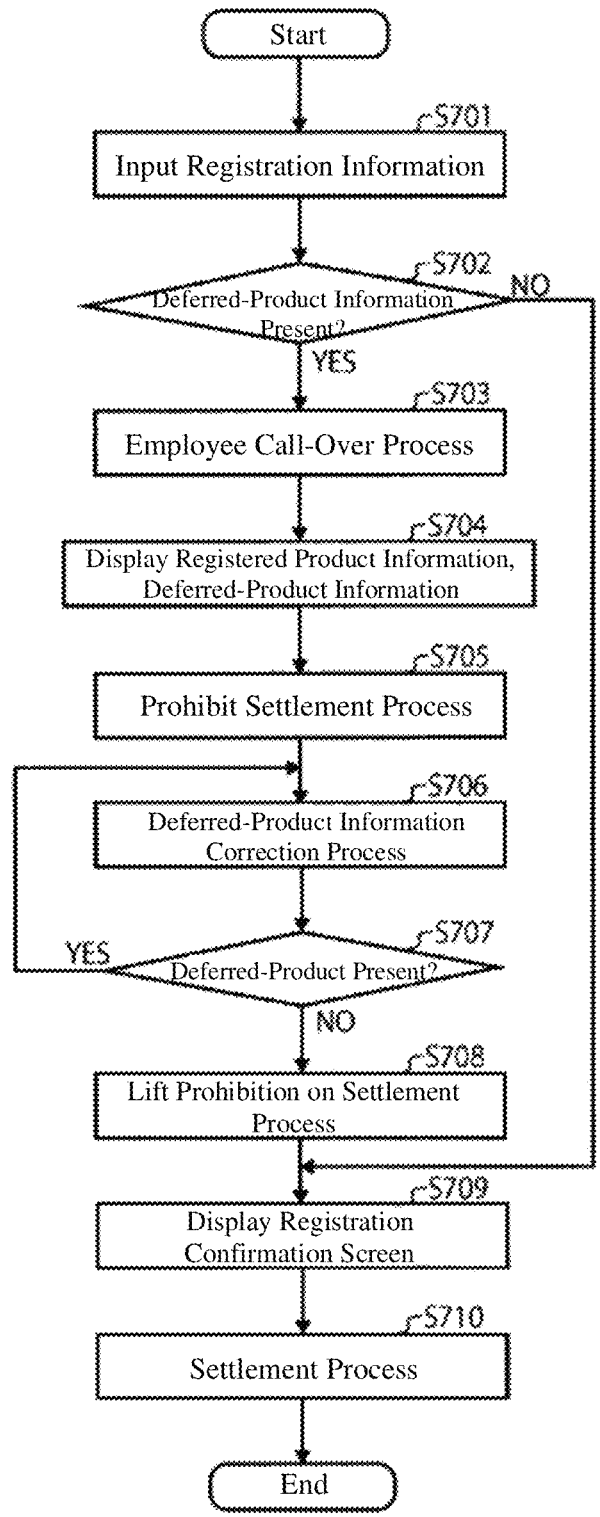
FIG. 11 shows an example of a processing flow in the POS terminal of the sales-data processing system according to one or more embodiments.

Furthermore, as is done in the employee call-over process of step S703 in the flow of FIG. 11, employee checking and support may be performed when, for example, during the registration operations by the member, there is a deferred product whose code information cannot be read or a cancellation operation of the registered product information is performed.

For example, the mobile terminal 20 or the POS terminal 70 may refer to a member file to acquire a past cancellation count, and the employee may check a member whose past cancellation count is at or above a predetermined count. The mobile terminal 20 or the POS terminal 70 may refer to the shopping file so the employee checks a member who has performed a registration deletion (cancellation) operation a predetermined number of times or more in this shopping.

For example, the mobile terminal 20 or the POS terminal 70 may be set to call over the employee for a transaction wherein a registration cancellation operation of a product has been performed a plurality of times (for example, three times) or more during this transaction. Moreover, when calling over the employee based on the registration cancellation operation, a plurality of past shopping histories may be taken into consideration. For example, the mobile terminal 20 or the POS terminal 70 may be set to call over the employee when a total number of registration cancellation operations from this time, the last time, and the time before last is five or more.

This enables the employee to check, for example, a customer that scans a product location wherein no barcode is provided to pretend to perform the product registration process or a customer who deletes registration information without returning the product.

Furthermore, by setting a presence or absence of an employee check during the settlement process based on the member's operation history of the mobile terminal 20 during the registration process, the employee check can be prioritized for members that make many registration cancellation operations or erroneous operations and members having a high likelihood of not being accustomed to the registration operations using the mobile terminal 20. Such active employee intervention can increase a quality of service, is efficient, and can increase security. Moreover, a notification may be issued that prohibits use of the application.

Employee intervention based on the member's operation history of the mobile terminal 20 during the registration process is not limited to during the settlement process and may be when the member enters the store or during product registration. For members using the system for the first time, employee intervention at store entrance as opposed to during settlement enables the product registration process to proceed smoothly.

—Prevention of Forgetting Settlement—

When the member moves outside of the store without completing the settlement process for a purchased product, the mobile terminal 20 notifies that the product settlement process is incomplete. For example, the mobile terminal 20 specifies the position of this mobile terminal 20 from the GPS position information, and when the member moves out of the premises of the store without performing the settlement process, the mobile terminal 20 issues a notification to the member's registered email address or an app screen.

Furthermore, when the product registration process is performed using the application, the mobile terminal 20 may notify the customer by forcibly not ending the application until the settlement process is completed or by prohibiting another application from launching.

Moreover, automatic payment may be performed using the payment means registered in advance, such as a credit card, and this may be notified in an email. Moreover, by, for example, registering credit, electronic money, or a withdrawal account of a financial institution, operations may be those that use no settlement process at a settlement device. However, because confirming a shopping content also enables the member to shop with confidence, a method may be adopted wherein the member is free to determine whether to perform content confirmation on a settlement device or a device having similar functions. Moreover, when there is no deferred product or when, according to conditions such as the member's operation level, no cash payment, gift certificate, coupon use, or the like needs to be handled—that is, when no settlement device needs to be used for online payment, account withdrawal, or the like—a notification may be issued, in conjunction with displaying the registration information or the shopping identification information at a registration ending operation, a QR code (registered trademark) or the like, that operation of the settlement device may be skipped. Alternatively, instead of this screen, a notification and guide of "No operation at the settlement device is necessary" or the like may be issued.

Figure 25A:
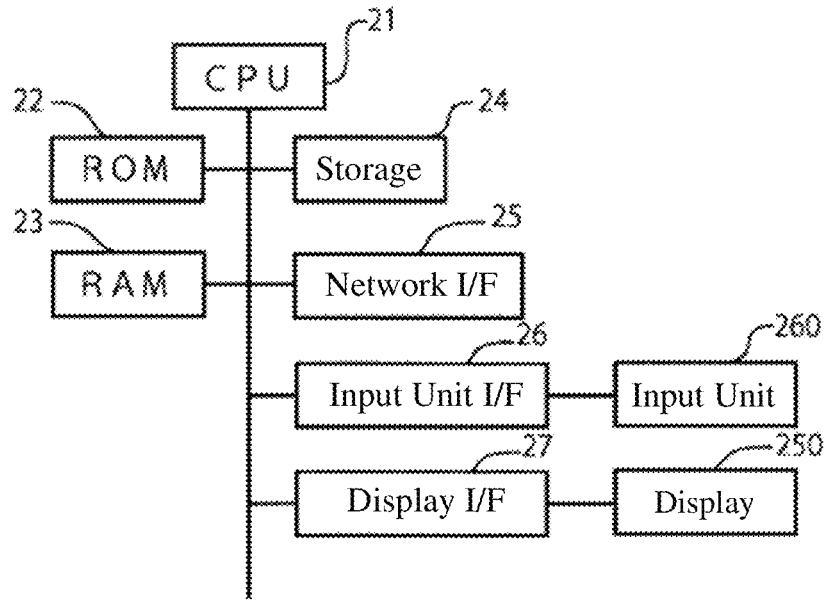
FIG. 25A shows an example of a block diagram of the mobile terminal of the sales-data processing system according to one or more embodiments.

FIG. 25A is a block diagram of the mobile terminal 20 of the sales-data processing system. The mobile terminal 20 includes a central processing unit (CPU) 21 (processor), a read-only memory (ROM) 22, a random-access memory (RAM) 23, a storage 24, a network I/F 25, an input unit I/F 26, a display I/F 27. The CPU 21 performs the functions of the control unit 200 as shown in FIG. 9 using the ROM 22, the RAM 23, the storage 24, the network I/F 25, the input.

The CPU 21 constitutes a computer and executes a command of a software program. The ROM 22 stores in advance the program or the like that is operated by the CPU 21. The program or the like may be configured to be stored in a portable storage medium such as a CD-ROM and read by an external device such as a CD-ROM drive.

The RAM 23 is used as a work storage area necessary for program storage and software operation. The storage 24 is constituted from a hard disk device or the like and stores information such as the product master. The network I/F 25 is a circuit for exchanging data with devices connected on a network. The network I/F 25 may be referred to as a transceiver. The input unit I/F 26 is a circuit for performing input and output involving the input unit 260. The display I/F 27 is a circuit for performing input and output involving the display 250 that is a touch panel or the like.

Figure 25B:
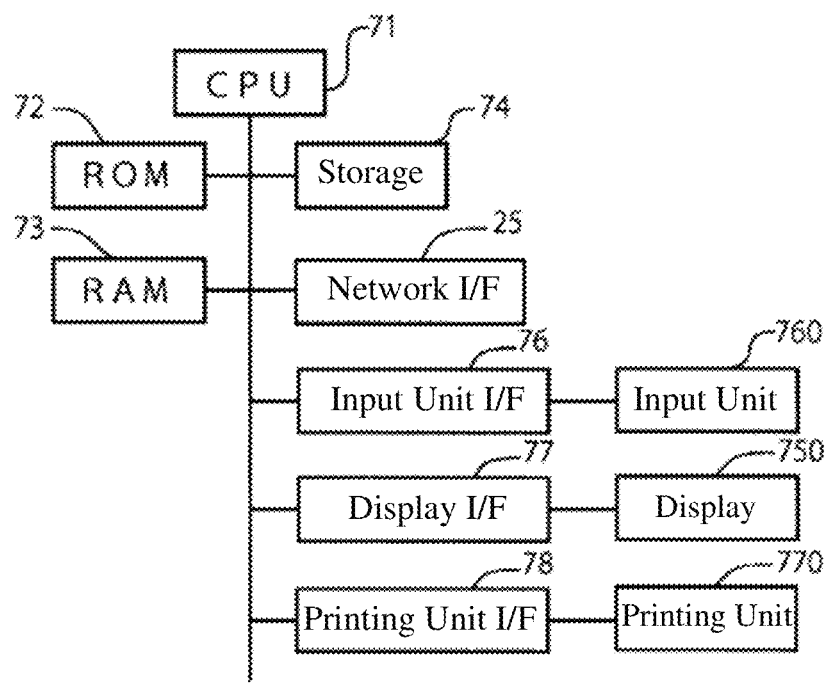
FIG. 25B shows an example of a block diagram of the POS terminal of the sales-data processing system according to one or more embodiments.

Next, one example of a POS terminal 70 block diagram of the sales-data processing system is described with reference to FIG. 25B. The POS terminal 70 includes a CPU 71, a ROM 72, a RAM 73, a storage 74, a network I/F 75, an input unit I/F 76, a display I/F 77, a printing unit I/F 78, and the like as the control unit. The CPU 71 performs the functions of the control unit 700 as shown in FIG. 9 using the ROM 72, the RAM 73, the storage 74, the network I/F 75, the input unit I/F 76, the display I/F 77, and the printing unit I/F 78.

The CPU 71 constitutes a computer and executes a command of a software program. The ROM 72 stores in advance the program or the like that is operated by the CPU 71. The program or the like may be configured to be stored in a portable storage medium such as a CD-ROM and read by an external device such as a CD-ROM drive.

The RAM 73 is used as a work storage area necessary for program storage and software operation. The storage 74 is constituted from a hard disk device or the like and stores information such as the product master. The network I/F 75 is a circuit for exchanging data with devices connected on a network. The input unit I/F 76 is a circuit for performing input and output involving the input unit 760. The display I/F 77 is a circuit for performing input and output involving the display 750 that is a touch panel or the like. The printing unit I/F 78 is a circuit for performing input and output involving the printing unit 770 that is a printer or the like.

As above, in the sales-data processing system according to one or more embodiments, in performing the product registration process using the smartphone had by the customer, image-data confirmation is facilitated by suppressing a display region of a registered product on the display of the mobile terminal to a minimum region during product registration. Moreover, in the sales-data processing system according to one or more embodiments, a list screen of the registered products can be expanded as necessary. This enables registered-product confirmation to be easily performed in a wide region and lessens a scrolling operation or the like.

Furthermore, when the image data of a photographed product can no longer be confirmed because the registered products are confirmed in a wide region, the mobile terminal 20 disables the input unit 260 that is a camera or the like. This conserves power and prevents temperature escalation of the terminal device.

Needless to say, the above embodiment does not limit the inventions stated in the scope of patent claims and is to be treated as one example. For example, in one or more embodiments, when the registration information includes deferred-product information, the POS terminal 70 performs list display of the registration information and the deferred-product information together. However, it is also possible to perform list display only for the deferred-product information. The POS terminal 70 may perform list display of the product information when the employee has corrected all deferred-product information.

Furthermore, the mobile terminal 20 may have various additional functions. For example, by the member launching the dedicated application, the mobile terminal 20 may sense and notify a battery level, a signal reception state, and the like. When the battery level is insufficient, the mobile terminal 20 may notify the member by a display such as "The battery may be depleted by hh:mm" or "The battery may be depleted after x more items are subjected to the reading process".

Furthermore, when it switches offline due to an unfavorable signal reception state or the like, the mobile terminal 20 may notify the member by a display such as "Only the barcode information will be shown. The price will not be displayed.". The mobile terminal 20 may acquire (input) only the barcode information and the quantity when offline and, when it returns online, reference the product master to acquire the product information and register the product. Moreover, the mobile terminal 20 may, before settlement, reference the product master using a communication medium such as a wired LAN to acquire the product information and register the product.

By the shopping file in the host device 10 being transmitted as a sales record of the member to the product sales system 6 (headquarters system or store controller), this can be integrally managed together with a sales record of the member outside the host device 10 by the product sales system 6. In other words, a sales record of shopping in the store and a sales record of shopping on the mobile terminal can be managed together. The host device 10 can also be linked to an electronic receipt server that is not illustrated. When the member desires an electronic receipt, an electronic receipt may be provided to the member even for only the sales record of the host device 10. Moreover, a product-sales-system side and the electronic receipt server may be linked. In this situation, all purchase records can be browsed and downloaded as an electronic receipt. The sales record from the host device 10 to the product sales system 6 is transmitted at a predetermined timing. Moreover, a member using the cloud service of the host device 10 may be made able to also browse and download purchase records of other companies and stores as an electronic receipt. As a result, this is also convenient for the member when another store of the same company adopts the same sales-data processing system. If the member has usage experience from another company or another store, it is easy for them to accept the sales-data processing system.

Furthermore, it is also possible to grasp a sales record, a sales report, an inventory status, and the like of this store when, as in, for example, (part 1) and (part 3) of the example of introducing the sales-data processing system, no sales record is performed from the POS terminal to the product sales system 6 and only reception of the sales record from the host device 10 is performed.

Furthermore, the purchase history may be displayed in the application introduced onto the mobile terminal 20. When an electronic receipt is desired for tax purposes, electronic-receipt generation may be instructed by designating a product from the purchase history. This can also be used for medical deductions and the like by managing flags for medical deductions and self medication and outputting a corresponding table (even as CSV, a PDF table).

Other tax deductions may also be aggregated, and the aggregate information can be provided to the member. When the type of tax deduction is the same but the target product is different, if tax-deduction conditions differ, both can be compared to perform output, display, printing, and electronic-receipt issuing. A tax deduction advantageous to the member can also be selected.

Furthermore, the mobile terminal 20 may acquire the product information by referencing the product master of the host device 10 or the like but may also acquire the product information by downloading the product master. Moreover, the mobile terminal 20 photographs the barcode provided on the product and acquires the product identification information from the acquired photographic data. However, the mobile terminal 20 may perform the processes until the photographic data is acquired, and the host system may perform the process of acquiring the product identification information from the photographic data and the processes subsequent thereto.

That is, each process implemented in one or more embodiments may be implemented in any among the host device 10, the mobile terminal 20, the store controller 60, the POS terminal 70, and the like. In which device these are executed is not limited as long as no contradiction arises.

The camera provided by the smartphone may be used as the camera that photographs the barcode or the like provided on the product. However, a separate camera connected via Bluetooth (registered trademark) or the like may also be used.

—Embodiment Relating to Store Specification—

When the member is to purchase a product in a specified store, the store wherein shopping is to take place is specified. Store specification is described in detail below with reference to the drawings.

Figure 30:
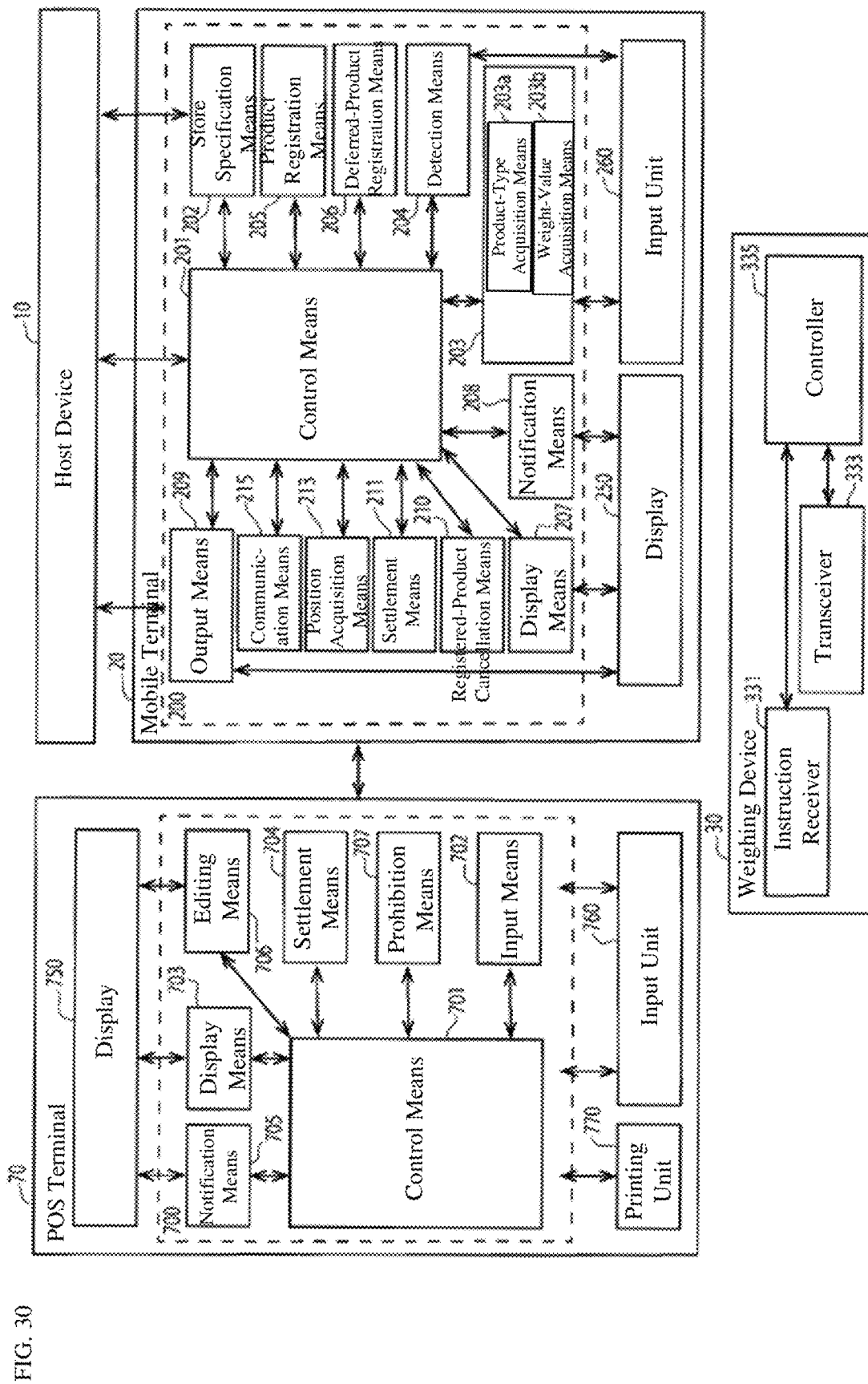
FIG. 30 shows an example of a functional block diagram of the sales-data processing system according to one or more embodiments.

As illustrated in FIG. 30, the mobile terminal 20 has a position acquisition means 213 that acquires the position (position information) of this mobile terminal 20. For example, in the mobile terminal 20, when the member starts the dedicated application of the mobile terminal 20, the position acquisition means 213 acquires the position of this mobile terminal 20 from the GPS of this mobile terminal 20, signal strengths from a plurality of base stations of a mobile phone network, and the like. Alternatively, the position acquisition means 213 may acquire the position of this mobile terminal 20 by using near field communication. The position acquisition means 213 may directly acquire the position of this mobile terminal 20 by, for example, interconnection with Wi-Fi provided by the store or NFC disposed at the store entrance.

The position of the mobile terminal can be estimated using a signal strength of near field communication or triangulation based on signal strength. Standards of near field communication other than Wi-Fi include BLE (Bluetooth Low Energy), EnOcean (registered trademark), Wi-SUN, Zigbee (registered trademark), and the like. BLE is one of the expanded specifications of the near field communication art Bluetooth. As a communication system using BLE developed by Apple (Apple being a registered trademark), there is iBeacon (registered trademark). In iBeacon, a fixedly disposed transmitter (beacon) continues to transmit unique ID information from a beacon terminal to, for example, a nearby BLE-compatible smartphone. On a receiving side, the BLE signal can be monitored to recognize the ID information and a propagation strength of the beacon. In iBeacon, a range of transmitting the ID can be set from among three types: "immediate" (close), "near" (near), and "far" (far).

Needless to say, it is sufficient for a person skilled in the art to appropriately select which near field communication to use to estimate the position of the mobile terminal 20. Moreover, the position acquisition means 213 can also be used when acquiring position information of in which position in the store the mobile terminal 20 is present.

The store specification means 202 in FIG. 30 specifies a store present in a predetermined range based on the position information of the mobile terminal 20 obtained from the position acquisition means 213. When a plurality of stores is present in the predetermined range, the mobile terminal 20 may display this plurality of stores and prompt the member to specify one store among this plurality of stores.

Using the position information enables the store wherein a product is to be purchased to be easily specified.

When the store wherein a product is to be purchased cannot be specified based on the position information, the mobile terminal 20 may prompt the member to input the store information.

The POS terminal 70 has the control means 701, which compares the store specified by the mobile terminal 20 (entered store) and the store wherein this POS terminal 70 is disposed and, when these do not match, performs a control of prohibiting the settlement process.

A weighing device 30 includes a controller 335 that compares the store specified by the mobile terminal (entered store) and the store wherein this weighing device 30 is disposed and, when these do not match, performs a control of prohibiting interconnection with the mobile terminal 20. Although a block diagram is omitted, the weighing device 30 includes a CPU, a ROM, a RAM, a storage, a network I/F, an input unit I/F, a display I/F, a printing unit I/F, and the like. The CPU of the weighing device 30 constitutes a computer and executes a command of a software program. The ROM of the weighing device 30 stores in advance a program or the like that is operated by the CPU. The program or the like may be configured to be stored in a portable storage medium such as a CD-ROM and read by an external device such as a CD-ROM drive.

Figure 31A:
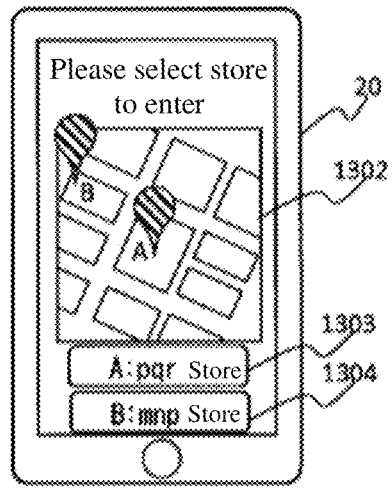
FIG. 31A is a diagram illustrating one example relating to store specification.

FIG. 31A illustrates an example wherein the mobile terminal 20 detects and displays two nearby stores, store A and store B, from the position information. Because there is a plurality of nearby stores, a screen is displayed prompting the customer to select which store to enter. If the store they are going to enter is store A (pqr store), the customer touches this button to select the store to enter.

Figure 31B:
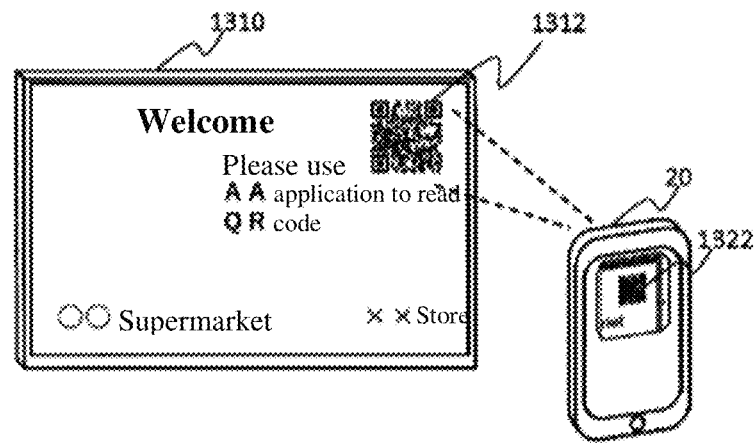
FIG. 31B is a diagram illustrating one example relating to store specification.

FIG. 31B illustrates one example of inputting the store information. An example is illustrated wherein a symbol code 1312 specifying the store is displayed on a display screen 1310 disposed at the store entrance or the like. By photographing the symbol code 1312 by the camera of the mobile terminal 20 had by the member, the app of the mobile terminal 20 recognizes the symbol code 1312. The photographed symbol code 1322 is displayed on the display of the mobile terminal 20. The application of the mobile terminal 20 can acquire the store information of the entered store by recognizing the symbol code 1312. Instead of being displayed on the display screen 1310, the symbol code 1312 may be printed on a poster or the like and posted at the store entrance or the like. The member can input the information of the entered store without performing a bothersome operation such as key input. By changing the symbol code 1312 displayed on the display screen 1310 over time as appropriate, a fraudulent operation such as the member photographing a copy of the symbol code 1312 at a location away from the store, such as their home, to input the store to be entered may be prevented.

Figure 31C:
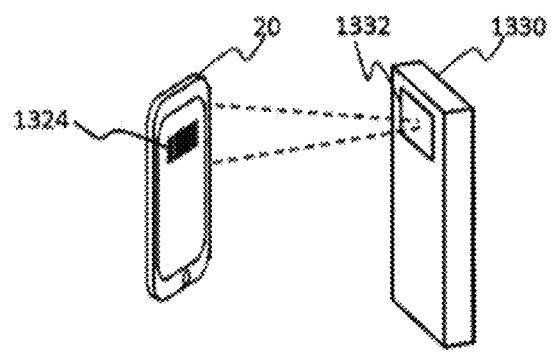
FIG. 31C is a diagram illustrating one example relating to store specification.

FIG. 31C illustrates an example wherein a symbol code 1324 displayed on the mobile terminal 20 is read by a camera 1332 of a photographing device 1330 disposed at the store entrance or the like. By causing the photographing device 1330 to read the symbol code 1324 displayed on the mobile terminal 20, the application of the mobile terminal 20 can obtain the store information via a network or the like. The mobile terminal 20 may acquire and display the symbol code 1324 via a network or the like. Moreover, a fraudulent operation such as that above may be prevented by changing the symbol code 1324 displayed on the mobile terminal 20 over time as appropriate.

By the above reading of the symbol-code display, the information of the store wherein a product is to be purchased can be easily specified. Moreover, the mobile terminal 20 may specify the store wherein to shop this time by displaying one or more stores wherein the member frequently shops and having the member select (when one store is displayed, designate) the store wherein to shop this time.

In FIG. 30, the product registration means 205 may restrict (prohibit) transitioning to the process enabling product registration until the store is specified by the store specification means 202. This is because if no store wherein a product is to be purchased is specified, for example, a correspondence relationship between store and product is not established such that product registration will not be performed appropriately, and the store that is to perform settlement is not established. The above restriction can also prevent, for example, the settlement process from being performed in the wrong store. When, for example, a plurality of tenants (stores) is present in the same building, mistakes easily arise. As such, it is important to specify the store before actually registering a product.

In the settlement process as well, a process of confirming in which store a product was registered may be performed. This can prevent fraud wherein, for example, a product is registered by having a discount service applied thereto at a certain store offering the discount service but undergoes settlement at another store not offering the discount service.

Figure 32A:
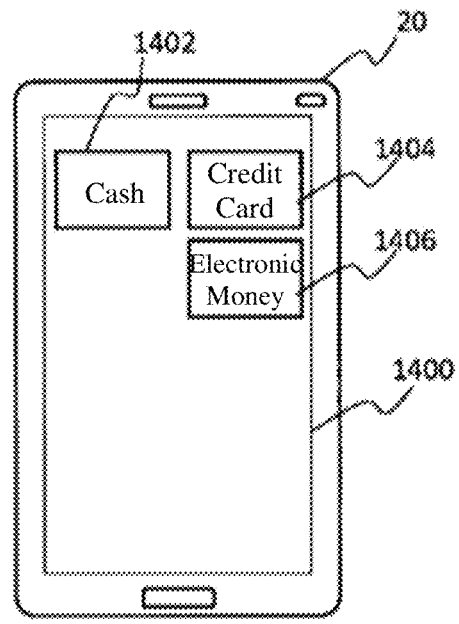
FIG. 32A is a diagram illustrating one example relating to selecting a method of settlement.

FIG. 32 illustrates an example wherein the display means 207 causes the mobile terminal 20 to display a screen 1400 for having the member select a method of settlement.

A cash button 1402, a credit-card button 1404, an electronic-money button 1406, and the like are displayed on the screen 1400. When settling in cash, the member can select the cash button 1402 and pay cash by using the mobile terminal 20 and a settlement processing device that can handle cash (such as the POS terminal 70). Methods of associating the settlement processing device that can handle cash and the mobile terminal 20 include a method of causing the settlement processing device to read a symbol code displayed on the mobile terminal 20, a method of causing the mobile terminal 20 to read a symbol code displayed on the settlement processing device, a method of using NFC (near field communication) and bringing the mobile terminal 20 close to the settlement processing device, and the like. The mobile terminal 20 and the settlement processing device can be associated by using such a method. As such, the member can settle in cash using the mobile terminal 20 and the settlement processing device.

When the member presses the credit-card button 1404, the electronic-money button 1406, or the like to select electronic payment, processes such as those below are performed.

The settlement means 211 in FIG. 30 may operate so as to limit a location whereat the mobile terminal 20 can perform electronic payment to a predetermined location.

The settlement means 211 may acquire the information on the current position from the position acquisition means 213 and enable transitioning to the processes of electronic payment by credit card, electronic money, or the like only when the location of the mobile terminal 20 is a predetermined location under employee supervision. The display means 207 may perform control so the credit-card button 1404 and the electronic-money button 1406 can be pressed only in a predetermined location. When the processes of electronic payment by credit card, electronic money, or the like are to be performed using the mobile terminal 20, the employee or a store monitoring system (not illustrated) may confirm whether settlement was performed. The monitoring system may perform confirmation using, for example, the screen of the POS terminal illustrated in FIG. 2 or the confirmation screen illustrated in FIG. 18 and FIG. 19. The screen of FIG. 18 and FIG. 19 may be displayed on a simple display terminal having no settlement function. Payment may be enabled for the first time upon the employee confirming that settlement was reliably performed and an employee action of confirmation completion such as a button being pressed being detected. At this time, a touch panel may be disposed as a display device, but a (physical) keyboard mainly operated by the employee may be connected. The display means 207 may display a screen such as that illustrated in the pop-up 1402 of FIG. 32C to enable the employee to visually confirm that electronic payment is ended. This enables the employee to reliably confirm that settlement was performed before the member exits the store together with the purchased product.

When the member presses the credit-card button 1404, the electronic-money button 1406, or the like to select electronic payment, the settlement means 211 acquires the position information from the position acquisition means 213 and confirms that the mobile terminal 20 is present in a predetermined region. When the mobile terminal 20 is not present in the predetermined region, a display is performed prompting the member to move into the predetermined region.

Figure 32B:
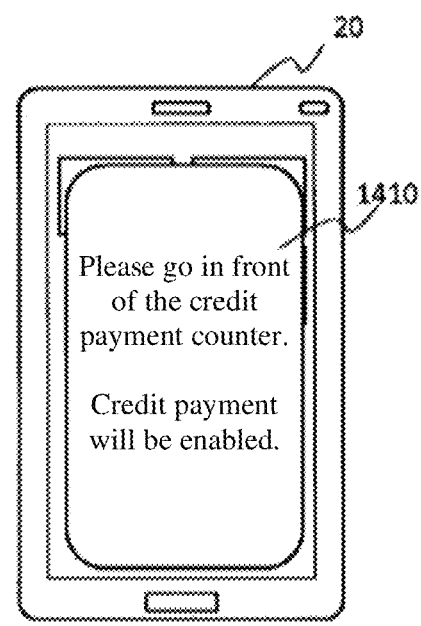
FIG. 32B is a diagram illustrating one example relating to selecting a method of settlement.
Figure 32C:
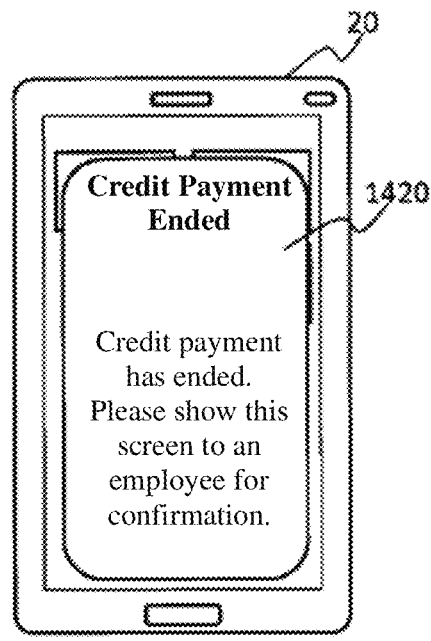
FIG. 32C is a diagram illustrating one example relating to selecting a method of settlement.

The pop-up 1410 in FIG. 32B illustrates an example of a screen prompting the member to move into the predetermined region (for example, near a counter for credit payment). At the counter for credit payment, for example, the employee is standing by and can monitor whether settlement by electronic payment such as credit payment was reliably performed. Moreover, the employee may perform a check of, for example, comparing the purchased product had by the member and the settled product. Checking in a sampling manner mitigates a load of the employee and enables the member to quickly get through the settlement process and exit the store.

FIG. 33 is a diagram illustrating an example relating to customer monitoring of the sales-data processing system.

Figure 33A:
FIG. 33A is a diagram illustrating one example relating to monitoring a customer.

The control means 201 monitors and controls the position information from the position acquisition means 213 and, even if settlement of a registered product is not completed, monitors and controls whether the mobile terminal 20 has, for example, exited the store. Moreover, the control means 201 displays, via the display means 207, a pop-up 1512 prompting the member to return to the store because, as illustrated in FIG. 33A, "Settlement is not completed". The pop-up 1512 may be an example of information that prompts weighing the product sold by weight by a scale. The control means 201 may display via the display means 207 that settlement will be performed using a payment means such as a credit card or electronic money because the member has exited the store.

Figure 33B:
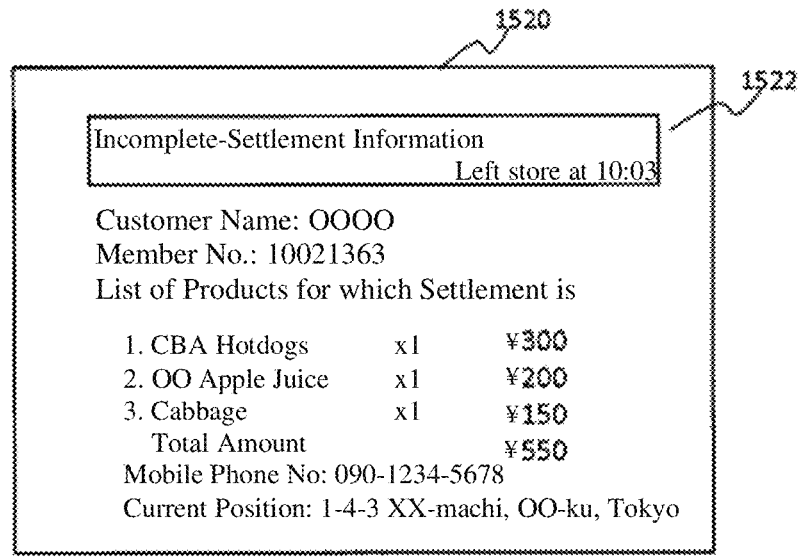
FIG. 33B is a diagram illustrating one example relating to monitoring a customer.

Furthermore, by the mobile terminal 20 and the POS terminal 70 communicating, the POS terminal 70 may, as illustrated in FIG. 33B, display a screen 1520 on the display 750 and display, on the screen 1520, incomplete-settlement information 1522 indicating that the member left the store without completing settlement. The screen 1520 may be displayed on another management screen (not illustrated) of the store. The host device 10 may monitor the mobile terminal 20 and display the screen 1520 on a display screen (not illustrated) of the host device 10.

The incomplete-settlement information 1522 may include at least one among, for example, settlement being incomplete, information on a time when the member left the store, the member name (customer name), a member number, a list of registered products for which settlement is incomplete, the phone number of the member, and the current position of the mobile terminal 20 of the member.

—Processing Flow of Embodiment Relating to Store Specification—

Figure 34A:
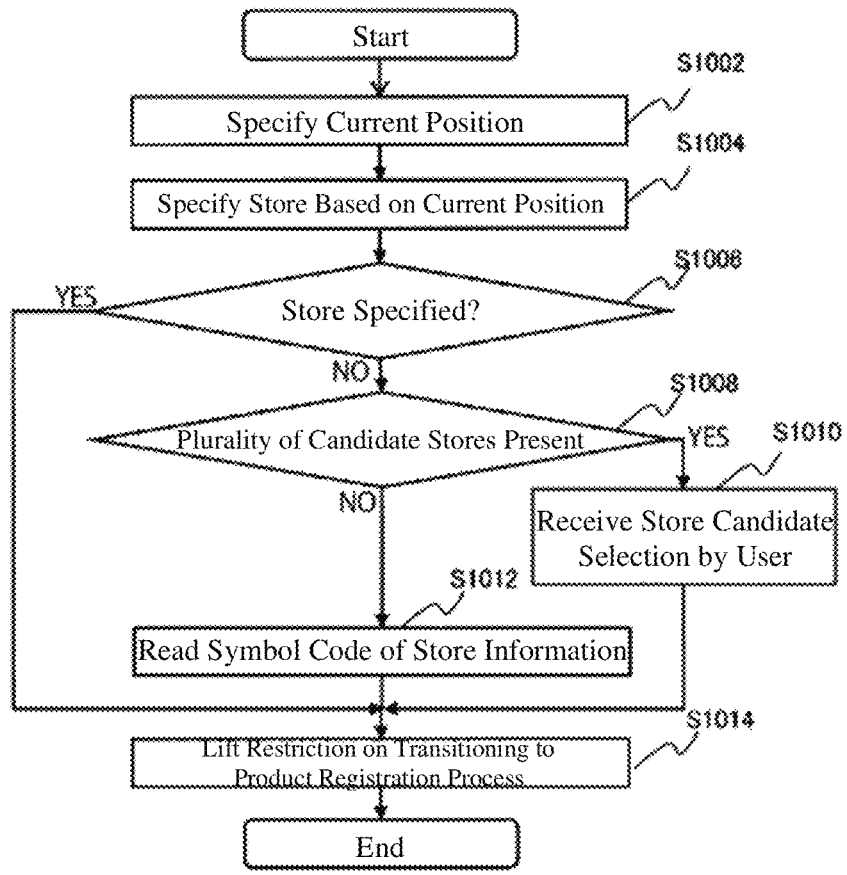
FIG. 34A shows an example of a processing flow in the mobile terminal of the sales-data processing system according to one or more embodiments.

FIG. 34 is one example of a flow of process and the like whereby the mobile terminal 20 specifies the store. FIG. 34A illustrates a processing flow of the mobile terminal 20 at store entrance.

The mobile terminal 20 specifies the current position (step S1002). The GPS or the like is used to specify the current position. As above, there are various methods other than a method of using the GPS as methods of specifying the current position.

Furthermore, the mobile terminal 20 acquires the store information (position information of the store). For example, the mobile terminal 20 may cause a reading device disposed at the store entrance to recognize the symbol code displayed on the display 250 to associate the mobile terminal and the reading device and acquire the store information according to this association. The mobile terminal 20 may acquire the store information using near field communication.

The mobile terminal 20 executes the process of specifying one store based on the current position and the store information (step S1004). The mobile terminal 20 determines whether one store was able to be specified (step S1006). If it determines that one store was able to be specified (step S1006: YES), the mobile terminal 20 proceeds to step S1014.

If it determines that one store was unable to be specified (step S1006: NO)—that is, if it determines that there is a plurality of stores as candidates or there is not even one store to serve as a candidate—the mobile terminal 20 makes a determination regarding the former—that is, whether there is a plurality of stores as candidates (step S1008).

If it determines that there is a plurality of stores as candidates (step S1008: YES), the mobile terminal 20 prompts the member, who is a user, to select a store and receives a selection from the user (step S1010). The flow then proceeds to step S1014.

If it determines that there is no plurality of stores as candidates (step S1008: NO)—that is, if it determines that there is not even one store to serve as a candidate—the mobile terminal 20 reads, according to a member operation, the symbol code present at the store entrance (step S1012). The symbol code includes the information for specifying the store. A method of specifying the store is not limited to this method. As already described, the store is specified by various methods. The flow then proceeds to step S1014. The mobile terminal 20 lifts the restriction (prohibition) on transitioning to the product registration process (step S1014). Subsequently, the member can use the mobile terminal 20 in the store to register products to be purchased. The store system may generate a shopping basket for the member based on the member entering the store. Products subjected to product registration by the member are made to be added to the shopping basket.

Figure 34B:
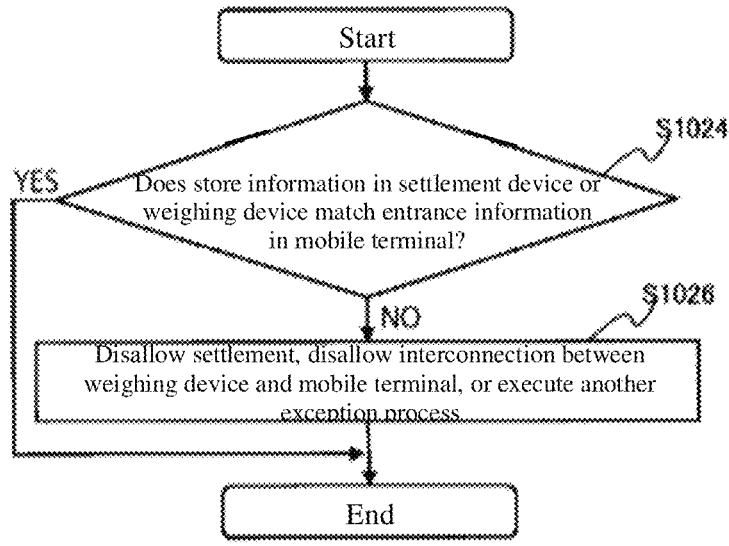
FIG. 34B shows an example of a processing flow in the mobile terminal of the sales-data processing system according to one or more embodiments.

FIG. 34B illustrates a processing flow of when the mobile terminal 20 performs settlement or when a product sold by weight is purchased. Each step is executed by, for example, the mobile terminal 20 but may be executed by another device. It is determined whether the store information had by the POS terminal 70 or the weighing device 30 and the entrance information had by the mobile terminal 20 match (step S1024). The process of step S1024 starts by interruption when a transition is made to the settlement process or when interconnection with the weighing device 30 is instructed. Details of the interconnection between the mobile terminal 20 and the weighing device 30 are described below. If it is determined that the store information had by the POS terminal 70 or the like and the entrance information had by the mobile terminal 20 match (step S1024: YES), processing ends. If it is determined that the store information had by the POS terminal 70 or the like and the entrance information had by the mobile terminal 20 do not match (step S1024: NO), settlement is disallowed, interconnection between the weighing device 30 and the mobile terminal 20 is disallowed, or another exception process is executed (step S1026). Step S1026 is described. Normally, the member having the mobile terminal is supposed to perform settlement in the store they entered. Moreover, they are supposed to use the weighing device of the store they entered.

However, for example, a situation wherein the member exits the store, enters another store, and attempts to perform settlement or a situation wherein the member attempts to use the weighing device 30 of another store can also be supposed. In this situation, settlement at the other store and purchasing a product sold by weight at the other store give rise to sales-calculation adjustment, inventory-management adjustment, and the like between the stores during settlement. This requires complex processing at the stores.

Therefore, performing settlement at another store that differs from the entered store or using the weighing device 30 of another store may be prohibited across the board. As above, settlement at another store may be disallowed and interconnection between the weighing device 30 and the mobile terminal 20 may be disallowed. This process prohibits the member from performing settlement in another store. Alternatively, the member is unable to use the weighing device 30. These measures enable inconveniences such as above to be avoided.

As the "other exception process," settlement may be performed by treating a product as a product carried by the store wherein the POS terminal 70 is disposed, regardless of the position information. Moreover, the mobile terminal 20 and the weighing device 30 may be interconnected, and a product may be registered in the mobile terminal 20 as a product of the store associated with the weighing device 30. Then, the POS terminal 70 may perform settlement by treating the product as a product of the store associated with the weighing device 30. Each store may perform a process of making adjustments for when an inventory count and sales figures do not match in theory and in reality.

Figure 35:
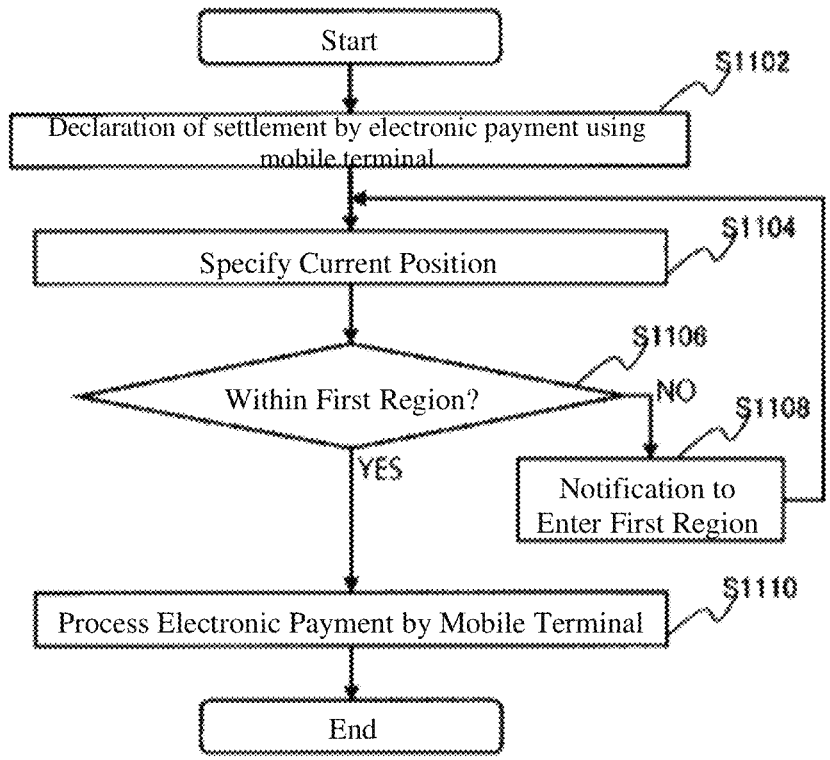
FIG. 35 shows an example of a processing flow in the mobile terminal of the sales-data processing system according to one or more embodiments.

FIG. 35 is one example of a processing flow of settlement in the mobile terminal 20. The processing flow is described below.

The mobile terminal 20 receives from the member an operation for declaring settlement by electronic payment (step S1102). One example of electronic payment is payment by credit card, payment by electronic money, or the like but is not limited thereto.

The mobile terminal 20 specifies the current position of this mobile terminal 20. This current position is the position of the mobile terminal 20 and is also the current position of the member.

The mobile terminal 20 determines whether the current position is in a first region (step S1106). One example of the first region is near a counter where the employee is present, near a credit-card payment desk where the employee is present, or the like. If the current position is such a position, the employee can monitor electronic payment using the mobile terminal 20 performed by the member. Moreover, the employee can also easily confirm the purchased product.

If it determines that the current position is not in the first region (step S1106: NO), the mobile terminal 20 issues a notification to enter the first region (step S1108). That is, because the member who has the mobile terminal 20 is present outside the first region, for example, the mobile terminal 20 displays a message on the display to enter the first region. The mobile terminal 20 may direct the member by displaying an in-store route to the first region (not illustrated) on the display. The flow then returns to step S1104. Meanwhile, if it determines that the current position is in the first region (step S1106: YES), the mobile terminal 20 executes the process of electronic payment (electronic payment process) (step S1110). That is, the mobile terminal 20 performs the electronic payment process because the member is present in the first region.

Figure 36:
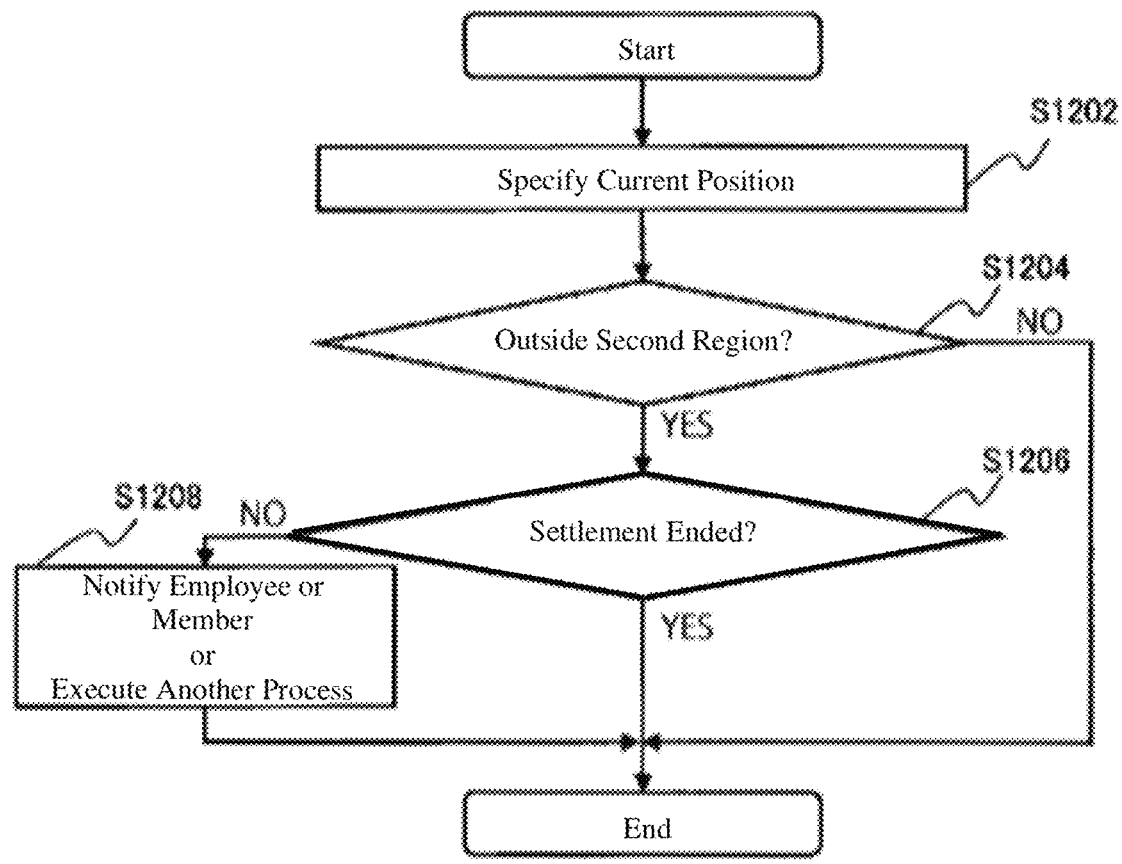
FIG. 36 shows an example of a processing flow in the mobile terminal of the sales-data processing system according to one or more embodiments.

FIG. 36 is one example of a processing flow in the mobile terminal 20 relating to monitoring the customer. Details of the processing flow are described below.

The processes illustrated in FIG. 36 start by interruption. For example, the processes illustrated in FIG. 36 start periodically or based on a specified phenomenon (event) having taken place in the mobile terminal 20. The "specified phenomenon" is, for example, (1) to (5) below.

(1) Reception (detection; likewise below) of an instruction to display a QR code or the like for settlement (read as shopping identification information for the POS terminal to perform settlement)
(2) Reception of an instruction to proceed to a subtotal screen
(3) Reception of an instruction to proceed to electronic payment
(4) Reception of an instruction to cancel all registered products
(5) Reception of an instruction to establish intercommunication with the weighing device Situations such as the above are important situations when shopping, and as such, the following processes therein may be performed. The mobile terminal 20 specifies the current position (step S1202).

The mobile terminal 20 determines whether the current position is outside a second region (for example, outside the store) (step S1204). If it determines that the current position is not outside the second region (for example, outside the store) (step S1204: NO), the mobile terminal 20 ends processing.

If it determines that the current position is outside the second region (for example, outside the store) (step S1204: YES), the mobile terminal 20 determines whether settlement is ended for the product registered using this mobile terminal 20 (step S1206). If it determines that settlement is ended (step S1206: YES), the mobile terminal 20 ends processing.

If it determines that settlement is not ended (step S1206: NO), the mobile terminal 20 notifies the employee or the member (step S1208). That is, because it is found that the member who has the mobile terminal 20 has exited the store despite settlement not being ended, information relating to this member is displayed to the employee. An example of what is displayed is as already described. Moreover, a notification (display) is made on the screen of the mobile terminal 20 for the member to, for example, return to the store. An example of this notification (display) is as already described. Alternatively, if store specification is performed again based on the acquired position information and it is found that the mobile terminal is present in a different store, the current store of the member can also be re-registered. In this situation, it is favorable to newly create a product basket of the re-registered store and, for the product basket that was already created, perform a process of, for example, placing this in a deferred state. Alternatively, because the member is outside the store, an initial screen for specifying the store may be returned to. This process can make it easier to take appropriate measures for a member that has not ended settlement.

—Embodiment Relating to Linkage between Weighing Device and Mobile Terminal—

FIG. 30 is once again referred to. The product-type acquisition means 203*a* in FIG. 30 acquires a type of, for example, a product sold by weight the member is attempting to purchase, via the mobile terminal or the like. A weight-value acquisition means 203*b* acquires a weight value of the acquired product sold by weight from the weighing device 30.

Products that need to be weighed have a unit price (price per Kg, price per item, or the like) set in advance for each product type. If the product type and the weight value of the product sold by weight the member is to purchase are known, a price of this product can be calculated using the unit price of this product type. The product type and the weight value thereof are acquired so the product can be registered and its price calculated. The product registration means 205 can register the product sold by weight using the product type of the product sold by weight and the weight value thereof.

Until the weight-value acquisition means 203*b* acquires the weight value corresponding to the product type, the display means 207 may display information indicating that the weight value is not acquired in each product type. Alternatively, a notification may be issued to weigh a product of the product type.

Furthermore, when the type of the product sold by weight is acquired, the settlement means 211 of the mobile terminal 20 may prohibit transitioning to the settlement process because until the weight value is acquired, the price of the product sold by weight is not established. Afterward, when the weight value of this product sold by weight is acquired, the settlement means 211 may lift the prohibition on transitioning to the settlement process.

Figure 37:
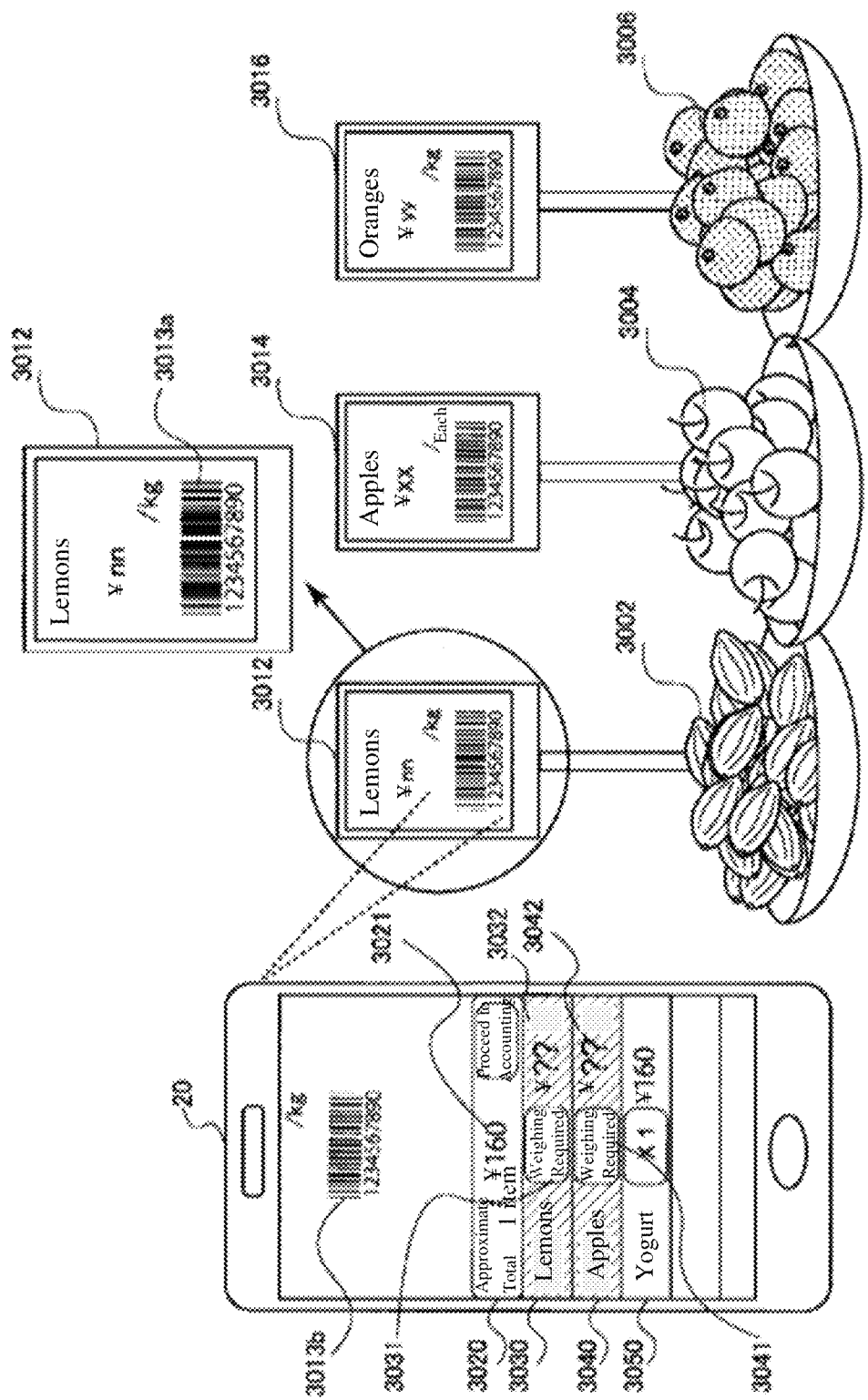
FIG. 37 is a diagram illustrating one example relating to purchasing a product sold by weight using the mobile terminal.

FIG. 37 illustrates using the mobile terminal 20 to acquire, using the mobile terminal, the type of the product sold by weight the member would like to purchase. In FIG. 37, lemons 3002, apples 3004, and oranges 3006 are displayed, and a sign 3012, sign 3014, and sign 3016 having a display are placed behind each product sold by weight.

For example, the sign 3012 displays the word "Lemons", that the price is per Kg, and that the unit price is nn yen. Moreover, a barcode 3013*a* is displayed so the mobile terminal 20 can read these units of information optically. These displays may be displayed in a state of being printed on paper or the like. Performing display using a display enables display reflecting a price cut during a time-based sale or the like to be rapidly performed. Moreover, by displaying the barcode 3013*a* by changing the barcode every predetermined amount of time, fraud of, for example, registering the product sold by weight at a different unit price by using the mobile terminal 20 to read, for example, a barcode photographed in advance by a camera can be prevented.

In the example illustrated in FIG. 37, the mobile terminal 20 displays a barcode 3013b provided on the lemons 3002 being read by the camera in the first display region 811 (see FIG. 13A). Moreover, the mobile terminal 20 displays information relating to yogurt (3050) that is already registered, information relating to the apples (3040) already read by the camera, and the like in the second display region 812 (see FIG. 13A). As the information relating to the apples (3040), a display of weighing being required (3041) and a price of ?? yen (3042) are displayed.

Furthermore, the mobile terminal 20 displays information relating to the lemons (3030) being read by the camera in the second display region 812 (see FIG. 13A). As the information relating to the lemons (3030), a display of weighing being required (3031) and a price of ?? yen (3032) are displayed. In the third display region 813 (see FIG. 13A), the mobile terminal 20 displays, as a subtotal field 3020, that one product is officially registered, that an approximate total thereof is 160 yen, and a button for proceeding to accounting ("accounting" key 813c). Because the weight values of the lemons and the apples are not obtained, weighing being required 3041 and weighing being required 3031 are notified, prompting the member to perform weighing. Moreover, because the weight values of the lemons and the apples are not obtained, ?? yen is displayed. Moreover, because the weight values of the lemons and the apples are not obtained, the information relating to the lemons (3030) and the information relating to the apples (3040) are displayed in an aspect whereby the member easily recognizes that weighing is not performed (in FIG. 37, in a hatched manner). FIG. 30 is once again referred to. The weighing device 30 includes an instruction receiver 331 and a transceiver 333. The instruction receiver 331 includes both a receiving function of receiving an instruction and a display function. The instruction receiver 331 and the transceiver 333 are controlled by the controller 335.

The transceiver 333 performs intercommunication with a communication means 215 of the mobile terminal 20. The instruction receiver 331 may be, for example, a display device having a touch panel. The instruction receiver 331 performs symbol-code display, message display, button display, and the like and can receive various instructions by screen-touching. Although not illustrated in FIG. 30, the weighing device 30 may be provided with a printer, a short-range radio device (Bluetooth, NFC, or the like), a function of performing weighing, a platform whereon what is to be weighed is placed, a reader that reads a symbol code, and the like.

The mobile terminal 20 and the weighing device 30 are associated by this mobile terminal 20 reading a symbol code displayed on this weighing device 30. Alternatively, the mobile terminal 20 and the weighing device 30 may be associated by this weighing device 30 reading a symbol code displayed on this mobile terminal 20. Then, upon the mobile terminal 20 and the weighing device 30 being associated, this mobile terminal 20 and this weighing device 30 enter into intercommunication using near field communication and transmit and receive information to and from each other.

The communication means 215 of the mobile terminal 20 may be made able to control the weighing device 30 via the transceiver 333 by using the established intercommunication, which is Bluetooth or the like.

Furthermore, the instruction receiver 331 of the weighing device 30 may prohibit establishment of intercommunication with the mobile terminal 20 when it is sensed that a customer not using the mobile terminal 20 has declared usage of the weighing device 30 or when a product is placed on the platform. If intercommunication establishment were not prohibited, attempting to establish intercommunication would only end in failure. However, because it takes time for the attempt to time out, it takes time to go from detecting the above declaration to weighing actually becoming possible. In contrast, prohibiting intercommunication establishment saves time by omitting this essentially unnecessary time (time until timing out) and causes weighing to be performed immediately. Operations may be such that the above prohibition is lifted upon, for example, label printing being completed.

Figure 38:
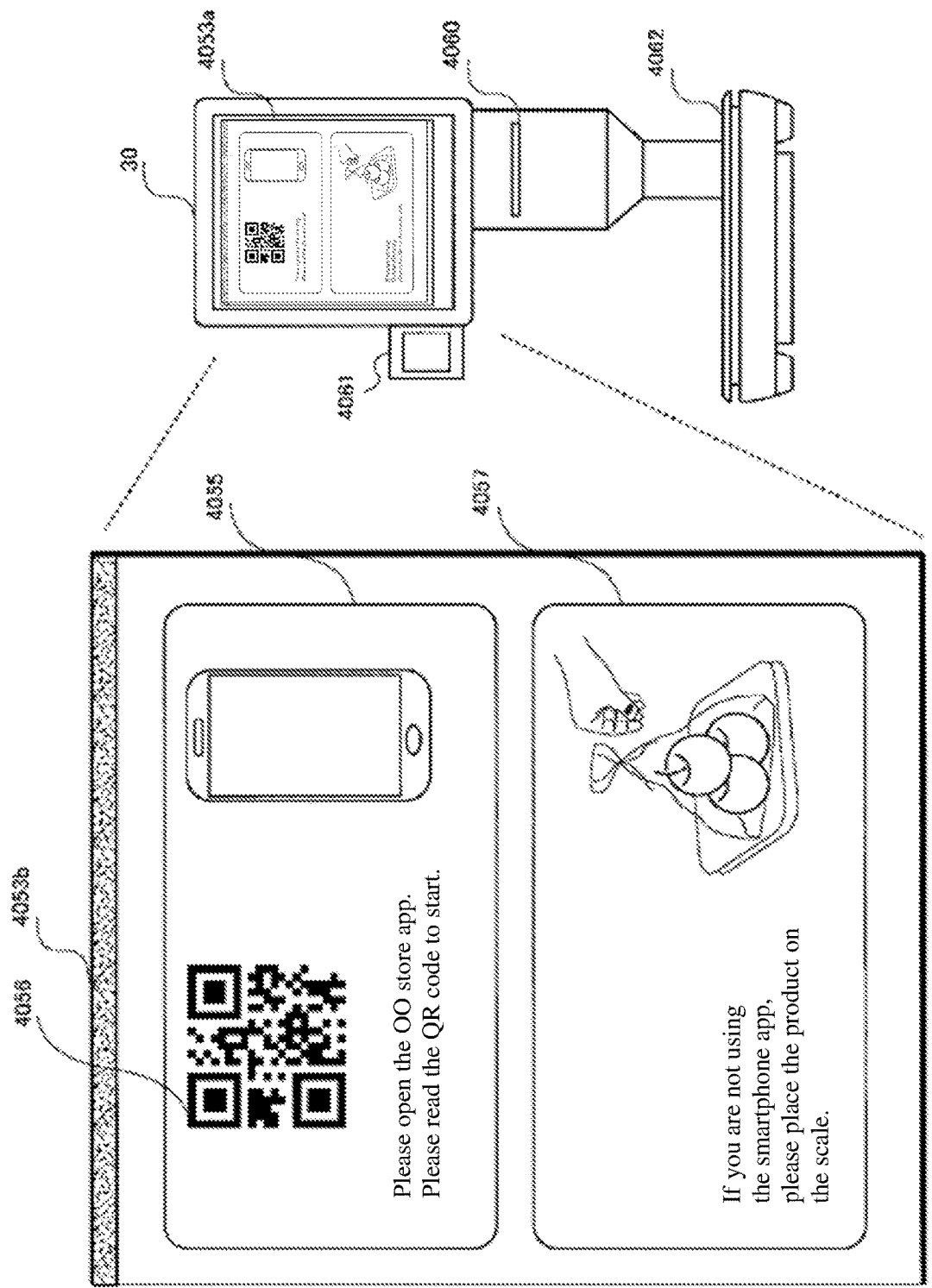
FIG. 38 is a diagram illustrating one example of display and the like in a weighing device.

FIG. 38 illustrates a display of the weighing device 30. In the example illustrated in FIG. 38, the weighing device 30 displays an initial screen 4053a. The initial screen 4053b is an enlarged display thereof. The initial screen 4053b includes a display region 4055 and a region 4057. The display region 4055 displays a symbol code 4056 used to establish intercommunication with the mobile terminal 20. The region 4057 displays an explanation screen for using this weighing device 30 instead of using the mobile terminal 20. When the customer would like to use the weighing device 30 instead of using the mobile terminal 20, it is sufficient for them to touch the display region 4057 or place the product on a platform 4062. Moreover, the weighing device 30 includes a print-label discharge port 4060 and a symbol-code reading unit 4061. The reading unit 4061 can read, for example, a symbol code displayed on the mobile terminal 20. FIG. 39 is a diagram illustrating the interconnection between the mobile terminal 20 and the weighing device 30.

Figure 39A:
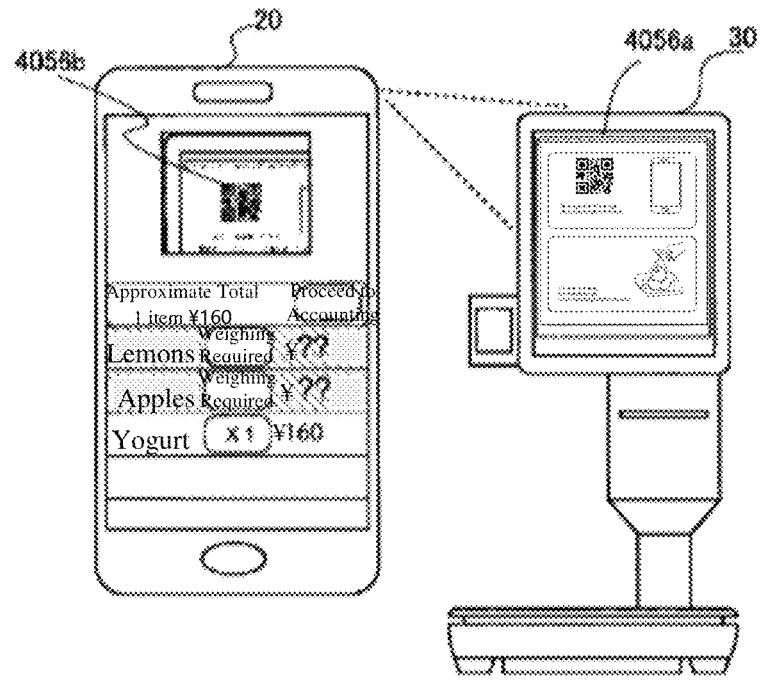
FIG. 39A is a diagram illustrating one example relating to interconnection between the mobile terminal and the weighing device.

FIG. 39A is a diagram illustrating a situation wherein the camera of the mobile terminal 20 has read a symbol code 4056a displayed on the weighing device 30. The mobile terminal 20 displays the photographed symbol code 4056b.

The detection means 204 of the mobile terminal 20 analyzes the symbol code and acquires information necessary for intercommunication. Using this information, the communication means 215 of the mobile terminal 20 and the transceiver 333 of the weighing device 30 can establish intercommunication by using near field communication such as Bluetooth. Intercommunication may be established by the reading unit 4061 of the weighing device 30 reading a symbol code displayed on the mobile terminal 20, and information necessary for intercommunication may be acquired by using NFC. After intercommunication is established, other radio communication, such as Wi-Fi; optical communication; a wide area network for mobile phones; or the like may be used in combination instead of using only near field communication such as Bluetooth.

Figure 39B:
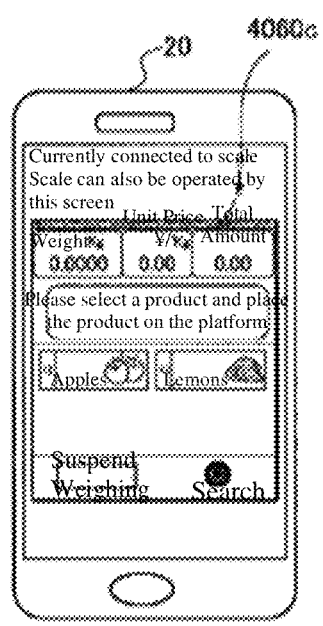
FIG. 39B is a diagram illustrating one example relating to interconnection between the mobile terminal and the weighing device.

FIG. 39B illustrates a situation wherein intercommunication is established and information on a product sold by weight registered by the mobile terminal 20 has been transmitted to the weighing device 30. The information on the product sold by weight registered by the mobile terminal 20 may be transmitted directly from the mobile terminal 20 to the weighing device 30 by intercommunication but may also be transmitted from the mobile terminal 20 to the weighing device 30 via another instrument or server device (not illustrated) such as the POS terminal 70 or the host device 10.

Figure 39C:
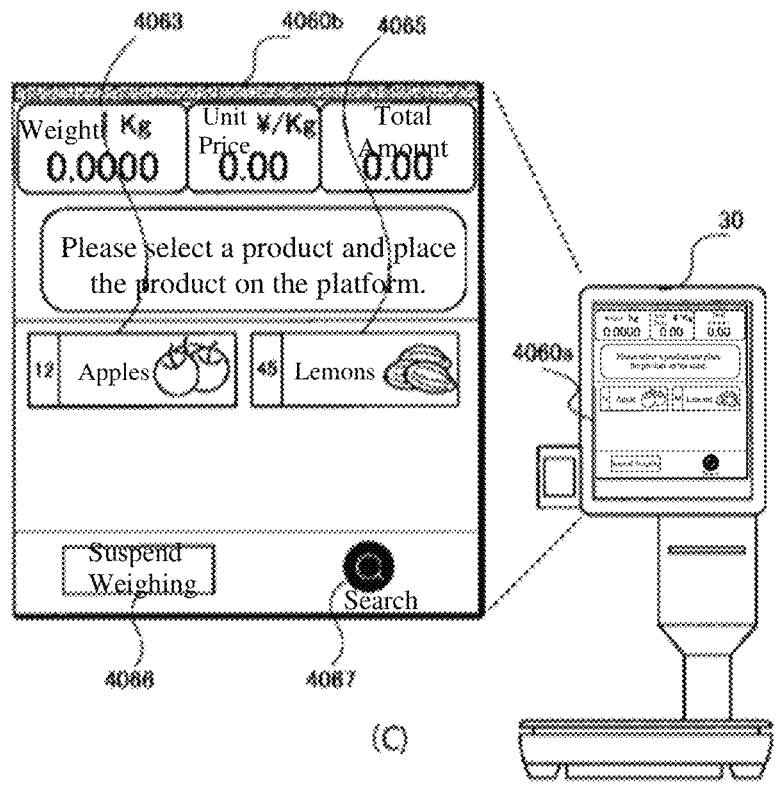
FIG. 39C is a diagram illustrating one example relating to interconnection between the mobile terminal and the weighing device.

In FIG. 39C, display information 4060a of the weighing device 30 is illustrated enlarged as display information 4060*b*. As illustrated in FIG. 39B, the same display information 4060*c* may also be displayed on the screen of the mobile terminal 20. Displaying the display information 4060*c* of the weighing device 30 on the mobile terminal 20 as well in this manner enables the member to issue instructions to the weighing device 30 from the mobile terminal 20. The mobile terminal 20 may display the product registration screen instead of displaying such a screen.

As illustrated in the display information 4060*b* of FIG. 39C, buttons 4063 and 4065 for apples and lemons, respectively, which are products sold by weight whose weight values are not yet acquired, are displayed. These two products sold by weight are displayed because, by reading the barcodes of the apples and lemons in FIG. 37, these product types were acquired by the camera of the mobile terminal 20. To prompt product selection and respectively weighing the apples and lemons had by the member, a notification is issued to "Please select the product and place this product on the platform".

Furthermore, a button 4066 for suspending weighing and a button 4067 for searching for a product sold by weight, to be used when a product not being displayed is also wanting to be weighed, are displayed.

Figure 40A:
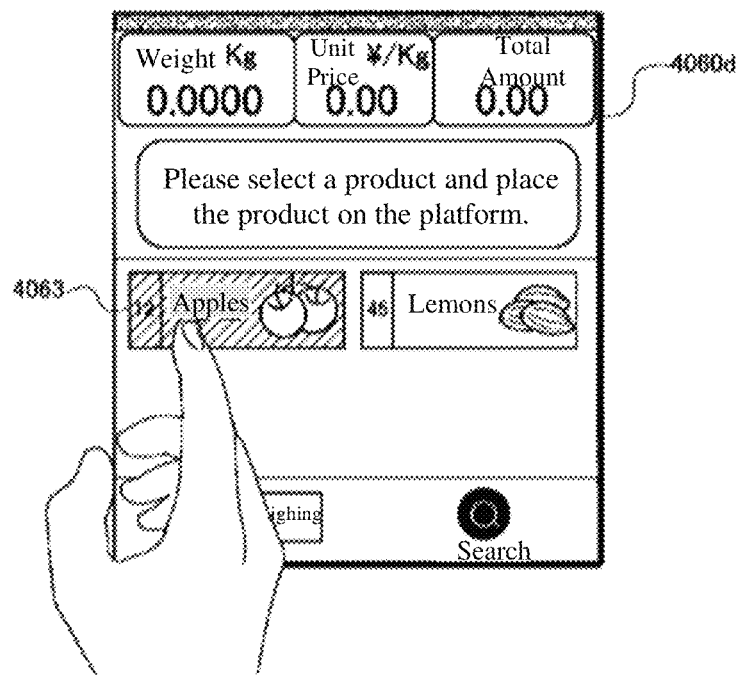
FIG. 40A is a diagram illustrating one example relating to weighing the product sold by weight.

FIG. 40 is a diagram illustrating weighing a product sold by weight. As illustrated in FIG. 40A, first, the member touches the apples button 4063 of display information 4060*d*. The member touching the apples button 4063 causes the apples button 4063 to be displayed in a highlighted manner. Moreover, the instruction receiver 331 of the weighing device 30 senses from this touching that apples are to be weighed. The display information then displays that the unit price of the apples is 360.00 yen/Kg. This unit price may be displayed by, for example, the weighing device 30 acquiring the unit price in advance from the product master of the store or acquiring the unit price from the product master upon the apples button 4063 being touched.

Figure 40B:
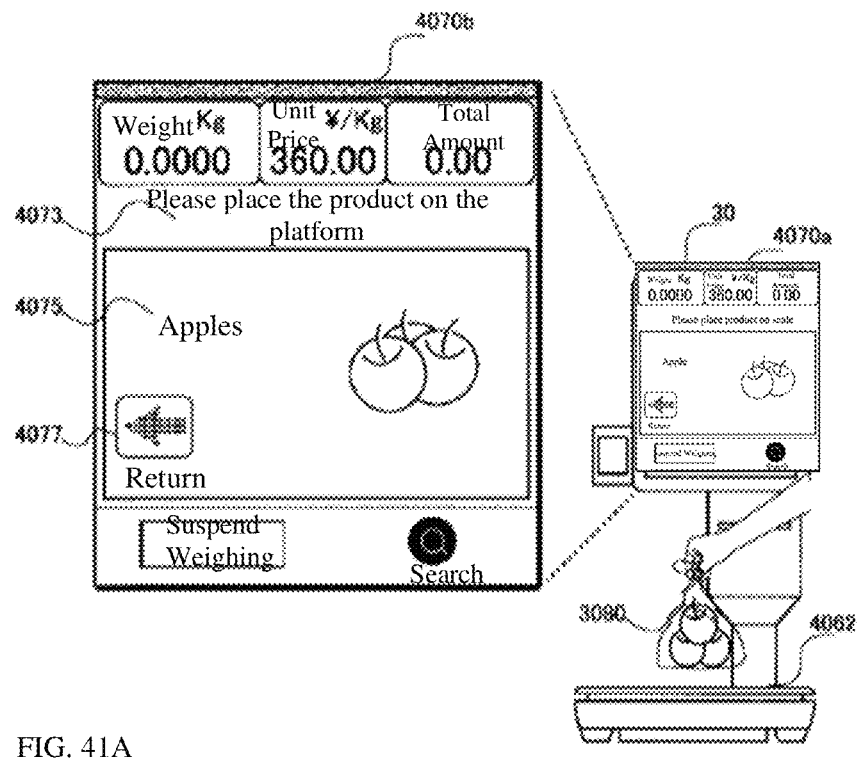
FIG. 40B is a diagram illustrating one example relating to weighing the product sold by weight.

FIG. 40B illustrates display information 4070*a* of the weighing device 30. Display information 4070*b*, which is an enlargement thereof, displays a display 4073 of "Please place the product on the platform" and prompts the member to place the apples on the platform 4062. Moreover, a display 4075 of the apples is displayed for easy comprehension by the member. In response to these displays, the member is attempting to place apples 3080 on the platform 4062. The return button 4077 is a button for returning to the previous screen and displaying the previous display information.

Figure 41A:
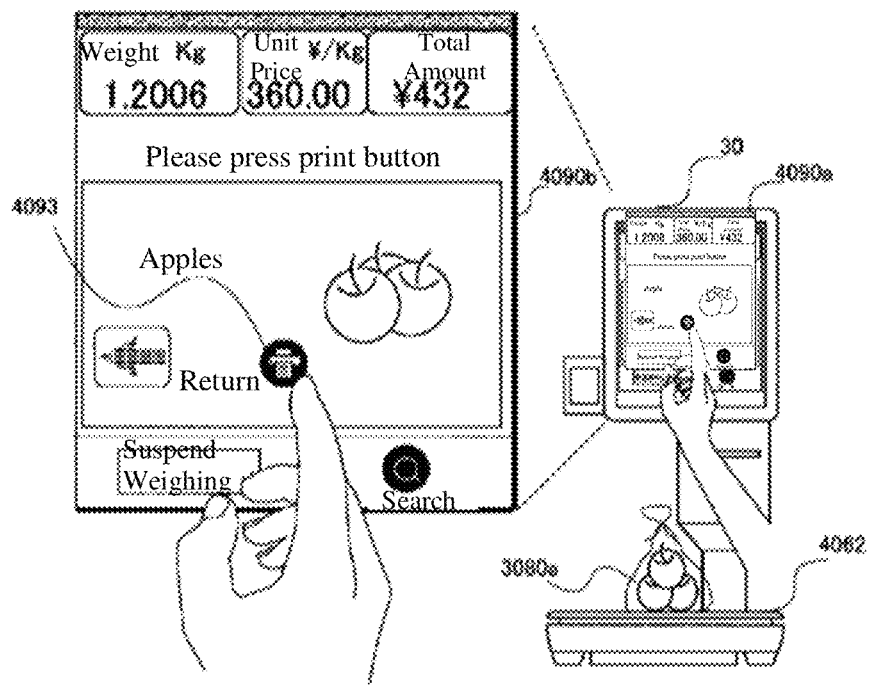
FIG. 41A is a diagram illustrating one example relating to weighing the product sold by weight.

FIG. 41 is a diagram illustrating weighing the product sold by weight. In FIG. 41A, because apples 3080*a* have been placed on the platform 4062, display information 4090*a* (4090*b*) indicates that the weight value thereof is 1.2006 Kg, that the unit price is 360.00 yen, and, based on the weight value and the unit price, that a total amount for the apples is 432 yen. It is sufficient to seek the total amount by calculation by, for example, rounding down to the nearest whole number.

The display information 4090*b* displays a print button 4093 for a label. The print button 4093 may be displayed only when the product has been placed on the platform and the weight value has stabilized. Alternatively, the print button 4093 may be darkened, such that printing is not performed even if it is pressed, until the weight value stabilizes and may be displayed brightly when the weight value stabilizes, such that printing is performed when it is pressed. Moreover, "Please press the print button" is displayed. Upon confirming that their operations have been correct, the member touches the print button 4093.

Figure 41B:
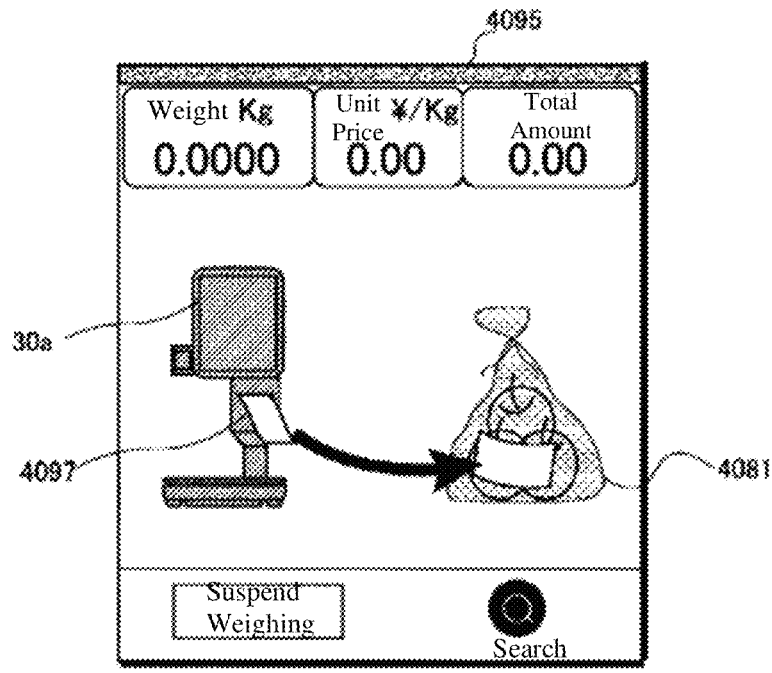
FIG. 41B is a diagram illustrating one example relating to weighing the product sold by weight.

FIG. 41B illustrates display information 4095, which is displayed after the print button 4093 is touched. The display information 4095 issues a notification prompting the member to affix a label 4097 to a bag 4081 of the product when the label 4097 is printed from the weighing device 30. The label may be configured so no symbol code including information on the weight value is printed thereon. The product type and the weight value may be transmitted using intercommunication from the transceiver 333 of the weighing device 30 to the mobile terminal 20 via the communication means 215 of the mobile terminal 20. Moreover, the weighing device 30 may transmit the product type and the weight value via a communication line so they are saved in a member basket provided in another host device of the store.

Figure 42A:
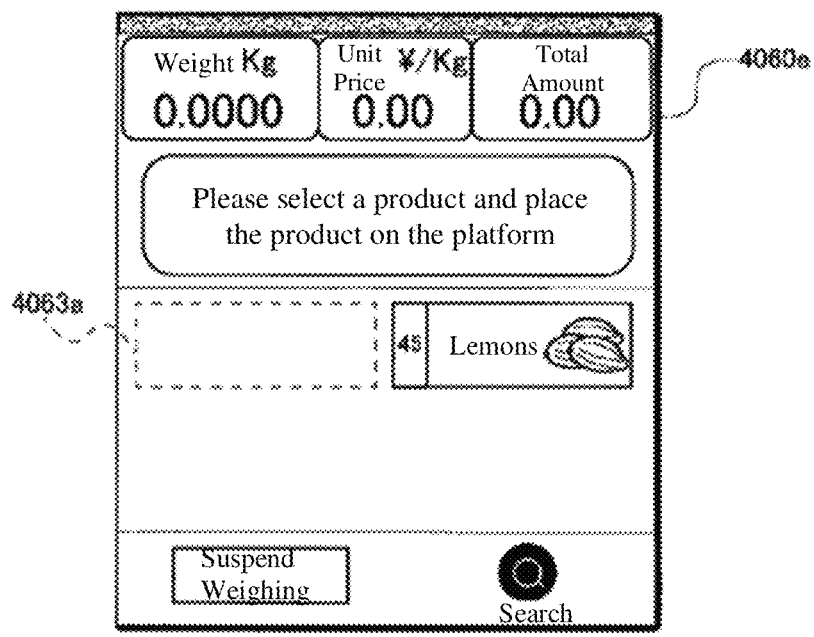
FIG. 42A is a diagram illustrating one example relating to weighing the product sold by weight.

FIG. 42 is a diagram illustrating an appearance after the weight value is acquired. As illustrated in FIG. 42A, no apples are displayed in a region 4063*a* of display information 4060*e*, which follows weight-value acquisition. That is, display of the apples is deleted because the weighing device 30 has already acquired the weight value of the apples and printed the label.

Figure 42B:
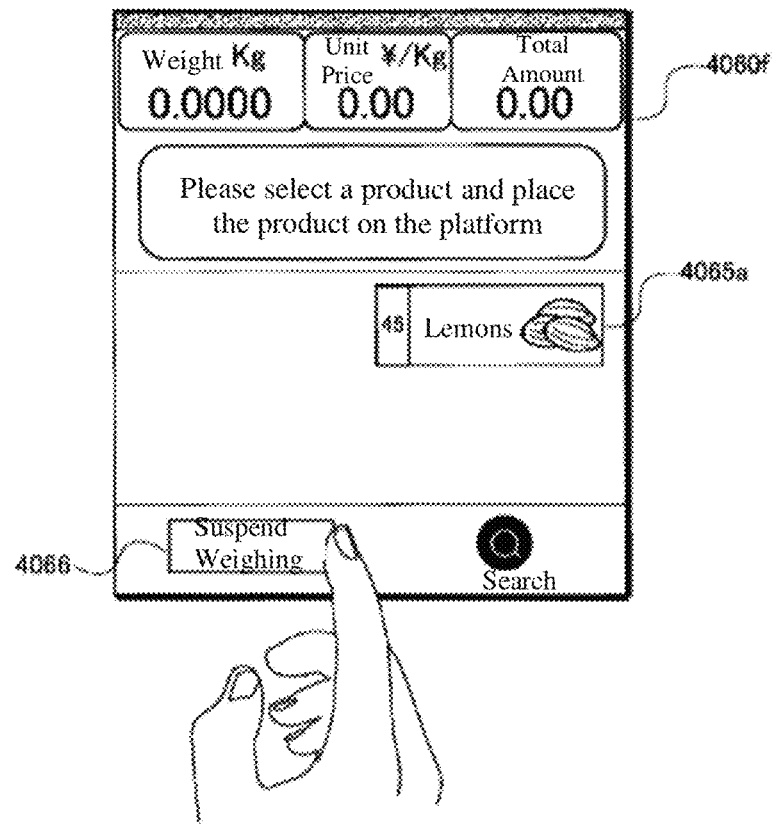
FIG. 42B is a diagram illustrating one example relating to weighing the product sold by weight.

FIG. 42B illustrates a situation wherein the member has touched the button 4066 for suspending weighing. Because a display 4065*a* of the lemons remains in display information 4060*f*, it is sought of the member to weigh the lemons. However, even in such a circumstance, weighing can be suspended based on what the member would like to do.

FIG. 43 is a diagram illustrating an appearance after weighing is ended or suspended.

Figure 43A:
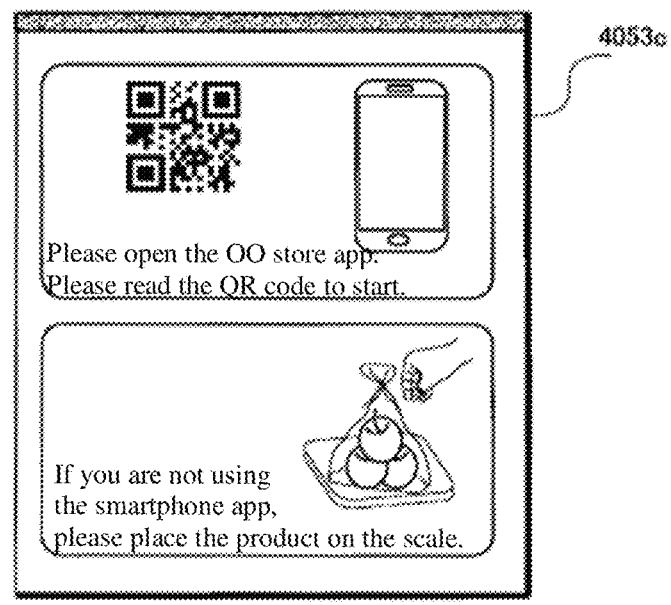
FIG. 43A is a diagram illustrating one example relating to weighing the product sold by weight.

As illustrated in FIG. 43A, upon ending or suspending weighing, the weighing device 30 displays initial display information 4053*c*. This enables another member to interconnect the mobile terminal 20 and the weighing device 30. This also enables a customer who does not have a mobile phone to use the weighing device 30.

Figure 43B:
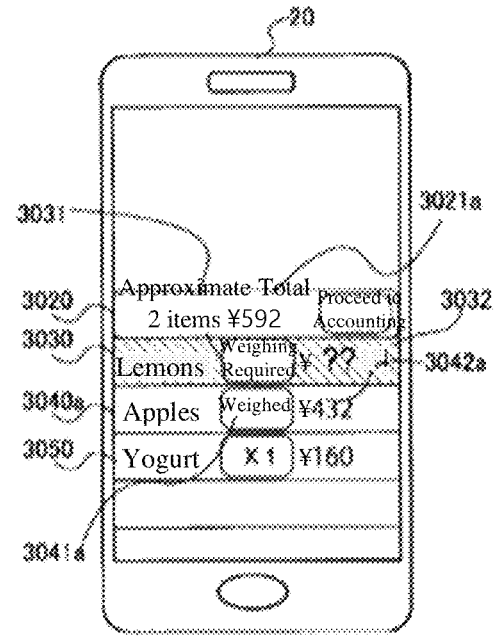
FIG. 43B is a diagram illustrating one example relating to weighing the product sold by weight.

FIG. 43B illustrates a display of the mobile terminal 20. Because weighing of the apples is completed and the mobile terminal 20 has acquired the weight value of the apples, the display field 3040*a* of the apples is changed from hatched display to normal display. Moreover, display of a position 3041*a* wherein an item count is normally displayed is changed from "Weighing required" to "Weighed". By this display, it is understood that the apples are a product whose weight is weighed. This change in display enables the member to confirm that the apples they are attempting to purchase have been properly registered. In contrast, the display field 3030 of the lemons is unchanged because weighing was not performed. Because hatched display is still being performed, it is understood that the lemons are being treated in the same manner as a deferred product, as described above. In this manner, in one or more embodiments, a product whose weight value is not acquired can be treated in the same manner as a deferred product. The amount in the approximate-total field 3020 has the price of the apples, 432 yen, added to 160 yen such that an amount 3021*a* is changed to 592 yen.

FIG. 30 is once again referred to. The registration means 205 of the mobile terminal 20 may be configured so when an instruction is issued to change an item count of a product sold by weight, it receives only an instruction to change the item count to zero (that is, perform an action equivalent to canceling registration). This is because in dealing with a product sold by weight, it is not assumed that there is a plurality of products of the same weight.

Furthermore, a portion of the products may be sold by calculating an item count from a total weight value. For example, the weighing device 30 may calculate an item count from a total weight of the apples and sell the apples as a product sold by quantity. For example, the weighing device 30 may perform registration at 150 yen per apple or 450 yen per three apples in issuing labels and conducting sales. Although such products are products sold using the weighing device 30, because the unit price is constant, at 150 yen (because it can also be said that there is a plurality of products of the same weight), the quantity (item count) may be able to be changed to 2 or more. Moreover, such products may be able to be registered by using the mobile terminal 20 in the first place instead of using the weighing device 30. For example, as illustrated in FIG. 37, the apples may be able to be registered by reading the code of the product type of the apples and afterward having the member input the item count.

Furthermore, in, for example, quantity-based sales of candy at 5 yen per piece, wherein purchasing 20 or 30 pieces is commonplace, it is bothersome for the member to actually count the pieces. As such, the candy item count may be calculated from a unit weight and a weight value of the candy. It is possible to require use of the weighing device 30 for such a product. Moreover, for such a product, changing the quantity (item count) to 2 or more may be prohibited—that is, only an instruction to change the item count to zero may be received. Instead of changing the item count to zero, a change may be approved for adjusting (correcting) a lightweight error—for example, a change within an upper limit and a lower limit (for example, an error range of about ±1 per 20 pieces).

Figure 44A:
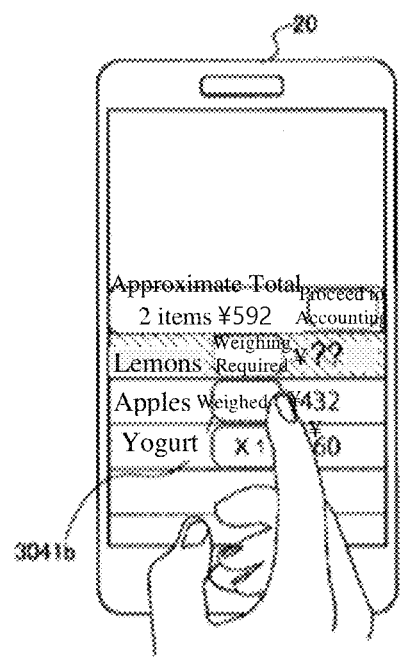
FIG. 44A is a diagram illustrating one example relating to registration cancellation or the like of the product sold by weight.

FIG. 44 is a diagram illustrating cancellation and the like of a product sold by weight. FIG. 44A illustrates a situation of the member touching a button 3041b displayed as weighed to change a quantity of apples.

Figure 44B:
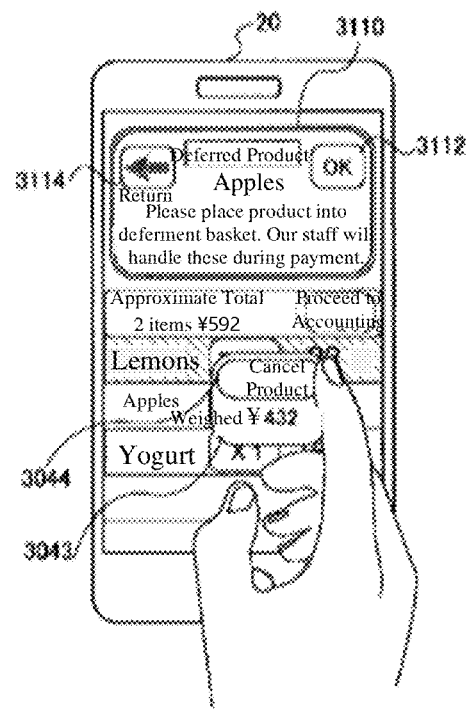
FIG. 44B is a diagram illustrating one example relating to registration cancellation or the like of the product sold by weight.

FIG. 44B illustrates a subsequent pop-up display 3043 and notification display 3110. The pop-up display 3043 displays a product cancellation button 3044. If the product can have its item count changed, as illustrated in FIG. 11A, the button 820a and the button 820b that instruct increasing or decreasing the quantity are displayed. FIG. 44B is a display similar to the pop-up display 821 in FIG. 11B. In FIG. 44B, the product cancellation button 3044 is touched by the member. When this operation is performed, the notification display 3110 is displayed. This display prompts the member to place the apples in the deferment basket. Moreover, the cancellation operation can be aborted by pressing a return button 3114. Moreover, an OK button 3112 is a button that conveys to the mobile terminal 20 that the member has agreed to take this measure. The member places the apples in the deferment basket. The deferment basket is one example; it is sufficient to be able to distinguish such a product from the other registered products. Alternatively, a notification may be issued to, for example, return the product to the display shelf of the product.

Figure 44C:
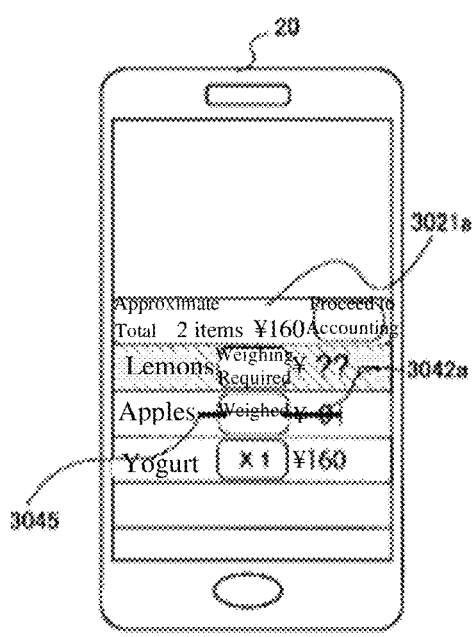
FIG. 44C is a diagram illustrating one example relating to registration cancellation or the like of the product sold by weight.

FIG. 44C is a diagram illustrating a display of the mobile terminal 20 after the member touches the OK button 3112. Because registration of the apples has been canceled, a cancellation line 3045 is displayed, and the price of the apples is changed to a display of 0 yen 3042a. Moreover, the approximate-total amount 3021a is also changed to 160 yen, reflecting the cancellation of the apples. The cancellation line 3042a is one example of clearly indicating that cancellation was performed, and the display field per se of the apples may be deleted. Alternatively, the mobile terminal 20 may, instead of executing cancellation, indicate that a cancellation instruction was issued. In this situation as well, the product may continue to be treated as a deferred product, the display 3110 relating to deferred products may be displayed, and the member may be prompted to place the product in the deferment basket. FIG. 45 is a diagram illustrating one example of operations of the mobile terminal 20 instructed to perform the settlement process (instructed to proceed to accounting) when there is a product whose weight value was unable to be acquired.

Figure 45A:
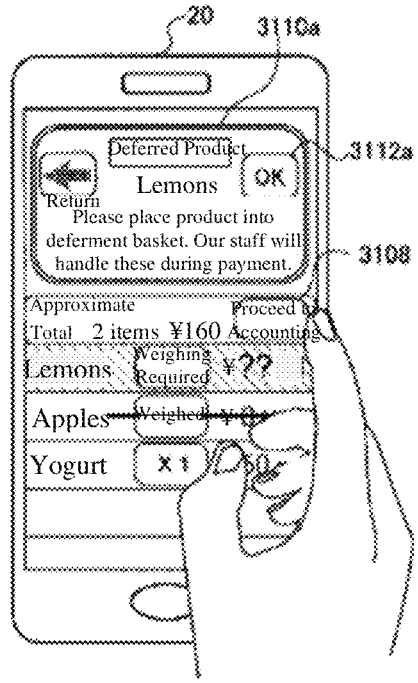
FIG. 45A is a diagram illustrating one example of operations of a mobile terminal instructed to perform a settlement process when there is a product whose weight value was unable to be acquired.

FIG. 45A is a diagram of when a button 3108 for proceeding to accounting is pressed by the member when there is a product whose weight value was unable to be acquired. In response to this instruction, the mobile terminal 20 displays the display 3110 relating to deferred products. The member is then prompted to place the lemons, whose weight value is not acquired, in the deferment basket. Afterward, the member touches an OK button 3110a. If the weight values of all product types to be weighed are acquired, the display 3110a relating to deferred products is not displayed. In this situation, the prohibition on the settlement process is lifted, and the member can proceed to the settlement process.

Figure 45B:
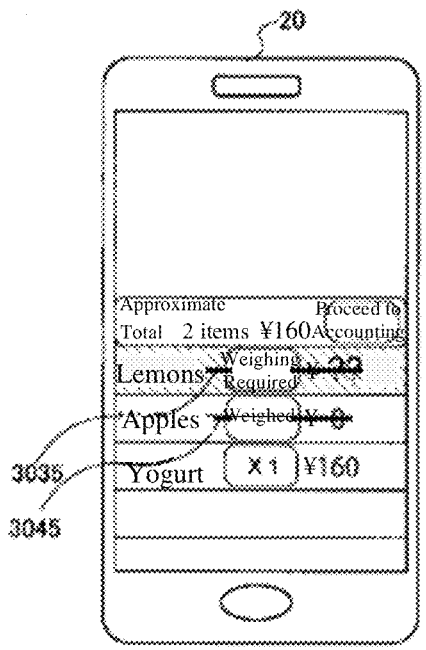
FIG. 45B is a diagram illustrating one example of operations of a mobile terminal instructed to perform a settlement process when there is a product whose weight value was unable to be acquired.

FIG. 45B is a diagram illustrating a display screen of the mobile terminal 20 after the OK button 3110a is touched. A cancellation line 3035 is displayed on the display of the lemons, whose weight value was unable to be acquired.

Such a product crossed out by the cancellation line can be treated in the same manner as a deferred product, as described above. When the display 3110 relating to deferred products is performed, a notification may be issued that calls over the employee. Alternatively, a notification that calls over the employee may be performed without performing the display 3110 relating to deferred products.

Figure 46:
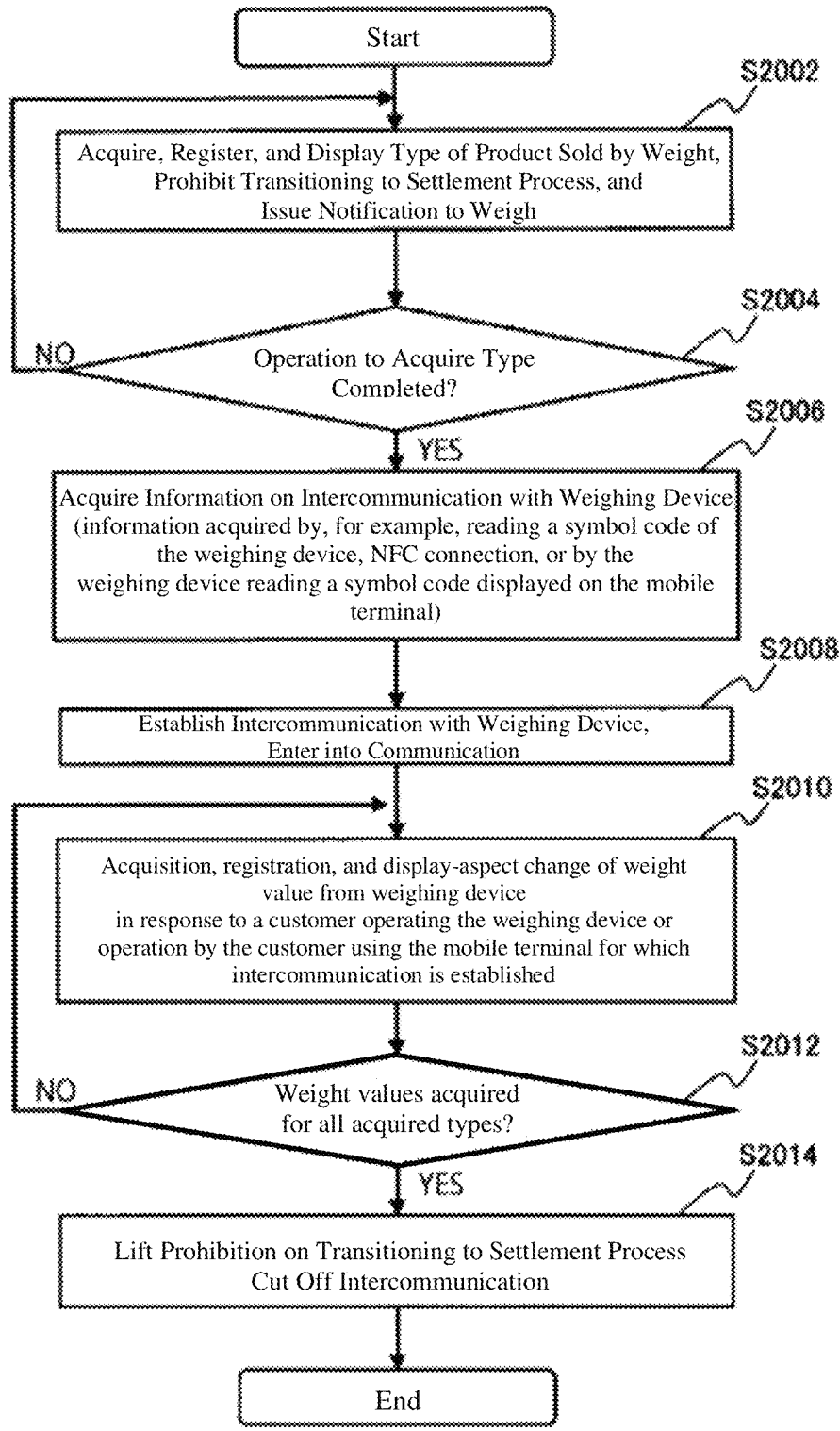
FIG. 46 shows an example of a flow illustrating coordinated operation of the mobile terminal and the weighing device.

FIG. 46 is a flowchart illustrating coordinated operation of the mobile terminal 20 and the weighing device 30.
(Step S2002)

The mobile terminal 20 reads a symbol code of a product sold by weight. By this, the mobile terminal 20 acquires a type of the product sold by weight. The acquired type of the product is registered in the mobile terminal 20 and displayed on a screen. At this stage, no weight value of a weighed product is acquired. As such, transitioning to the settlement process is prohibited. The member operating the mobile terminal 20 may be allowed to press the button 3108 for proceeding to accounting. That is, a configuration may be such that the settlement process is not transitioned to even if the member presses the button 3108 for proceeding to accounting. In this situation, as already described, it is sufficient to prompt the member to place the product whose weight value is not acquired in the deferment basket. Moreover, as illustrated in FIG. 39, a notification of "Weighing required" to acquire the weight value may be issued and a notification to acquire the weight value may be issued. Processing proceeds to step S2004.
(Step S2004)

The mobile terminal 20 determines whether the operation of acquiring the type is completed. If it determines that the operation of acquiring the type is completed (YES), the processing proceeds to step S2006. If it determines that the operation of acquiring the type is not completed (NO), the processing returns to step S2002. It may be determined that the operation of acquiring the type is completed when the button 3108 for proceeding to accounting is pressed.
(Step S2006)

Information relating to intercommunication (information for establishing intercommunication) is acquired. The information relating to intercommunication is acquired by, for example, the mobile terminal 20 reading a symbol code displayed on the weighing device 30. The information relating to intercommunication may be acquired by an NFC connection or by the weighing device 30 reading a symbol code displayed on the mobile terminal 20. The processing proceeds to step S2008.

(Step S2008)

Intercommunication is established between the mobile terminal 20 and the weighing device 30. The mobile terminal 20 and the weighing device 30 enter into near field communication such as Bluetooth. The processing proceeds to step S2010.

(Step S2010)

By the customer operating the weighing device 30, the mobile terminal 20 acquires the weight value from the weighing device 30 and registers the product. Alternatively, by the customer operating the mobile terminal 20 that has established intercommunication with the weighing device 30, the mobile terminal 20 acquires the weight value from the weighing device 30 and registers the product. So the customer can recognize that the weight value is acquired, the mobile terminal 20 may change a display aspect of the field of the product whose weight value is acquired. Moreover, a price may be calculated from the weight value and a unit price, and the price may be displayed. The processing proceeds to step S2012.

(Step S2012)

The mobile terminal 20 determines whether weight values are acquired for all acquired product types (for all products sold by weight whose types are acquired). If it determines that weight values are acquired for all product types (YES), the processing proceeds to step S2014. If it determines that weight values are not acquired for at least a portion of the product types (NO), the processing returns to step S2010.

(Step S2014)

The prohibition on transitioning to the settlement process is lifted. Intercommunication is then cut off.

The above ends the coordinated operation of the weighing device 30 and the mobile terminal 20.

Figure 47:
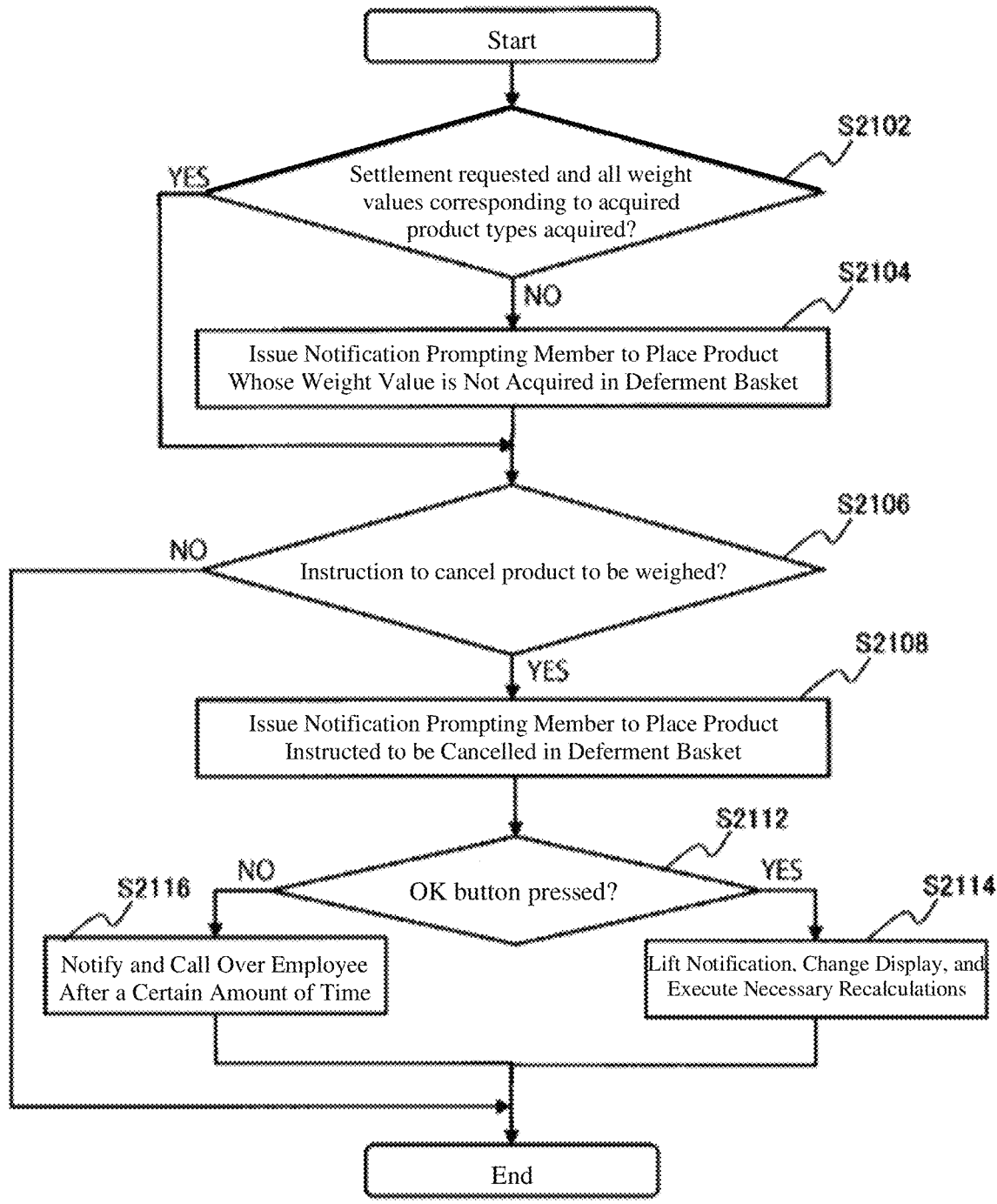
FIG. 47 shows an example of a processing flow in the mobile terminal of the sales-data processing system according to one or more embodiments.

FIG. 47 is one example of a processing flow of the mobile terminal 20 when weight-value acquisition is incomplete (when there is a registered product whose weight value is not acquired). The processing illustrated in FIG. 47 starts by interruption. For example, the processing illustrated in FIG. 47 starts when an instruction to proceed to accounting (a press of the button 3108 for proceeding to accounting) is received or when an instruction to cancel a product that was to be weighed is received.

The mobile terminal 20 determines whether all weight values corresponding to the acquired product types are acquired (step S2102). If it determines that all weight values are acquired (step S2102: YES), the processing proceeds to step S2106. If it determines that at least a portion of the weight values is not acquired (step S2102: NO), the processing proceeds to step S2104.

The mobile terminal 20 issues a notification prompting the member to place a product whose weight value is not acquired in the deferment basket (step S2104). That is, because the button 3108 for proceeding to accounting is pressed, a notification is issued prompting the member to place all products whose weight value is not acquired in the deferment basket. The processing proceeds to step S2106.

The mobile terminal 20 determines whether there was an instruction to cancel a product that was to be weighed (step S2106). If it determines that there was an instruction to cancel a product that was to be weighed (step S2106: YES), the processing proceeds to step S2108. If it determines that there was no instruction (step S2106: NO), the processing ends.

The mobile terminal 20 issues a notification prompting the member to place the product instructed to be canceled in the deferment basket (step S2108).

Following step S2108, the mobile terminal 20 determines whether an OK button is pressed (step S2112). The OK button is, for example, the OK button 3110 in FIG. 44B and is a button pressed when the member accepts placing a product whose weight value is not acquired in the deferment basket. If it determines that the OK button is pressed (step S2112: YES), the processing proceeds to step S2114. If it determines that the OK button is not pressed (step S2112: NO), the processing proceeds to step S2116.

The mobile terminal 20 lifts (ends) the notification of step S2108 and changes display by, for example, adding a cancellation line (step S2114). It then changes the price of the canceled product to 0, executes recalculation of the total amount, and updates display of the total amount. The processing then ends.

The mobile terminal 20 calls over the employee (step S2116). For example, the mobile terminal 20 may notify the employee after a certain amount of time has passed (when no operations have taken place for a certain amount of time). This notification calls over the employee by being transferred from the mobile terminal 20 to a host device, a POS terminal, or the like. Afterward, the called-over employee performs confirmation. FIG. 48 is one example of a processing flow of the mobile terminal 20.

Figure 48A:
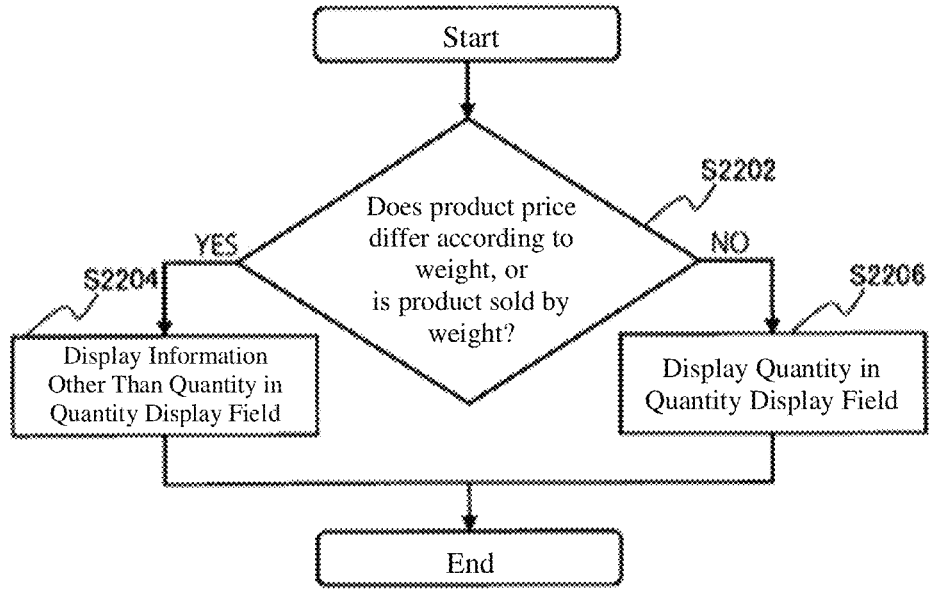
FIG. 48A shows an example of a processing flow in the mobile terminal of the sales-data processing system according to one or more embodiments.

FIG. 48A is a flowchart illustrating operations of displaying the registration information of the mobile terminal 20. The mobile terminal 20 determines whether a registered product is a product whose price differs according to weight or a product sold by weight (step S2202). If it determines that the registered product is a product whose price differs according to weight or a product sold by weight (step S2202: YES), the mobile terminal 20 displays information other than quantity in the quantity display field (step S2204), and processing ends. If it determines that the registered product is neither a product whose price differs according to weight nor a product sold by weight (step S2202: NO), the mobile terminal 20 displays a quantity in the quantity display field (step S2206), and the processing ends.

Figure 48B:
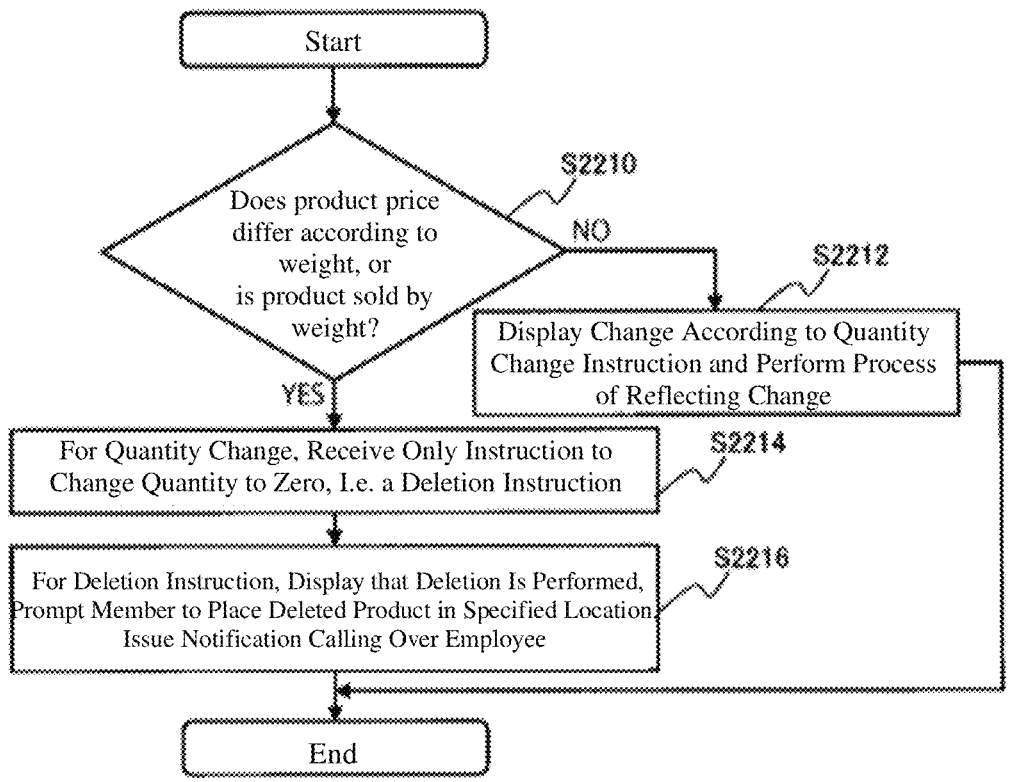
FIG. 48B shows an example of a processing flow in the mobile terminal of the sales-data processing system according to one or more embodiments.

FIG. 48B is a flowchart illustrating operations of changing the registration information of the mobile terminal 20. The mobile terminal 20 determines whether a registered product is a product whose price differs according to weight or a product sold by weight (step S2210). If it determines that the registered product is a product whose price differs according to weight or a product sold by weight (step S2210: YES), processing proceeds to step S2214. Meanwhile, if it determines that the registered product is neither a product whose price differs according to weight nor a product sold by weight (step S2210: NO), the mobile terminal 20 displays a change according to a quantity change instruction and performs a process of reflecting this change (step S2212). That is, it calculates an amount according to the changed quantity (amount of the product, total amount) according to the member's quantity change instruction and displays the calculated amount. The processing then ends.

Regarding the quantity change, the mobile terminal 20 receives only an instruction to change the quantity to zero—that is, a deletion instruction (product cancellation instruction) (step S2214). The processing proceeds to step S2216.

In a situation of a deletion instruction (product cancellation instruction), the mobile terminal 20 displays that deletion has been performed, prompts the member to place the deleted product in a specified location, and, if necessary, issues a notification calling over the employee (step S2216). The processing then ends.

Figure 49:
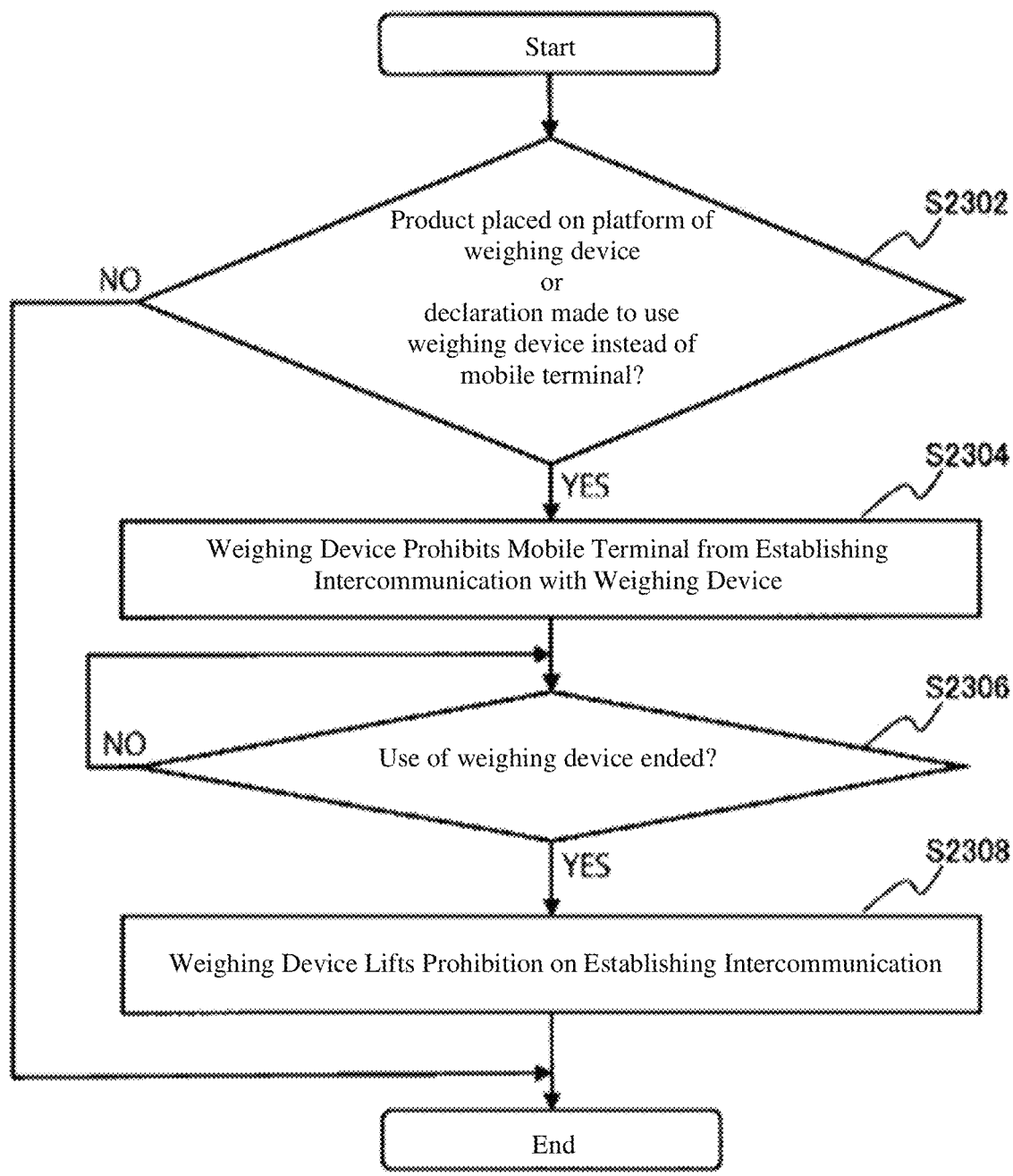
FIG. 49 shows an example of a processing flow in the weighing device of the sales-data processing system according to one or more embodiments.

FIG. 49 is a flowchart illustrating operations of the weighing device 30 in manual operation of the weighing device—that is, when the customer uses the weighing device 30 instead of using the mobile terminal 20. The weighing device 30 determines whether a product is placed on the platform of this weighing device 30 or a declaration is made to use the weighing device 30 instead of using the mobile terminal 20 (step S2302). The declaration is an example of information indicating that the customer uses a weighing function of weighing a product sold by weight without use of the mobile terminal 20. The weighing device 30 determines that the above declaration is made when the customer touches the display region 4057 in FIG. 38. If it determines that a product is placed on the platform of this weighing device 30 or a declaration is made to use the weighing device 30 instead of using the mobile terminal 20 (step S2302: YES), processing proceeds to step S2304. If it determines that neither is the case (step S2302: NO), the processing ends.

The weighing device 30 prohibits the mobile terminal 20 from establishing intercommunication with the weighing device 30 (step S2304). This is because customer operations may be impeded if the mobile terminal 20 attempts to connect to the weighing device 30 when the customer is operating the weighing device 30. A method of the weighing device 30 prohibiting establishment of intercommunication is, for example, not displaying the symbol code 4056 (see FIG. 38). The processing transitions to step S2306.

The weighing device 30 determines whether use of this weighing device 30 by the customer is ended (step S2306). If it determines that use is ended (step S2306: YES), the prohibition on establishing intercommunication is lifted (step S2308), and the processing ends. Meanwhile, if it determines that use is not ended (step S2306: NO), this process (step S2306) is repeated.

Figure 50:
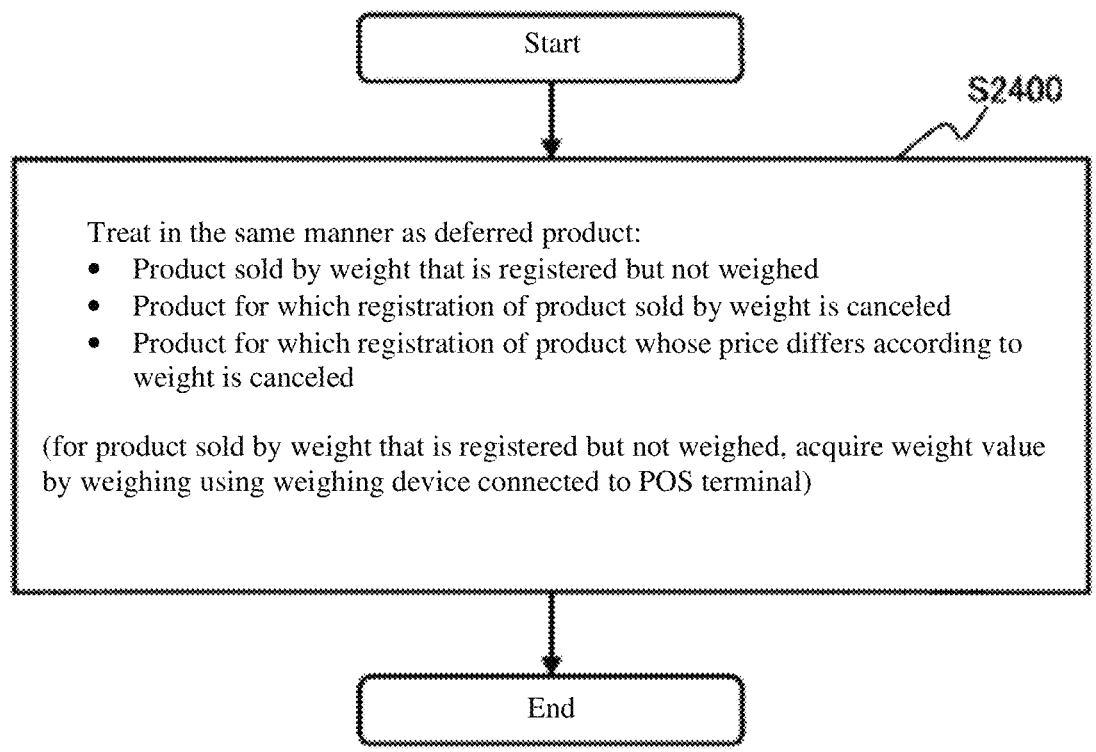
FIG. 50 shows an example of a processing flow in the POS terminal of the sales-data processing system according to one or more embodiments.

FIG. 50 is a flowchart of operations of the POS terminal 70. The POS terminal 70 may be any type of POS terminal—for example, a self-checkout POS terminal operated by the member themself or a POS terminal using employee intervention. As indicated in step S2400, the POS terminal 70 can perform the following operations.

That is, the POS terminal (settlement device) 70 treats the following products in the same manner as a deferred product:
  A product sold by weight that is registered but not weighed
  A product for which registration of a product sold by weight is canceled
  A product for which registration of a product whose price differs according to weight is canceled.
Treatment of a deferred product is as already described.

For a product sold by weight that is registered but not weighed, it is sufficient to acquire the weight value by weighing using the weighing device 30 connected to the POS terminal 70.

The steps of each processing flow according to one or more embodiments may have their ordering switched as long as no contradiction arises therefrom. Moreover, these may be executed simultaneously as long as no contradiction arises therefrom. Moreover, one or more embodiments are not mutually exclusive, and as appropriate, it is also possible to combine a portion or an entirety of a certain embodiment with a portion or an entirety of another embodiment.

(Note A1)
A mobile terminal according to one or more embodiments includes: a product-type acquisition means that acquires a type of a product sold by weight; a transceiver that establishes intercommunication with a second communication means of a weighing device that weighs the product sold by weight; a weight-value acquisition means that acquires a weight value of the product sold by weight weighed by the weighing device for which intercommunication is established; and a product registration means that registers the type of the product and the weight value, which corresponds to the type of the product. This facilitates a purchase of a product sold by weight using a mobile terminal.

(Note A2)
The mobile terminal of note A1 may be further provided with: a display that, when the type of the product sold by weight is acquired, displays the type of the product sold by weight, in an aspect whereby it can be recognized that the weight value is not acquired, until the weight value corresponding to the product sold by weight is acquired.

(Note A3)
The mobile terminal of note A1 or note A2 may be further provided with: a detection means that detects an instruction from a customer to the weighing device; wherein the transceiver transmits the instruction from the customer, who operates this mobile terminal, to the weighing device.

(Note A4)
The mobile terminal of note A1 or note A2 may establish intercommunication with the weighing device by reading a symbol code that corresponds to the weighing device and includes information used to establish the intercommunication with the weighing device.

(Note A5)
The mobile terminal of any one among note A1 to note A3 may be further provided with: a first settlement means that, when the type of the product sold by weight is acquired, prohibits transitioning to a settlement process and, when the weight value corresponding to the product sold by weight is acquired, lifts the prohibition.

(Note A6)
The mobile terminal of any one among note A1 to note A5 may be further provided with: a notification means that, when the type of the product sold by weight is acquired, prompts weighing the product sold by weight by a scale until the weight value corresponding to the product sold by weight is acquired.

(Note A7)
A weighing device according to one or more embodiments includes: an instruction receiver that receives an instruction from an operating entity; and a communication means that establishes intercommunication with a mobile terminal; wherein the communication means, when the instruction receiver receives from a customer a declaration of using a weighing function of weighing a product sold by weight instead of using the mobile terminal or when a product sold by weight is placed on a platform, prohibits establishing communication with the mobile terminal until use of the weighing function ends.

(Note A8)
A POS terminal according to one or more embodiments includes: a display means that displays information, obtained via a mobile terminal, on a product sold by weight whose weight value is not acquired from a weighing device; and a settlement means; wherein the display means, until the weight value is acquired from the weighing device or registration of the product sold by weight is canceled, displays the product sold by weight whose weight value is not acquired from the weighing device in an aspect whereby it can be recognized that the weight value is not acquired, and the settlement means prohibits settlement until the weight value is acquired from the weighing device or registration of the product sold by weight is canceled.

(Note A9)

A program according to one or more embodiments is a program that causes a computer to function as a mobile terminal, the program causing the computer to function as a product-type acquisition means that acquires a type of a product sold by weight, a transceiver that establishes intercommunication with a second communication means of a weighing device that weighs the product sold by weight, a weight-value acquisition means that acquires a weight value of the product sold by weight weighed by the weighing device for which intercommunication is established, and a product registration means that registers the type of the product and the weight value, which corresponds to the type of the product.

(Note A10)

A program according to one or more embodiments is a program that causes a computer to function as a weighing device, the program causing the computer to function as an instruction receiver that receives an instruction from an operating entity and a communication means that establishes intercommunication with a mobile terminal, wherein the communication means, when the instruction receiver receives from a customer a declaration of using a weighing function of weighing a product sold by weight instead of using the mobile terminal or when a product sold by weight is placed on a platform, prohibits establishing communication with the mobile terminal until use of the weighing function ends.

(Note A11)

A program according to one or more embodiments is a program that causes a computer to function as a POS terminal, the program causing the computer to function as a display means that displays information, obtained via a mobile terminal, on a product sold by weight whose weight value is not acquired from a weighing device and a settlement means, wherein the display means, until the weight value is acquired from the weighing device or registration of the product sold by weight is canceled, displays the product sold by weight whose weight value is not acquired from the weighing device in an aspect whereby it can be recognized that the weight value is not acquired, and the settlement means prohibits settlement until the weight value is acquired from the weighing device or registration of the product sold by weight is canceled.

(Note A12)

A storage medium according to one or more embodiments is a storage medium that stores a program that causes a computer to function as a mobile terminal, the storage medium storing a program for causing the computer to function as a product-type acquisition means that acquires a type of a product sold by weight, a transceiver that establishes intercommunication with a second communication means of a weighing device that weighs the product sold by weight, a weight-value acquisition means that acquires a weight value of the product sold by weight weighed by the weighing device for which intercommunication is established, and a product registration means that registers the type of the product and the weight value, which corresponds to the type of the product.

(Note A13)

A storage medium according to one or more embodiments is a storage medium that stores a program that causes a computer to function as a weighing device, the storage medium storing a program that causes the computer to function as an instruction receiver that receives an instruction from an operating entity and a communication means that establishes intercommunication with a mobile terminal, wherein the communication means, when the instruction receiver receives from a customer a declaration of using a weighing function of weighing a product sold by weight instead of using the mobile terminal or when a product sold by weight is placed on a platform, prohibits establishing communication with the mobile terminal until use of the weighing function ends.

(Note A14)

A storage medium according to one or more embodiments is a storage medium that stores a program that causes a computer to function as a POS terminal, the storage medium storing a program that causes the computer to function as a display means that displays information, obtained via a mobile terminal, on a product sold by weight whose weight value is not acquired from a weighing device and a settlement means, wherein the display means, until the weight value is acquired from the weighing device or registration of the product sold by weight is canceled, displays the product sold by weight whose weight value is not acquired from the weighing device in an aspect whereby it can be recognized that the weight value is not acquired, and the settlement means prohibits settlement until the weight value is acquired from the weighing device or registration of the product sold by weight is canceled.

(Note A15)

A sales processing system according to one or more embodiments includes: a mobile terminal; a weighing device; and a POS terminal; wherein the mobile terminal has a product-type acquisition means that acquires a type of a product sold by weight, a transceiver that establishes intercommunication with a weighing device that weighs the product sold by weight, a weight-value acquisition means that acquires a weight value of the product sold by weight weighed by the weighing device for which intercommunication is established, and a product registration means that registers the type of the product and the weight value, which corresponds to the type of the product; the weighing device has a second communication means that establishes intercommunication with the mobile terminal; and the POS terminal has a display means that displays information, obtained via the mobile terminal, on a product sold by weight whose weight value is not acquired from the weighing device and a settlement means.

(Note A16)

A sales processing method according to one or more embodiments includes: a product-type acquisition step of acquiring a type of a product sold by weight; a communication step of establishing intercommunication with a weighing device that weighs the product sold by weight; a weight-value acquisition step of acquiring a weight value of the product sold by weight weighed by the weighing device for which intercommunication is established; a product registration step of registering the type of the product and the weight value, which corresponds to the type of the product; a display means that displays information on a product sold by weight whose weight value is not acquired from the weighing device; and a settlement means.

According to note A1 and the like, in shopping using a mobile terminal in a store, a purchase of a product sold by weight is facilitated.

(Note B1)

A mobile terminal according to one or more embodiments includes: a position specification means that specifies a current position; and a store specification means that specifies a predetermined store wherein settlement of a registered product is to be performed; wherein the store specification means specifies the predetermined store based on the position or, when the predetermined store cannot be specified based on the position, prompts a customer to input store information and thereby specifies the predetermined store according to the input store information. This facilitates a purchase in a store using a mobile terminal. For example, bothersome procedures at a time of entering a store are eliminated.

(Note B2)

The mobile terminal of note B1 may be further provided with: a product registration means; wherein the product registration means restricts transitioning to a process enabling product registration until the predetermined store is specified by the store specification means.

(Note B3)

In the mobile terminal of note B1 or note B2, the store specification means may, when two or more stores become candidates for the predetermined store based on the position, present the two or more stores to the customer and prompt the customer to select one of the stores.

(Note B4)

The mobile terminal of any one among note B1 to note B3 may be further provided with: a settlement means; wherein the settlement means, when the position is in a first region, enables a process of performing settlement of the registered product by electronic payment that does not use cash. This enables electronic payment by credit card or the like (electronic payment) to be suitably executed.

(Note B5)

The mobile terminal of any one among note B1 to note B3 may be further provided with: a settlement means; wherein the settlement means, when the customer selects a process of performing settlement of the registered product by electronic payment that does not use cash, notifies the customer to enter a first region.

(Note B6)

The mobile terminal of any one among note B1 to note B5 may be further provided with: a notification means; wherein the notification means, when the position is outside a second region and settlement of the registered product is not ended, notifies at least one among an employee and the customer.

(Note B7)

A sales management system according to one or more embodiments includes: a control means that monitors and controls whether a mobile terminal is present outside a predetermined region; and a notification means that, when a mobile terminal is present outside the predetermined region, notifies at least one among information indicating that a mobile terminal is present outside the predetermined region and information on a member using this mobile terminal.

(Note B8)

A sales management system according to one or more embodiments includes: a POS terminal; and a weighing device; wherein the POS terminal has a first control means that compares the predetermined store and a store wherein the POS terminal is disposed and, when the comparison does not match, performs a control of prohibiting a settlement process, and the weighing device has a second control means that compares the predetermined store and a store wherein the weighing device is disposed and, when the comparison does not match, performs a control of prohibiting interconnection with the mobile terminal.

(Note B9)

A program according to one or more embodiments is a program that causes a computer to function as a mobile terminal, the program causing the computer to function as a position specification means that specifies a current position and a store specification means that specifies a predetermined store wherein settlement of a registered product is to be performed, wherein the store specification means specifies the predetermined store based on the position or, when the predetermined store cannot be specified based on the position, prompts a customer to input store information and thereby specifies the predetermined store according to the input store information.

(Note B10)

A storage medium according to one or more embodiments is a storage medium that stores a program that causes a computer to function as a mobile terminal, the storage medium storing a program that causes the computer to function as a position specification means that specifies a current position and a store specification means that specifies a predetermined store wherein settlement of a registered product is to be performed, wherein the store specification means specifies the predetermined store based on the position or, when the predetermined store cannot be specified based on the position, prompts a customer to input store information and thereby specifies the predetermined store according to the input store information.

(Note B11)

A store specification method according to one or more embodiments includes: a position specification step of specifying a current position; and a store specification step of specifying a predetermined store wherein settlement of a registered product is to be performed; wherein the store specification step specifies the predetermined store based on the position or, when the predetermined store cannot be specified based on the position, prompts a customer to input store information and thereby specifies the predetermined store according to the input store information.

According to note B1 and the like, in shopping using a mobile terminal in a store, a burden on a customer until they enter the store and start shopping can be reduced.

(Note C1)

A sales-data processing system according to one or more embodiments is an acquisition means that acquires product identification information of a product; a product registration means that performs product registration by specifying the product based on the product identification information acquired by the acquisition means; and that displays a quantity based on a sales condition of the product specified by the acquisition means. This enables a quantity to be suitably confirmed.

(Note C2)

The sales-data processing system of note C1 may be further provided with: a quantity changing means whereby a customer performs a quantity changing operation.

(Note C3)

In the sales-data processing system of note C1 or note C2, the sales condition may include a price cut for when sale of a plurality of products takes place, and, when the detected sales condition is a price cut for when sale of a plurality of products takes place, a quantity of the sale of the plurality of products whereto this price cut is applied may be displayed.

(Note C4)

In the sales-data processing system of note C1 or note C2, the sales condition may include a purchase history of a customer, and, when the detected sales condition is the purchase history of the customer, a quantity purchased the previous time may be displayed.

(Note C5)

In the sales-data processing system of any one among note C1 to note C4, when the sales condition is a price cut for when sale of a plurality of products takes place, a price-cut amount of when this sales condition is established may be displayed, and, when the quantity changing means performs subtraction, non-establishment of this sales condition may be notified.

(Note C6)

In the sales-data processing system of any one among note C1 to note C5, when the sales condition restricts a sales quantity, the quantity changing means may prohibit addition beyond this quantity.

(Note C7)

In the sales-data processing system of any one among note C1 to note C5, when the sales condition is not set for the acquired product, this product and an operator displaying a quantity changing screen may be displayed on a registration screen, and, when the sales condition is set for the acquired product, a display region of the quantity changing screen set with a quantity according to the sales condition may be output on a front surface of the registration screen.

(Note C8)

An information processing terminal according to one or more embodiments is an acquisition means that acquires product identification information of a product; a product registration means that performs product registration by specifying the product based on the product identification information acquired by the acquisition means; and that displays a quantity based on a sales condition of the product specified by the acquisition means.

(Note C9)

A program according to one or more embodiments is a program that causes a computer to function as a mobile terminal, the program causing the computer to function as a means of inputting product information of a product to be purchased, a means of searching for a sales condition of the product, a means of determining a quantity based on the sales condition of the product, a means of setting the quantity to a purchase quantity and confirming with a customer, and a means of performing product registration based on a confirmation operation by the customer.

(Note C10)

A storage medium according to one or more embodiments is a storage medium that stores a program that causes a computer to function as a mobile terminal, the storage medium storing a program that causes the computer to function as a means of inputting product information of a product to be purchased, a means of searching for a sales condition of the product, a means of determining a quantity based on the sales condition of the product, a means of setting the quantity to a purchase quantity and confirming with a customer, and a means of performing product registration based on a confirmation operation by the customer.

(Note C11)

A control method of controlling a mobile terminal that performs product registration, provided with: a step of inputting product information of a product to be purchased; a step of searching for a sales condition of the product; a step of determining a quantity to be purchased by a customer according to the sales condition of the product; a step of setting the quantity to a purchase quantity and confirming with the customer; and a step of performing product registration based on a confirmation operation by the customer.

According to note C1 and the like, in shopping using a mobile terminal in a store, quantity confirmation and the like are facilitated, enabling efficient shopping.

(Note D1)

A sales-data processing system according to one or more embodiments includes: a photographing means that photographs product identification information; a product registration means that specifies a product based on the product identification information photographed by the photographing means and registers registration information of this product; and a display means that displays a first display region that displays an image being photographed by the photographing means and a second display region that displays information on the product specified by the product registration means; wherein the second display region can be changed to a range that includes the first display region. This makes information displayed on a display easy to understand and improves operability.

(Note D2)

In the sales-data processing system of note D1, the display region may display, between the first display region and the second display region, a third display region that displays at least a subtotal or an item count of the registration information registered by the product registration means.

(Note D3)

In the sales-data processing system of note D1 or note D2, the photographing means may be disabled when the second display region is changed to the range that includes the first display region.

(Note D4)

In the sales-data processing system of any one among note D1 to note D3, the first display region may be displayed so a region wherein the product identification information is recognized from what is photographed is visible, and the product registration means may be disabled when the first display region is changed to include the reading range of the first display region.

(Note D5)

In the sales-data processing system of any one among note D1 to note D4, the image may include a symbol code, and the product registration means may specify the product by recognizing the symbol code present in a photographed region and disable the photographing means when no symbol code is present in the photographed region for a predetermined amount of time.

(Note D6)

In the sales-data processing system of any one among note D2 to note D5, the display means may, when a product count specified by the product registration means exceeds a predetermined quantity, display, in the third display region, an operator that expands the second display region and an operator that restores the expanded second display region to a predetermined region.

(Note D7)

A program according to one or more embodiments is a program that causes a computer to function as an information processing device, the program causing the computer to function as a means of photographing image data; a means of specifying a product based on the photographed image data; a means of causing the information processing device to display, divided on a display, a first display region that displays the image data being photographed and a second display region that displays information on the specified product; and a means of changing the second display region to a range that includes the first display region.

(Note D8)

A control method according to one or more embodiments is a control method of controlling a mobile terminal that performs product registration, provided with: a step of displaying, on a display of the mobile terminal, a first display region for registering a product and a second display region that displays registered product information; a step of expanding the second display region; a step of detecting that the second display region has reached a predetermined range of the display; and a step of disabling an acquisition means for registering the product when it is detected that the second display region has reached the predetermined range of the display.

(Note D9)

An information processing device according to one or more embodiments includes: a photographing means that photographs product identification information; a product registration means that specifies a product based on the product identification information photographed by the photographing means and registers registration information of this product; and a display means that displays a first display region that displays an image being photographed by the photographing means and a second display region that displays information on the product specified by the product registration means; wherein the second display region can be changed to a range that includes the first display region.

According to note D1 and the like, in shopping using a mobile terminal in a store, information displayed on a display can be, for example, changed in an easy-to-view manner, thereby enabling efficient shopping.

(Note E1)

A sales-data processing system according to one or more embodiments includes: a storage that stores product identification information identifying a product and product information of this product in association; an acquisition means that acquires product identification information of a product to be purchased; a product registration means that registers product information of the product based on the product identification information acquired by the acquisition means and the information stored in the storage; and a notification means that, when the product identification information acquired by the acquisition means is not stored in the storage, notifies as much. This enables smooth product registration even when, for example, product information cannot be acquired by reading a barcode. Moreover, operability is improved.

(Note E2)

A sales-data processing system according to one or more embodiments includes: an acquisition means that acquires product identification information of a product to be purchased; a detection means that detects an acquisition operation of the product identification information by the acquisition means; and a notification means that, when the detection means detects the acquisition operation and the acquisition means was unable to acquire the product identification information, notifies as much.

(Note E3)

A sales-data processing system according to one or more embodiments includes: an acquisition means that acquires product identification information of a product to be purchased; a detection means that detects an acquisition operation of the product identification information by the acquisition means; a product registration means that registers the product based on the product identification information acquired by the acquisition means; a deferred-product registration means that, when the detection means detects the acquisition operation and the acquisition means was unable to acquire the product identification information or when the product registration means was unable to register the product, defers registration of the product information; and a display means that displays a deferred quantity.

(Note E4)

A sales-data processing system according to one or more embodiments includes: an acquisition means that acquires product identification information of a product to be purchased; a detection means that detects an acquisition operation of the product identification information by the acquisition means; a product registration means that registers registration information of the product based on the product identification information acquired by the acquisition means; a deferred-product registration means that, when the detection means detects the acquisition operation and the acquisition means was unable to acquire the product identification information or when the product registration means was unable to register the product, generates deferred-product information; and a storage that stores the deferred-product information and the registration information registered by the product registration means in association.

(Note E5)

The sales-data processing system of note E4 may be further provided with: an input means that inputs registration information; and a notification means that issues a notification when the registration information input by the input means includes deferred-product information relating to a product whose product identification information was unable to be registered.

(Note E6)

A sales-data processing system according to one or more embodiments includes: an input means that inputs registration information; and a display means that performs list display of the registration information input by the input means; wherein the display means, when the registration information acquired by the input means includes deferred-product information relating to a product that was unable to be registered, performs list display of the registration information and the deferred-product information in combination and displays the registration information and the deferred-product information in different display aspects.

(Note E7)

A sales-data processing system according to one or more embodiments includes: an input means that inputs registration information; and a settlement means that performs a settlement process based on the registration information; and a prohibition means that, when the registration information input by the input means includes deferred-product information relating to a product that was unable to be registered, prohibits the settlement process by the settlement means until correction of this deferred-product information is performed.

(Note E8)

A sales-data processing system according to one or more embodiments includes: a product registration means that registers registered product information of a product; a registered-product cancellation means that deletes the registered product information; and a notification means that, when it is detected that the registered-product cancellation means has deleted the registered product information, notifies as much.

(Note E9)

A program according to one or more embodiments is a program that causes a computer to function as a mobile terminal, the program causing the computer to function as a means of acquiring product identification information of a product, a means of registering the product based on the acquired product identification information, and a means of generating, when the product was unable to be registered, deferred-product information relating to a product whose product identification information was unable to be registered.

(Note E10)

A storage medium according to one or more embodiments is a storage medium that stores a program that causes a computer to function as a mobile terminal, the storage medium storing a program that causes the computer to function as a means of acquiring product identification information of a product, a means of registering the product based on the acquired product identification information, and a means of generating, when the product was unable to be registered, deferred-product information relating to a product whose product identification information was unable to be registered.

According to note E1 and the like, in shopping using a mobile terminal in a store, settlement can be performed correctly even when a product cannot be read.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SIGNS

10: Host device
20: Mobile terminal
201: Control means
202: Store specification means
203: Acquisition means
204: Detection means
205: Product registration means
206: Deferred-product registration means
207: Display means
208: Notification means
209: Output means
210: Registered-product cancellation means
211: Settlement means
213: Position acquisition means
215: Communication means
331: Instruction receiver
333: Transceiver
335: Controller
60: Store controller
70: POS terminal
700: Control unit
701: Control means
702: Input means
703: Display means
704: Settlement means
705: Notification means
706: Editing means
707: Prohibition means
750: Display
760: Input unit
770: Printing unit

What is claimed is:

1. A mobile terminal, comprising:
a processor that acquires a type of a product sold by weight;
a transceiver connected to the processor and that establishes intercommunication with a weighing device that weighs the product;
a storage connected to the processor;
a camera; and
a display, wherein
the processor:
causes the transceiver to acquire, from the weighing device, a weight value of the product weighed by the weighing device,
registers, in the storage, product information including a name of the product, the type of the product, and the weight value that is acquired from the weighing device and corresponds to the type of the product, and
causes the display to display on a same screen:
a first display region that displays an image of the product captured by the camera;
a second display region that displays a list including a line indicating the registered product information and a price of the product; and
a third display region that displays a current registration status, wherein
the first display region, the third display region, and the second display region are arranged in this order from an upper part to a bottom part of the screen, and
with respect to the product whose image is displayed in the first display region but whose weight value has not been acquired, the processor causes the display to add a highlighted line in the list displayed in the second display region, and to display, in the highlighted line, a name of the product requiring weighting and a message informing a user that the weighing is being required.

2. The mobile terminal according to claim 1, wherein after acquiring the type of the product, the processor causes the display to display information indicating that the weight value is not acquired, until the weight value is acquired.

3. The mobile terminal according to claim 1, wherein the processor detects an instruction to the weighing device based on an operation by a customer who operates the mobile terminal, and
the transceiver transmits the instruction to the weighing device.

4. The mobile terminal according to any one among claim 1, wherein the processor:
upon acquiring the type of the product, prohibits transitioning to a settlement process; and
upon acquiring the weight value, lifts the prohibition.

5. A weighing device, comprising:
a platform on which a product sold by weight is placed to be weighed;
a display:
a controller that:
causes the display to display:
a first display region that displays first information for a first customer using a mobile terminal, and
a second display region that displays second information for a second customer not using the mobile terminal, wherein
the first display region and the second display region are adjacent to each other on a same screen;
receives an instruction from at least one of the first and second customers via the display; and
a transceiver that establishes the intercommunication with the mobile terminal, wherein
once the controller receives the instruction to use a weighing function of weighing the product without use of the mobile terminal, or once the controller detects that the product is placed on the platform, the controller:
prohibits establishing the intercommunication and then starts weighting of the product sold by weight, and
permits establishing the intercommunication after the weighting is completed.

6. A non-transitory computer-readable medium (CRM) that stores instructions that cause a computer to function as a mobile terminal that comprises a storage, a camera, and a display, the instructions causing the computer to:
acquire a type of a product sold by weight;
establish intercommunication with a weighing device that weighs the product;
acquire, from the weighing device, a weight value of the product;
register, in the storage, product information including a name of the product, the type of the product, and the weight value that is acquired from the weighing device and corresponds to the type of the product; and
cause the display to display on a same screen:
a first display region that displays an image of the product captured by the camera;
a second display region that displays a list including a line indicating the registered product information and a price of the product; and
a third display region that displays a current registration status, wherein
the first display region, the third display region, and the second display region are arranged in this order from an upper part to a bottom part of the screen, and
with respect to the product whose image is displayed in the first display region but whose weight value has not been acquired, the computer causes the display to add a highlighted line in the list displayed in the second display region, and to display, in the highlighted line, a name of the product requiring weighting and a message informing a user that the weighing is being required.

7. A non-transitory computer-readable medium (CRM) that stores instructions that cause a computer to function as a weighing device that comprises: a platform on which a product sold by weight is placed to be weighed; and a display, the instructions causing the computer to:
cause the display to display,
a first display region that displays first information for a first customer using a mobile terminal, and
a second display region that displays second information for a second customer not using the mobile terminal, wherein
the first display region and the second display region are adjacent to each other on a same screen;
receive an instruction from at least one of the first and second customers via the display;
establish the intercommunication with the mobile terminal; and
once the controller receives the instruction to use a weighing function of weighing the product without use of the mobile terminal, or
once the controller detects that the product is placed on the platform,
prohibit establishing the intercommunication and then start weighting of the product sold by weight, and
permit establishing the intercommunication after the weighting is completed.

8. A sales processing system, comprising:
a mobile terminal;
a weighing device that weighs a product sold by weight; and
a POS terminal that performs settlement, wherein
the mobile terminal comprises:
a transceiver that establishes intercommunication with the weighing device;
a processor that:
acquires a type of the product,
causes the transceiver to acquire, from the weighing device, a weight value of the product, and
registers, in a storage, product information including a name of the product, the type of the product, and the weight value that is acquired from the weighing device and corresponds to the type of the product;
a camera; and
a display, wherein
the processor causes the display to display on a same screen:
a first display region that displays an image of the product captured by the camera;
a second display region that displays a list including a line indicating the registered product information and a price of the product; and
a third display region that displays a current registration status, wherein
the first display region, the third display region, and the second display region are arranged in this order from an upper part to a bottom part of the screen, and
with respect to the product whose image is displayed in the first display region but whose weight value has not been acquired, the processor causes the display to add a highlighted line in the list displayed in the second display region, and to display, in the highlighted line, a name of the product requiring weighting and a message informing a user that the weighing is being required,
the weighing device comprises:
a transceiver that establishes intercommunication with the mobile terminal, and
the POS terminal:
comprises a display, and
causes the display to display information, obtained via the mobile terminal, on the product of which the weight value has not been acquired.

9. A sales processing method, comprising:
acquiring, with a mobile terminal, a type of a product sold by weight;
establishing, with the mobile terminal, intercommunication with a weighing device that weighs the product;
transmitting, from the weighing device to the mobile terminal, a weight value of the product;
registering, in a storage of the mobile terminal, product information including a name of the product, the type of the product, and the weight value that is transmitted from the weighing device and corresponds to the type of the product;
causing a display of the mobile terminal to display on a same screen:
a first display region that displays an image of the product captured by a camera of the mobile terminal;
a second display region that displays a list including a line indicating the registered product information and a price of the product; and a third display region that displays a current registration status, wherein the first display region, the third display region, and the second display region are arranged in this order from an upper part to a bottom part of the screen, and with respect to the product whose image is displayed in the first display region but whose weight value has not been acquired, the causing includes causing the display to add a highlighted line in the list displayed in the second display region, and to display, in the highlighted line, a name of the product requiring weighting and a message informing a user that the weighing is being required; and performing, with a POS terminal, settlement of the product based on the weight value.

10. The mobile terminal according to claim 1, wherein the processor registers, in the storage, at least one of deferred-product information and canceled product information each being a trigger for a notification of calling over the employee.

11. The mobile terminal according to claim 1, wherein the processor acquires store information, and upon specifying a predetermined store based on the store information, enabling a product registration process.

12. The weighing device according to claim 5, wherein once the controller receives a selection of the product sold by weight from at least one of the mobile terminal and an external server device via a network, the controller causes the display to display a message prompting a user to place the product sold by weight on the platform.

* * * * *